(12) United States Patent
Inoue et al.

(10) Patent No.: US 7,516,323 B2
(45) Date of Patent: Apr. 7, 2009

(54) SECURITY MANAGEMENT SYSTEM IN PARALLEL PROCESSING SYSTEM BY OS FOR SINGLE PROCESSORS

(75) Inventors: Hiroaki Inoue, Tokyo (JP); Yoshiyuki Ito, Tokyo (JP); Junji Sakai, Tokyo (JP); Masato Edahiro, Tokyo (JP)

(73) Assignee: NEC Corporation, Tokyo (JP)

( * ) Notice: Subject to any disclaimer, the term of this patent is extended or adjusted under 35 U.S.C. 154(b) by 890 days.

(21) Appl. No.: 10/886,639

(22) Filed: Jul. 9, 2004

(65) Prior Publication Data

US 2005/0015625 A1 Jan. 20, 2005

(30) Foreign Application Priority Data

Jul. 18, 2003 (JP) .............................. 2003-198889

(51) Int. Cl.
*H04L 9/00* (2006.01)
(52) U.S. Cl. ................... 713/164; 718/100; 712/203; 726/4
(58) Field of Classification Search .................. 713/164, 713/155–159, 168–181, 500, 300, 320, 323; 713/330; 712/203; 718/104, 100; 709/225–229; 726/2–7, 26–27; 380/247–250; 710/107–125; 280/247–250
See application file for complete search history.

(56) References Cited

U.S. PATENT DOCUMENTS

| | | | |
|---|---|---|---|
| 5,142,684 A | 8/1992 | Perry et al. | |
| 5,699,526 A | 12/1997 | Siefert | |
| 5,872,972 A | 2/1999 | Boland et al. | |
| 6,581,089 B1 | 6/2003 | Imamura | |
| 2002/0099837 A1 | 7/2002 | Oe et al. | |
| 2002/0184046 A1 | 12/2002 | Kamada et al. | |
| 2003/0069916 A1* | 4/2003 | Hirschsohn | 709/104 |
| 2004/0181782 A1* | 9/2004 | Findeisen | 717/130 |

FOREIGN PATENT DOCUMENTS

| | | |
|---|---|---|
| EP | 0049521 A2 | 4/1982 |
| EP | 0 205 948 | 12/1986 |
| GB | 2 389 932 A | 12/2003 |
| GB | 2 400 213 A | 1/2004 |
| GB | 2402519 A | 8/2004 |
| JP | 03-113563 | 5/1991 |
| JP | 03-257652 | 11/1991 |
| JP | 07-306804 | 11/1995 |
| JP | 09-237193 | 9/1997 |
| JP | 11-306038 | 11/1999 |
| JP | 2003-044297 | 2/2003 |
| JP | 2003-058515 | 2/2003 |
| WO | WO 99/44138 | 2/1999 |

* cited by examiner

*Primary Examiner*—Kambiz Zand
*Assistant Examiner*—Kari L Schmidt
(74) *Attorney, Agent, or Firm*—Foley & Lardner LLP

(57) ABSTRACT

On a parallel processing system which operates an OS and an existing application for single processors on a multiprocessor to realize parallel processing by the multiprocessor with respect to the application, an OS service unit which provides services of the OS for single processors to a unit of work which can be parallelized within the application controls security function with respect to a processing request from the unit of work in response to the processing request.

34 Claims, 42 Drawing Sheets

FIG.18 (UP/DOWN OPERATION BY SEMAPHORE SYSTEM)

FIG. 19 (DOWN OPERATION BY SEMAPHORE)

FIG. 20 (UP OPERATION BY SEMAPHORE SYSTEM IN THE SAME PROCESSOR)

FIG. 21 (UP OPERATION BY SEMAPHORE SYSTEM BETWEEN DIFFERENT PROCESSORS)

FIG.25 (MESSAGE TRANSMISSION OPERATION BY MESSAGE QUEUE SYSTEM WITHIN THE SAME PROCESSOR)

FIG. 26 (MESSAGE TRANSMISSION OPERATION BY MESSAGE QUEUE SYSTEM BETWEEN DIFFERENT PROCESSORS)

FIG.31

CONTROL FILE 2000P0~2000Pn

CONTROL LEVEL OF TASK
LEVEL 0 : TASK A,B,C
LEVEL 1 : TASK D TO F
LEVEL 2 : OTHERS

CONTROL LEVEL AND ACCESS CONTROL
LEVEL 0 : ALL ACCESSIBLE
LEVEL 1 : ACCESSIBLE ONLY FOR READ
LEVEL 2 : TO INHIBIT ALL EXTERNAL OUTPUT
          BUT SCREEN OUTPUT

CONTROL LEVEL AND QUANTITATIVE CONTROL
LEVEL 0 : STANDARD
LEVEL 1 : ONLY ONE FILE TO BE READ
LEVEL 2 : NO SEMAPHORE IS USABLE

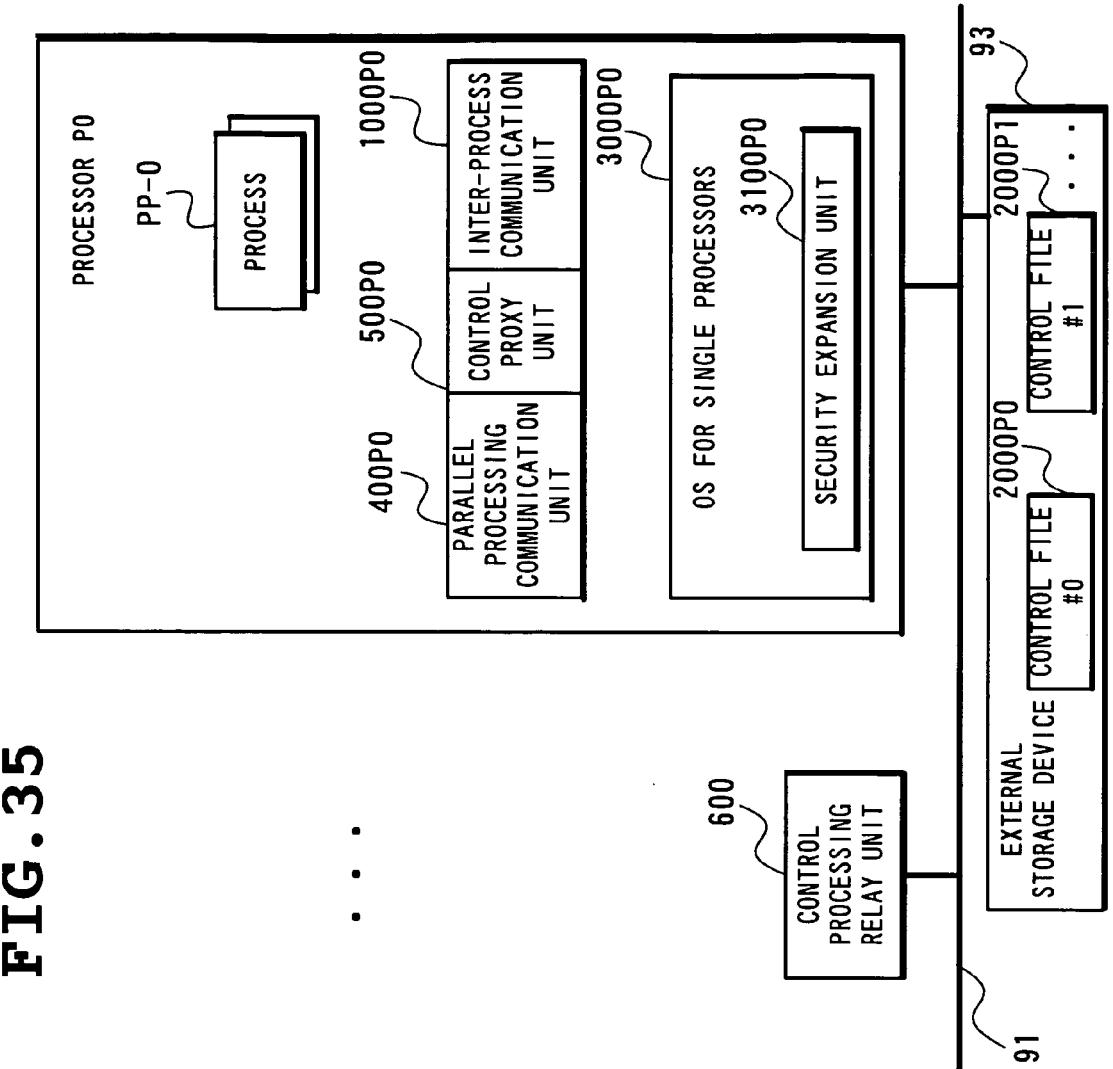
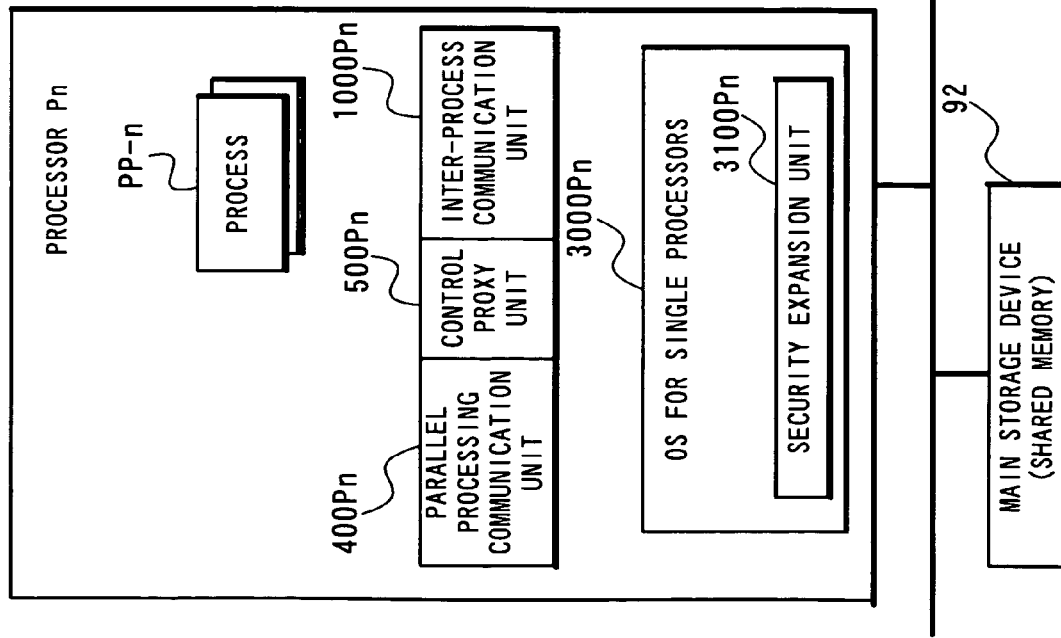
FIG. 35

FIG.36

CONTROL FILE 2000P0~2000Pn

```
#CONTROL LEVEL OF PROCESS
LEVEL 0: PROCESSES A, B, C
LEVEL 1: PROCESSES D TO F
LEVEL 2: OTHERS

#CONTROL LEVEL AND ACCESS CONTROL
LEVEL 0: ALL ACCESSIBLE
LEVEL 1: TO INHIBIT ANOTHER PROCESS GENERATION SYSTEM CALL
LEVEL 2: TO INHIBIT SYSTEM CALL RELATED TO I/O

#CONTROL LEVEL AND QUANTITATIVE CONTROL
LEVEL 0: STANDARD
LEVEL 1: ONLY ONE FILE TO BE READ
LEVEL 2: SEMAPHORES ARE ALLOWED UP TO TWO
```

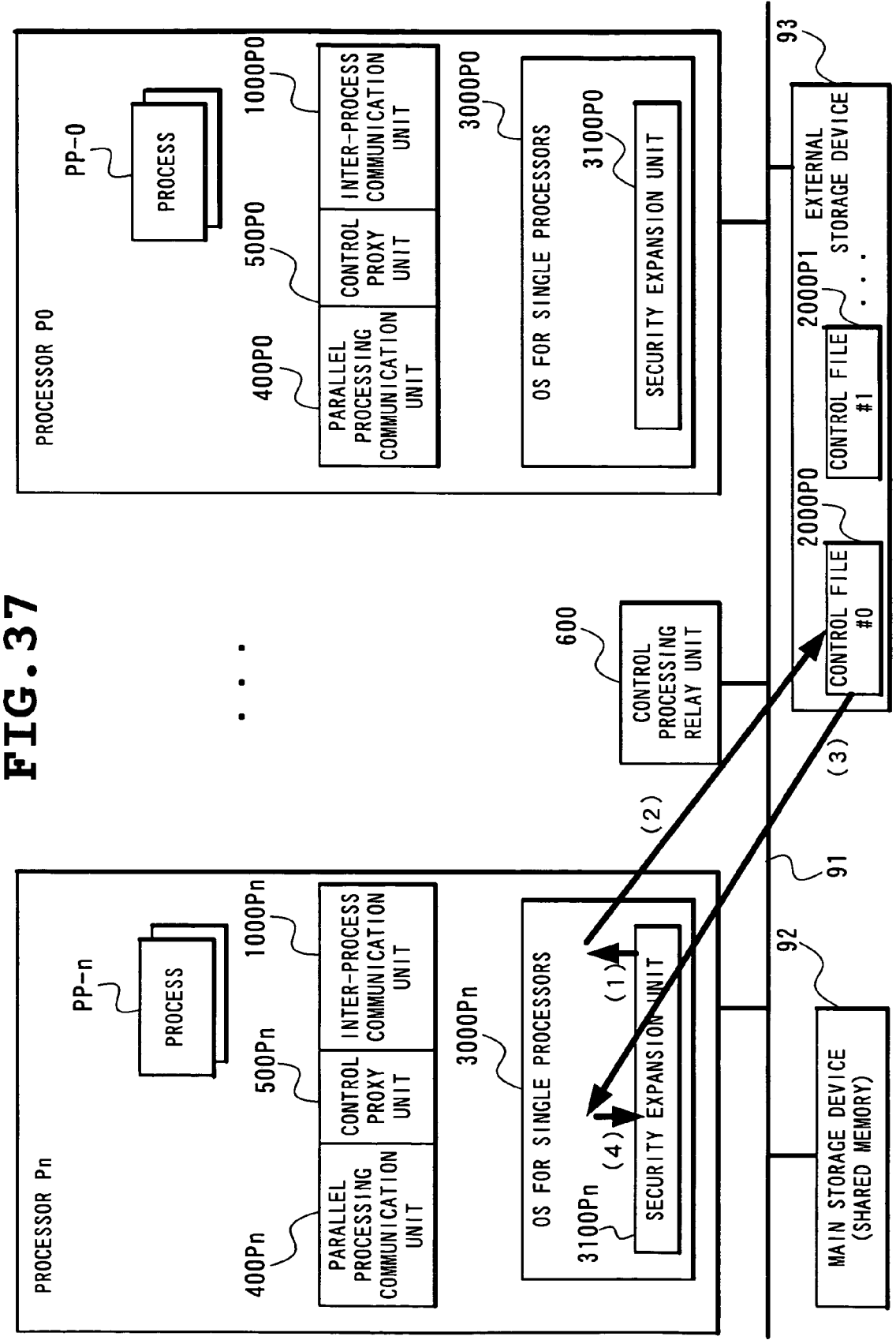

FIG. 40

CONTROL FILE.2000P0~2000Pn

```
#CONTROL LEVEL OF PROCESS
LEVEL 0: PROCESSES A, B, C
LEVEL 1: PROCESSES D TO F
LEVEL 2: OTHERS

#CONTROL LEVEL AND ACCESS CONTROL
LEVEL 0: ALL ACCESSIBLE
LEVEL 1: TO INHIBIT ANOTHER PROCESS GENERATION SYSTEM CALL
LEVEL 2: TO INHIBIT SYSTEM CALL RELATED TO I/O

#CONTROL LEVEL AND QUANTITATIVE CONTROL
LEVEL 0: STANDARD
LEVEL 1: ONLY ONE FILE TO BE READ
LEVEL 2: SEMAPHORES ARE ALLOWED UP TO TWO

#PATH TO USABLE LIBRARY
LEVEL 0: ALL OK
LEVEL 1: STANDARD + MUSIC FUNCTION LIBRARY
LEVEL 2: STANDARD LIBRARY
```

SECURITY MANAGEMENT SYSTEM IN PARALLEL PROCESSING SYSTEM BY OS FOR SINGLE PROCESSORS

BACKGROUND OF THE INVENTION

1. Field of the Invention

The present invention relates to a security management system in a parallel processing system by a multiprocessor and, more particularly, to a security management system in a parallel processing system by an OS for single processors capable of operating an OS and an existing application for single processors on a multiprocessor to enable the application to realize parallel processing by the multiprocessor.

2. Description of the Related Art

In data processing devices such as mobile terminals including a mobile phone and a mobile PC, an operating system for single processors (hereinafter referred to as an OS for single processors) and an application for single processors (hereinafter simply referred to as an application) are basically executed on a single processor.

Under these circumstances, when using the above-described application without modification on a multiprocessor basis, the application should be executed on an OS for multiprocessors in place of the above-described OS for single processors.

Among such systems which control execution of an OS for multiprocessors and an application on a multiprocessor system as described above are, for example, the conventional art disclosed in Japanese Patent Laying-Open (Kokai) No. Heisei 3-257652 and Japanese Patent Laying-Open (Kokai) No. Heisei 3-113563.

Japanese Patent Laying-Open (Kokai) No. Heisei 3-257652 (Literature 1) discloses a method of controlling interruptions between processor elements in a multiprocessor system composed of a plurality of processor elements.

Japanese Patent Laying-Open (Kokai) No. Heisei 3-113563 (Literature 2) discloses a method of scheduling processes to be assigned to a plurality of processors in a multiprocessor system.

On the other hand, Japanese Patent Laying-Open (Kokai) No. 2003-058515 (Literature 3) discloses a method of executing an individual process in a plurality of processor elements.

When operating an existing application on an OS for multiprocessors as in conventional art, however, the OS for multiprocessors provides services for multiprocessors even when the application uses only one among a plurality of processors, or continues processing mutually exclusive of other processors even when no other application operates, so that the extra processing causes overheads, or another problem might occur that modifying the above-described application so as to be used in multiprocessors requires enormous labor and costs.

In particular, when realizing a parallel processing system by a multiprocessor in small-sized data processing devices such as mobile terminals including a mobile phone and a mobile PC, overheads in processing of an OS for multiprocessors and modification of an application become hindrances.

Under these circumstances, when an application is used without modification on an existing OS for single processors, demanded is realization of a parallel processing system capable of operating an existing application on a multiprocessor without modification.

Furthermore, in a conventional parallel processing system by an OS for multiprocessors, since the OS is substantially single, it is difficult to separate a security function for each processor, and processor performance will be uniformly degraded by making each processor be adapted to security.

Under these circumstances, expected in small-sized data processing devices such as mobile terminals including a mobile phone and a mobile PC is a parallel processing system which operates an OS for single processors on each processor of a multiprocessor, in which each processor individually has a security function without unnecessarily degrading processor performance.

None of the above-described literatures discloses a technique of individually providing each processor with a security function.

SUMMARY OF THE INVENTION

An object of the present invention is to provide a security management system enabling security to be ensured as software individually for each processor without degrading processor performance on a parallel processing system by an OS for single processors which operates an OS and an existing application for single processors on a multiprocessor without modifying them to enable the existing application to realize parallel processing by the multiprocessor.

According to the first aspect of the invention, a security management system in a parallel processing system by an OS for single processors, wherein on a parallel processing system which operates an OS and an application for single processors on a multiprocessor, the multiprocessor being logically divided into two groups of a first processor side and a second processor side, and controls a unit of work that can be parallelized within the application operating on a processor on the first processor side as a new unit of work on a processor on the second processor side, thereby executing parallel processing by the multiprocessor with respect to the application, an OS service unit which provides services of the OS for single processors to the unit of work controls security function with respect to a processing request from the unit of work in response to the processing request.

According to another aspect of the invention, a security management system in a parallel processing system by an OS for single processors, wherein on a parallel processing system which operates an OS and an application for single processors on a multiprocessor, and controls a unit of work that can be parallelized within the application operating on one processor as a new unit of work on other processor, thereby executing parallel processing by the multiprocessor with respect to the application, an OS service unit which provides services of the OS for single processors to the unit of work controls security function with respect to a processing request from the unit of work in response to the processing request.

According to another aspect of the invention, a security management system in a parallel processing system by an OS for single processors, wherein on a parallel processing system which operates an OS for single processors and a unit of work as a task on a multiprocessor, an OS service unit which provides services of the OS for single processors to the unit of work controls security function with respect to a processing request from the unit of work in response to the processing request.

According to another aspect of the invention, a security management system in a parallel processing system by an OS for single processors, wherein on a parallel processing system which operates an OS and an application for single processors on a multiprocessor, the multiprocessor being logically divided into two groups of a first processor side and a second processor side, and controls a unit of work that can be parallelized within the application operating on a processor on the first processor side as a new unit of work on a processor on the second processor side, thereby executing parallel processing by the multiprocessor with respect to the application, a security expansion unit incorporated into the OS for single processors controls security function with respect to a processing request from the unit of work in response to the processing request.

According to another aspect of the invention, a security management system in a parallel processing system by an OS for single processors, wherein on a parallel processing system which operates an OS and an application for single processors on a multiprocessor, and controls a unit of work that can be parallelized within the application operating on one processor as a new unit of work on other processor, thereby executing parallel processing by the multiprocessor with respect to the application, a security expansion unit incorporated into the OS for single processors controls security function with respect to a processing request from the unit of work in response to the processing request.

According to another aspect of the invention, a security management system in a parallel processing system by an OS for single processors, wherein on a parallel processing system which operates an OS for single processors and a unit of work as a task on a multiprocessor, a security expansion unit incorporated into the OS for single processors controls security function with respect to a processing request from the unit of work in response to the processing request.

According to another aspect of the invention, a security management system in a parallel processing system by an OS for single processors, wherein on a parallel processing system which operates an OS and an application for single processors on a multiprocessor, the multiprocessor being logically divided into two groups of a first processor side and a second processor side, and controls a unit of work that can be parallelized within the application operating on a processor on the first processor side as a new unit of work on a processor on the second processor side, thereby executing parallel processing by the multiprocessor with respect to the application, an application control unit which provides execution environments for the unit of work controls security function with respect to a processing request from the unit of work in response to the processing request.

According to another aspect of the invention, a security management system in a parallel processing system by an OS for single processors, wherein on a parallel processing system which operates an OS and an application for single processors on a multiprocessor, and controls a unit of work that can be parallelized within the application operating on one processor as a new unit of work on other processor, thereby executing parallel processing by the multiprocessor with respect to the application, an application control unit which provides execution environments for the unit of work controls security function with respect to a processing request from the unit of work in response to the processing request.

According to another aspect of the invention, a security management system in a parallel processing system by an OS for single processors, wherein on a parallel processing system which operates an OS for single processors and a unit of work as a task on a multiprocessor, an application control unit which provides execution environments for the unit of work controls security function with respect to a processing request from the unit of work in response to the processing request.

According to another aspect of the invention, a security management system in a parallel processing system by an OS for single processors, wherein on a parallel processing system which operates an OS and an application for single processors on a multiprocessor, the multiprocessor being logically divided into two groups of a first processor side and a second processor side, and controls a unit of work that can be parallelized within the application operating on a processor on the first processor side as a new unit of work on a processor on the second processor side, thereby executing parallel processing by the multiprocessor with respect to the application, at least one of an OS service unit which provides services of the OS for single processors to the unit of work, a security expansion unit incorporated into the OS for single processors and an application control unit which controls security function with respect to the unit of work controls security function with respect to a processing request from the unit of work in response to the processing request.

According to another aspect of the invention, a security management system in a parallel processing system by an OS for single processors, wherein on a parallel processing system which operates an OS and an application for single processors on a multiprocessor, and controls a unit of work that can be parallelized within the application operating on one processor as a new unit of work on other processor, thereby executing parallel processing by the multiprocessor with respect to the application, at least one of an OS service unit which provides services of the OS for single processors to the unit of work, a security expansion unit incorporated into the OS for single processors and an application control unit which controls security function with respect to the unit of work controls security function with respect to a processing request from the unit of work in response to the processing request.

According to another aspect of the invention, a security management system in a parallel processing system by an OS for single processors, wherein on a parallel processing system which operates an OS and an application for single processors on a multiprocessor, the multiprocessor being logically divided into two groups of a first processor side and a second processor side, and controls a unit of work that can be parallelized within the application operating on a processor on the first processor side as a new unit of work on a processor on the second processor side, thereby executing parallel processing by the multiprocessor with respect to the application, limitations are imposed, for each the processor, on the function of an OS service unit which provides services of the OS for single processors to the unit of work to limit a processing request from the unit of work operating on each the processor.

According to another aspect of the invention, a security management system in a parallel processing system by an OS for single processors, wherein on a parallel processing system which operates an OS and an application for single processors on a multiprocessor, and controls a unit of work that can be parallelized within the application operating on one processor as a new unit of work on other processor, thereby executing parallel processing by the multiprocessor with respect to the application, limitations are imposed, for each the processor, on the function of an OS service unit which provides services of the OS for single processors to the unit of work to limit a processing request from the unit of work operating on each the processor.

According to another aspect of the invention, a security management system in a parallel processing system by an OS for single processors, wherein on a parallel processing system which operates an OS and an application for single processors on a multiprocessor, the multiprocessor being logically divided into two groups of a first processor side and a second processor side, and controls a unit of work that can be parallelized within the application operating on a processor on the first processor side as a new unit of work on a processor on the second processor side, thereby executing parallel processing by the multiprocessor with respect to the application, when executing a unit of work whose requested function is different, a processor which executes the unit of work in question is selected and allocated according to a function provided by an application control unit which provides execution environments to the unit of work.

According to another aspect of the invention, a security management system in a parallel processing system by an OS for single processors, wherein on a parallel processing system which operates an OS and an application for single processors on a multiprocessor, and controls a unit of work that can be parallelized within the application operating on one processor as a new unit of work on other processor, thereby executing parallel processing by the multiprocessor with respect to the application, when executing a unit of work whose requested function is different, a processor which executes the unit of work in question is selected and allocated according to a function provided by an application control unit which provides execution environments to the unit of work.

According to another aspect of the invention, a security management system in a parallel processing system by an OS for single processors, wherein on a parallel processing system which operates an OS for single processors and a unit of work as a task on a multiprocessor, when executing a unit of work whose requested function is different, a processor which executes the unit of work in question is selected and allocated according to a function provided by an application control unit which provides execution environments to the unit of work.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 31 is a diagram showing an example of contents of a control file in the first embodiment of the present invention;

FIG. 35 is a block diagram showing a structure of a security management system of a parallel processing system according to a second embodiment of the present invention;

FIG. 36 is a diagram showing an example of contents of a control file in the second embodiment of the present invention;

FIG. 37 is a diagram for use in explaining control file reading operation in the second embodiment of the present invention;

FIG. 40 is a diagram showing an example of contents of a control file in the third embodiment of the present invention;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First, description will be made of a parallel processing system to which a security management system according to the present invention is applied. In the parallel processing system which will be described in the following, parallel processing is executed on a multiprocessor by adding a mechanism for asking for processing with respect to a plurality of processors and a mechanism for protecting a critical section in the provision of OS services to a plurality of processors without adding any modification to a conventional OS for single processors.

Figure 1:
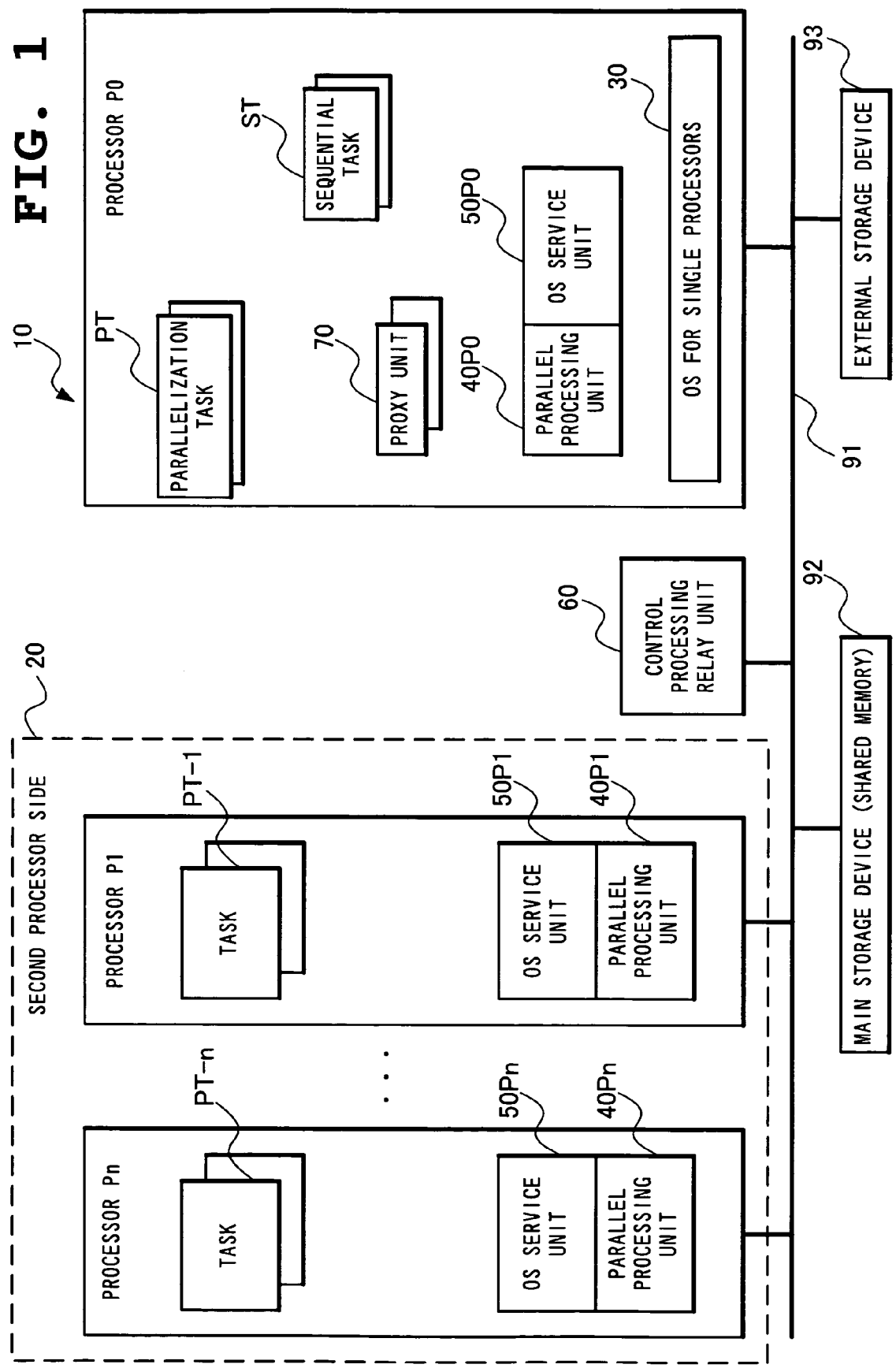
FIG. 1 is a block diagram showing a structure of a parallel processing system according to a first example of the present invention.

FIG. 1 is a block diagram showing a structure of a parallel processing system as a first example.

As shown in FIG. 1, the parallel processing system of the first example includes a multiprocessor composed of a plurality of processors (CPU) P0 to Pn (n is an integer not less than 1) connected through a system bus 91, which is logically divided into two groups of a first processor side 10 and a second processor side 20, with an OS 30 for single processors mounted which operates on the processor P0 on the first processor side 10 and with parallel processing units 40P0 to 40Pn for conducting parallel processing and OS service units 50P0 to 50Pn for processing OS service mounted on the processor P0 on the first processor side 10 and the processors P1 to Pn on the second processor side 20, respectively. Connected to the system bus 91 are a main storage device 92 as a shared memory shared by the respective processors P0 to Pn and an external storage device 93 such as a disk device.

The above-described multiprocessor may be structured not only to include a plurality of processors of the same kind but also to include a plurality of processing devices of different kinds such as a DSP and a security engine.

Between the first processor side 10 and the second processor side 20, a control processing relay unit 60 is uniquely provided for transmitting and receiving a control signal and data and a proxy unit 70 is provided on the first processor side 10 through which the OS 30 for single processors communicates with a task executed on the second processor side 20.

The processor on the above-described first processor side 10 does not necessarily exist as a single processor but exist as a plurality of processors. It is possible, for example, that two processors are provided on the first processor side 10 and each is mounted with a different OS for single processors.

Used as the OS 30 for single processors activated by the processor on the first processor side 10 is an existing OS. For example, a real time OS and a UNIX (R) OS are used without modification.

Task used in this specification represents a unit of work for conducting parallel processing of a process and a thread on a UNIX (R) OS, a task on a real time OS and the like.

In the parallel processing system of the present example, an application operates on the OS for single-processors on the first processor side 10 and among the units of work of the application, a task (sequential task) which can not be parallelized is processed by the processor P0 on the first processor side 10 and a task which can be parallelized within the application is created as a new task on the second processor side 20 and parallel-processed.

The parallel processing unit 40P0 and the parallel processing units 40P1 to 40Pn have a function of performing creation, activation, stop, termination and deletion of a task and other control related to tasks. Here, the parallel processing unit 40P0 of the first processor side 10 conducts such processing as creation, activation, stop, termination and deletion of a task through the control processing relay unit 60 with respect to the parallel processing units 40P1 to 40Pn of the respective processors P1 to Pn on the second processor side 20. As to signal notification, it is processed bidirectionally from both the parallel processing unit 40P0 and the parallel processing units 40P1 to 40Pn.

The OS service unit 50P0 and the OS service units 50P1 to 50Pn have a function as an interface for conducting various kinds of accesses to an external apparatus and control of the same and an interface for conducting various kinds of accesses to a resource shared among tasks and control of the same.

The control processing relay unit 60 is a unit for transmitting and receiving a control signal and data between the first processor side 10 and the second processor side 20 and used in control between a plurality of tasks processed in parallel to each other by a plurality of processors.

The proxy unit 70 is associated with tasks (a part or all of them) executed on the second processor side 20 and is mounted for signal notification (notification of various kinds of control signals for controlling tasks) between the task on the second processor side 20 and the OS 30 for single processors.

In the following, detailed description will be made of operation of thus structured parallel processing system of the first example with reference to the drawings.

Assume here that the application operates on the OS for single processors on the first processor side 10 and among the units of work of the application, a unit to be processed by the processor P0 on the first processor side 10 is defined as a sequential task ST and a unit of work which is a task that can be parallelized within the application and is parallel-processed by the second processor side 20 as tasks PT-1 to PT-n is defined as a parallelization task PT.

Figure 2:
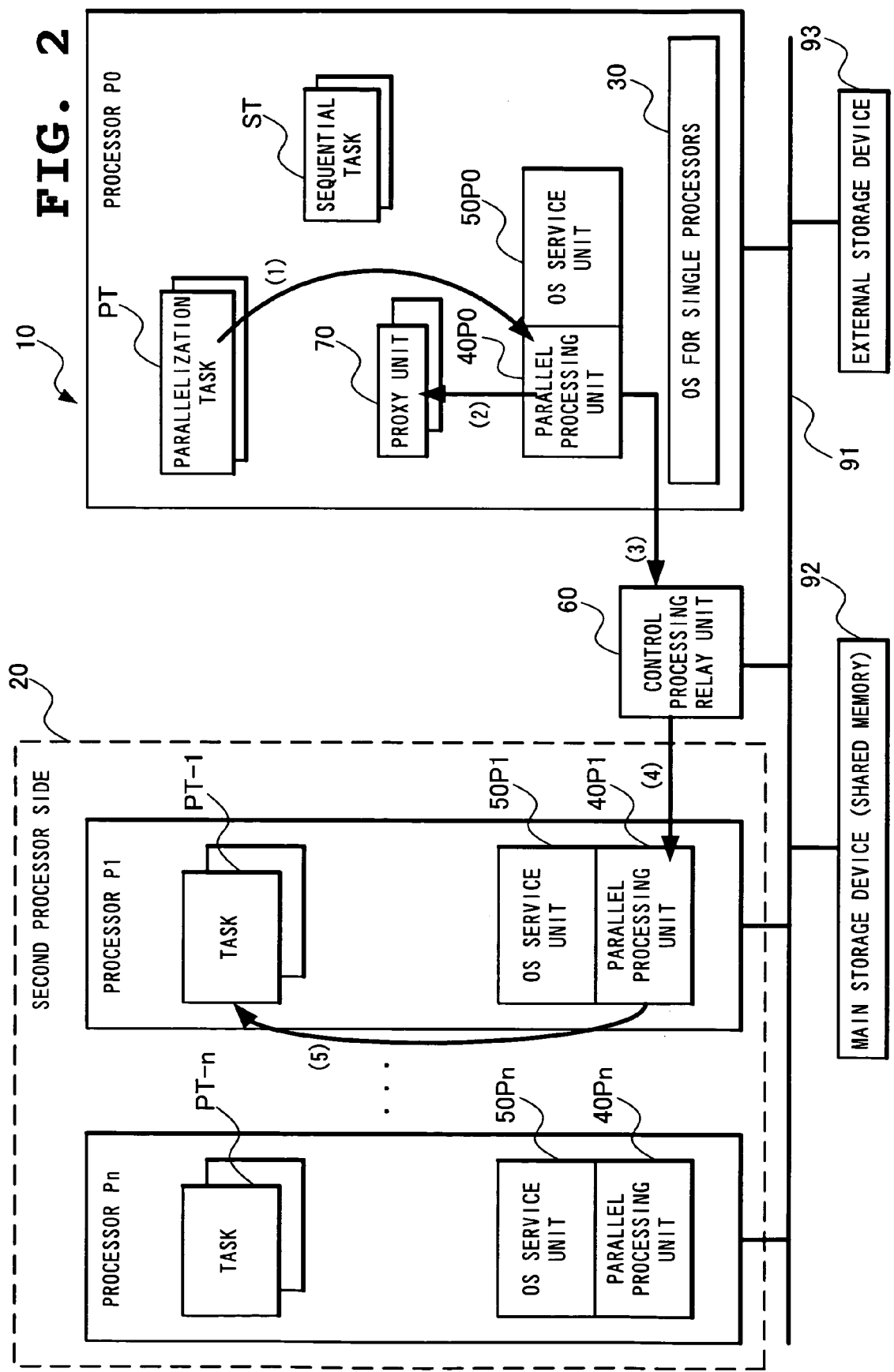
FIG. 2 is a diagram for use in explaining operation of activating parallel processing by a parallel processing unit in the parallel processing system according to the first example.

First, description will be made of operation of activating parallel processing by the parallel processing units 40P0 and 40P1~40Pn with reference to FIGS. 2 and 3.

(1) In a case of activating the parallelization task PT on the first processor side 10 as any of the tasks PT-1 to PT-n on the second processor side 20, command the parallel processing unit 40P0 to create any of the tasks PT-1 to PT-n as a unit of work to be activated on the second processor side 20.

Commands from the parallel processing unit 40P0 and the parallel processing units 40P1 to 40Pn include, for example, create (task creation), delete (task deletion), activate (task activation), terminate (task termination), signal (signal command), etc. Among those commands, create (task creation), delete (task deletion), activate (task activation) and terminate (task termination) are commands sent from the first processor side 10 to the second processor side 20 and a signal (signal command) is sent bidirectionally both from the first processor side 10 and the second processor side 20.

Figure 3:
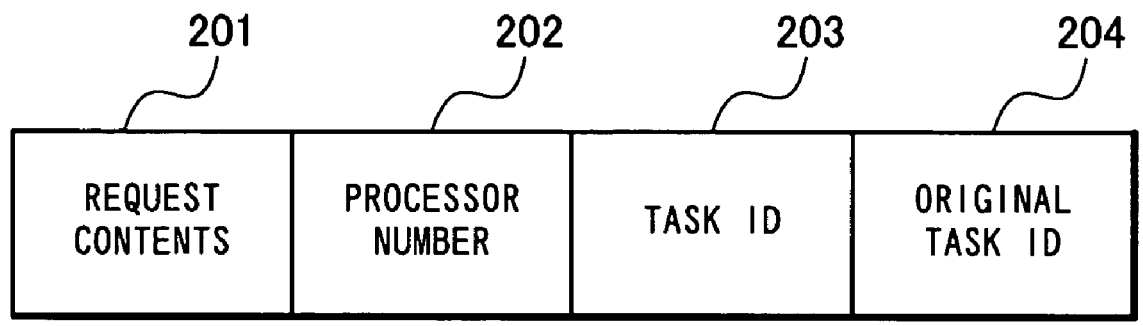
FIG. 3 is a diagram showing arrangement of a message for making a request in the parallel processing activation by the parallel processing unit of the parallel processing system.

These commands are made by a message as shown in FIG. 3. More specifically, by transmitting to the parallel processing unit 40P0 a message composed of a request contents 201 indicative of the contents of a request (task creation in this case), a processor number 202 designating the processor P1~Pn on the second processor side 20 which is to process the task, a task number indicative of the task PT-1~PT-n to be newly created and an original task number indicative of a parallelization task PT requesting task creation, task creation is requested. As to other commands than the task creation, the commands will be sent according to the message shown in FIG. 3.

(2) The parallel processing unit 40P0 responsively activates the proxy unit 70 corresponding to the task PT-1~PT-n to be created. The proxy unit 70 is activated in order to prevent management contents of the task from being shared between the first processor side 10 and the second processor side 20 and to complete the exclusive processing on the first processor side 10. At this time, the task number of the task PT-1~PT-n is held in the proxy unit 70.

(3) The parallel processing unit 40P0 further sets data necessary for task creation such as the above-described task number and request contents (task creation on the processors P1 to Pn on the second processor side 20) and communication reason information designating "parallel processing" at the control processing relay unit 60.

This processing results in conducting, for the control processing relay unit 60, setting of contents to be communicated to the main storage device 92 (shared memory) which will be described later and processing for inter-processor interruption.

Here, communication reason information represents a recipient (accepter) of data transferred to the control processing relay unit 60 and in the above-described case, data set in the control processing relay unit 60 will be obtained by the parallel processing unit 40P1~40Pn of the designated processor P1~Pn.

(4) The parallel processing unit 40P1~40Pn on the designated processor P1~Pn on the second processor side 20 obtains the request contents (data required for task control) having "parallel processing" as the communication reason information from the control processing relay unit 60.

(5) Then, the parallel processing unit 40P1~40Pn creates and activates the task PT-1~PT-n on the processor P1~Pn based on the request contents obtained.

The foregoing processing enables a unit of work of the parallelization task PT as a unit of work of the application operating on the OS for single processors on the first processor side 10 to be parallel-processed as the task PT-1~PT-n on the second processor side 20.

Although the foregoing operation has been described with respect to a case where the parallel processing units 40P1 to 40Pn create and activate the tasks PT-1 to PT-n on the processors P1 to Pn based on the obtained request contents, the parallelization task PT on the first processor side 10 may be created in advance as any of the tasks PT-1 to PT-n on the second processors side 20 and the parallel processing units 40P1 to 40Pn may activate the tasks PT-1 to PT-n on the processors P1 to Pn based on the obtained request contents.

Next, description will be made of OS service processing operation conducted by the OS service units 50P0 and 50P1~50Pn.

The OS service units 50P0 and 50P1~50Pn have a function of providing, based on a command from the tasks PT-1 to PT-n created on the processors P1 to Pn on the second processor side 20, services related to various kinds of accesses to an external apparatus and control of the same and various kinds of accesses to a resource shared by other task and control of the same which are the services by the OS30 for single processors. The main target services provided by the OS30 for single processors are equivalents of a system call and an API provided by an ordinary OS.

Figure 4:
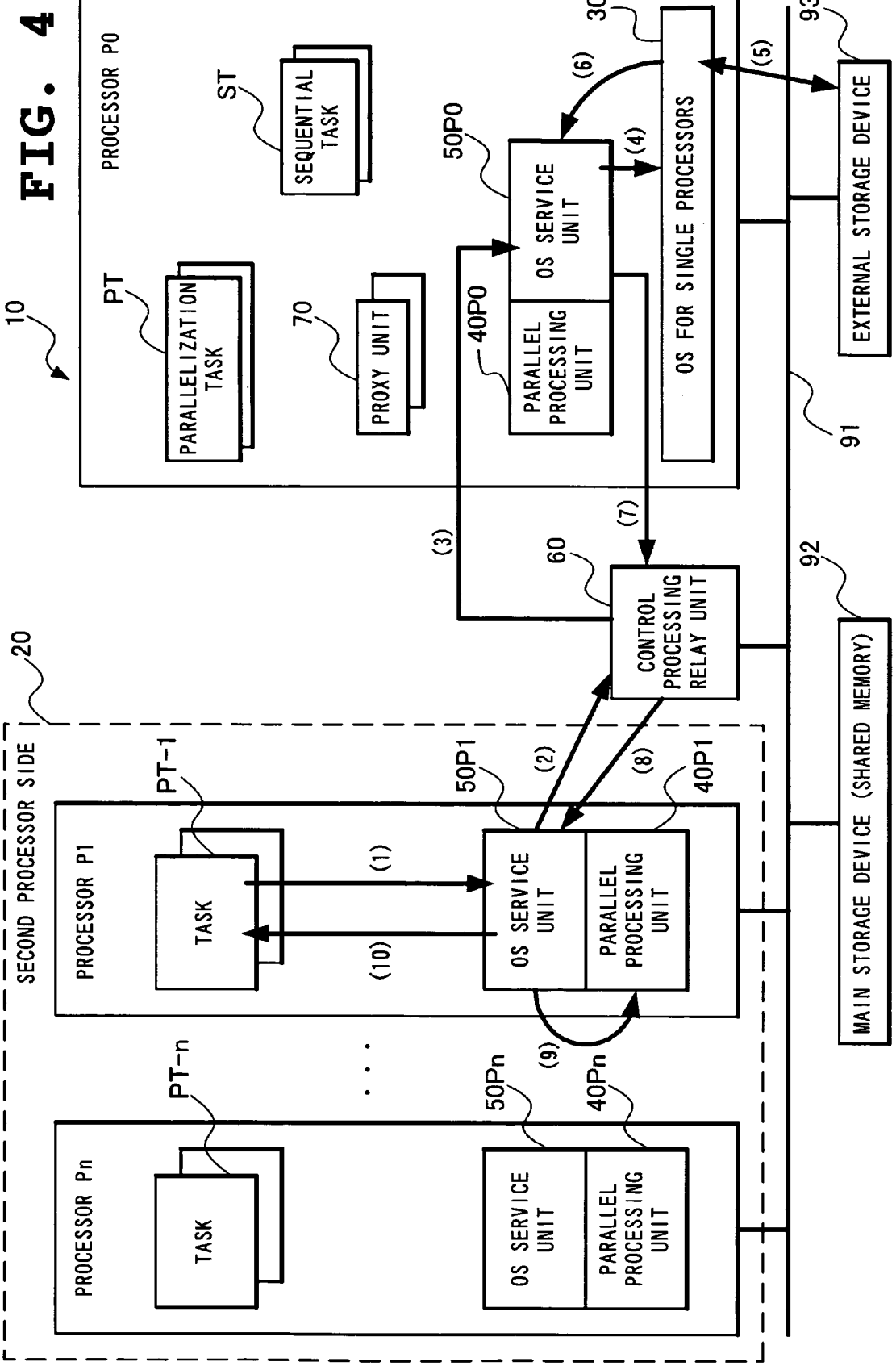
FIG. 4 is a diagram for use in explaining operation of an OS service unit to be conducted in response to a file access request from a task on a second processor side in the parallel processing system according to the first example.

Description will be made of operation of the OS service units 50P0 and 50P1 to 50Pn in response to a file access (e.g. various kinds of processing with respect to a file on the external storage device 93) command from the tasks PT-1 to PT-n on the processors P1 to Pn on the second processor side 20 with reference to FIG. 4.

Here, file access includes such processing as open (open a file), close (close a file), read (read a file), write (write a file), seek (move a file writing position), remove (delete a file) and rename (change a file name).

(1) When the need of file access processing arises in the tasks PT-1 to PT-n on the second processor side 20, the tasks PT1 to PTn request the OS service units 50P1 to 50Pn on the second processor side 20 to provide services for file access. Called up by this file access service command, for example, are a write function defined as processing of writing to a file by the OS service units 50P1 to 50Pn and a read function defined as file reading processing.

Here, the OS service units 50P1 to 50Pn set data necessary for the processing (file access processing by the OS30 for single processors) on the first processor side 10. Necessary data here includes such information as a request content (e.g. write request), a descriptor of a file to be accessed (file descriptor), a pointer to a character string, a length of a character string and a task number.

(2) With the communication reason information "OS service", by setting the necessary data containing the request contents at the control processing relay unit 60, the OS service unit 50P1~50Pn issues a file access command to the first processor side 10.

Thereafter, the task PT-1~PT-n having issued the service command for file access enters a waiting state and in the corresponding processor P1~Pn, processing is switched to other task by the parallel processing unit 40P1~40Pn (task switching).

(3) The OS service unit 50P0 on the first processor side 10 obtains, from the control processing relay unit 60, the above-described file access command having "OS service" as the communication reason information.

(4) The OS service unit 50P0 on the first processor side 10 requests file access from the OS30 for single processors according to the obtained request contents.

(5) As a result, the OS30 for single processors makes a file access (write, read or the like) to the external storage device 93 based on the command. This file access processing is executed using the file access service without modification which the OS30 for single processors originally has.

(6) Upon completion of the requested file access processing, the OS30 for single processors sends a returned value for the file access command back to the OS service unit 50P0 on the first processors side 10 to return the processing.

(7) Furthermore, the OS service unit 50P0 sets the communication content, which is data including the returned value and the task number of the task PT-1~PT-n that has requested the file access, at the control processing relay unit 60 with "OS service" as the communication reason information, thereby notifying the processors P1-Pn on the second processor side 20 of the completion of the file access.

(8) The OS service unit 50P1~50Pn of the corresponding processor P1~Pn receives thus set returned value and the notification of completion from the control processing relay unit 60.

(9) Then, the OS service unit 50P1~50Pn on the second processor side 20 asks the parallel processing unit 40P1~40Pn to activate the task PT1~PT-n which has given the file access command.

As a result, the processing switches to the task PT-1~PT-n at the waiting state.

(10) The task PT-1~PT-n activated by the parallel processing unit 40P1~40Pn receives the returned value of the file access from the OS service unit 50P1~50Pn to continue the processing.

The foregoing processing enables, without providing an individual processing unit for file access on the second processor side 20, the task PT-1~PT-n on the second processor side 20 to make file access while using the service of the OS30 for single processors without modification. Also with this arrangement, exclusive processing for file access is completed on the first processor side 10, so that parallel processing can be realized with no overhead caused by such exclusive processing as in operating an application on an OS for multiprocessors.

In a case where the task PT-1~PT-n on the processor P1~Pn on the second processor side 20 makes file access to read-only data on the external storage device 93, for example, direct access may be made to the external storage device 93 from each processor P1~Pn without such processing by the OS service unit 50P1~50Pn as described above.

Figure 5:
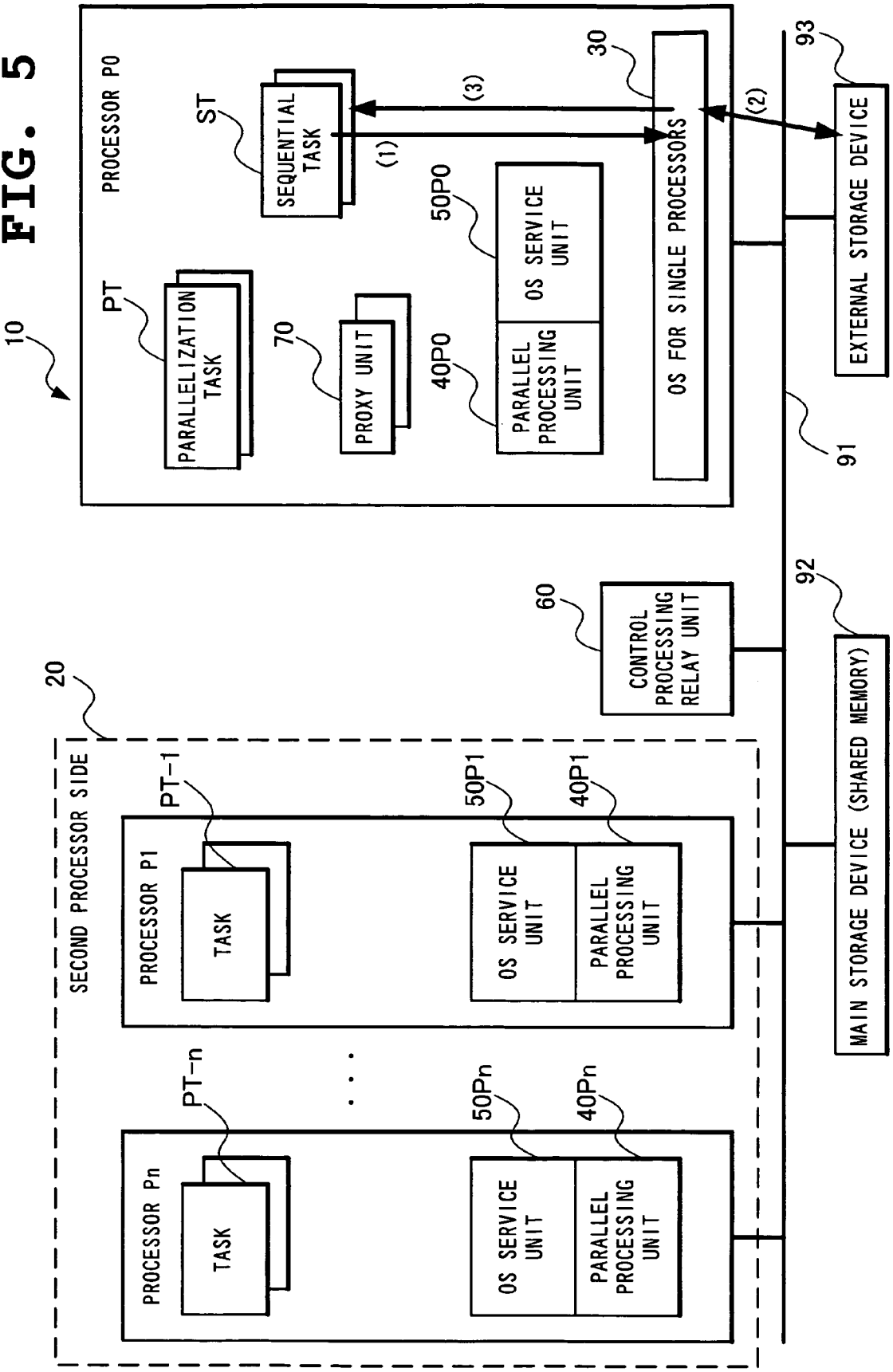
FIG. 5 is a diagram for use in explaining operation executed in response to a file access request from a sequential task on a first processor side.

Here, as to a file access command from the sequential task ST on the processor P0 on the first processor side 10, the processing is directly executed by the OS30 for single processors without using the OS service unit. In the following, the processing will be described with reference to FIG. 5.

(1) The sequential task ST on the processor P0 requests the OS30 for single processors to make file access.

(2) As a result, the OS30 for single processors conducts file access (write, read, etc.) to the external storage device 93 or the like based on the command. The file access processing is executed by using the file access service that the OS30 for single processors originally has without modification.

(3) When the file access processing is completed, the OS30 for single processors sends a returned value for the file access command back to the sequential task ST to return the processing.

Since in response to the OS service command from the sequential task ST, mutual exclusive control or the like is unnecessary, no extra overhead will be generated.

Processing operation by the control processing relay unit 60 will be described with reference to FIGS. 6 and 7.

Figure 6:
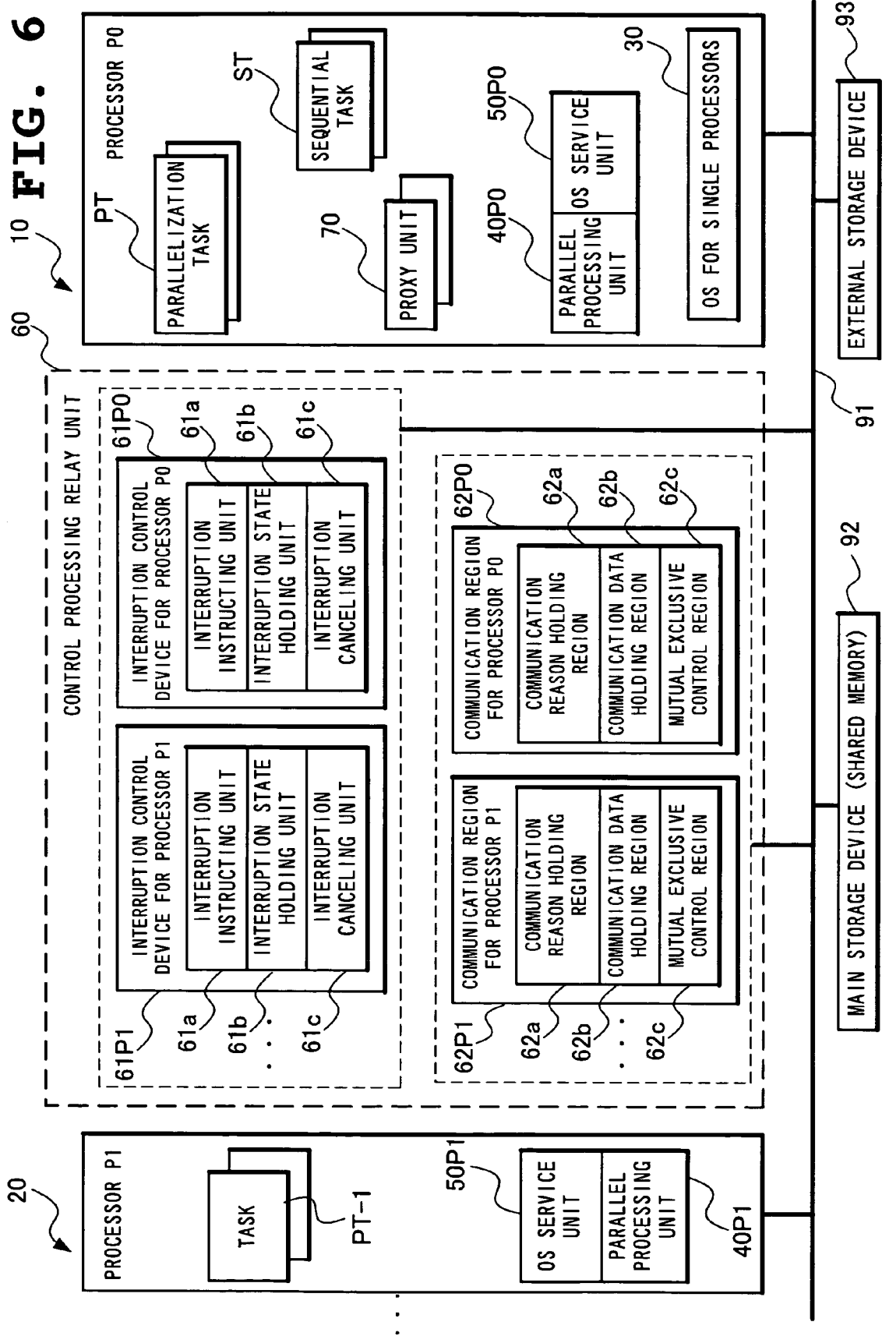
FIG. 6 is a block diagram showing an internal structure of a control processing relay unit in the parallel processing system according to the first example.
Figure 7:
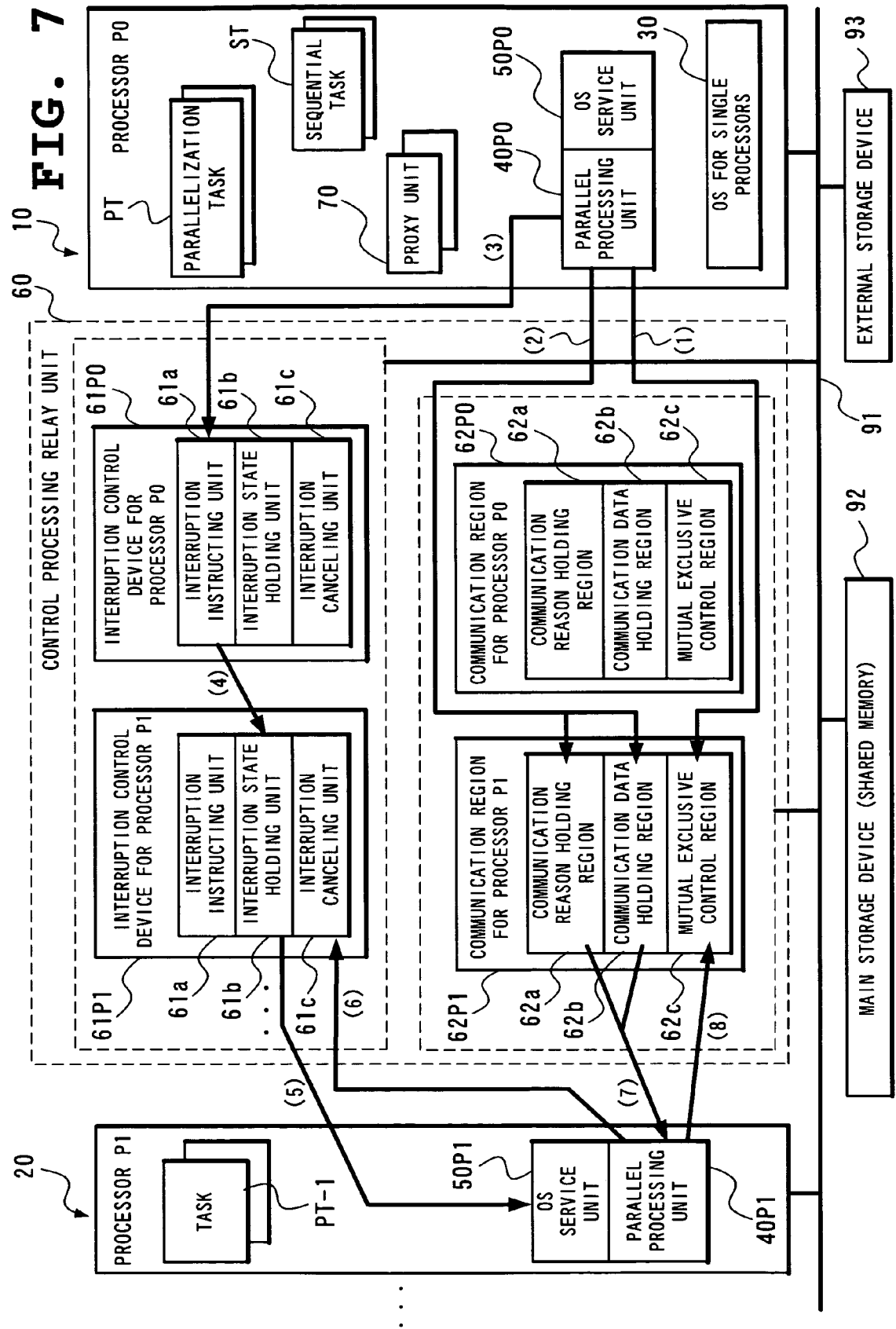
FIG. 7 is a diagram for use in explaining processing operation of the control processing relay unit in the parallel processing system according to the first example.

First, structure of the control processing relay unit 60 is shown in FIG. 6. As illustrated in the figure, the control processing relay unit 60 includes interruption control devices 61P0 to 61Pn corresponding to the respective processors P0 to Pn and communication regions 62P0 to 62Pn corresponding to the respective processors P0 to Pn. Here, the communication regions 62P0 to 62Pn are ensured in the main storage device 92.

The interruption devices 61P0 to 61Pn each further include an interruption instructing unit 61*a* for instructing other processor on an interruption, an interruption state holding unit 61*b* for holding information that an interruption is made in response to an interruption instruction and an interruption canceling unit 61*c* for clearing an interruption.

The communication regions 62P0 to 62Pn each include a communication reason holding region 62*a* for holding communication reason information from a processor as a communication source, a communication data holding region 62*b* for holding communication data to be communicated and a mutual exclusive control region 62*c* for locking a communication region in order to ensure communication.

At this time point, in the communication data holding region 62*b*, a pointer to the main storage device 92 will be stored, in which communication data to be communicated (necessary data including request contents) is stored.

Operation will be described with respect to processing of communication from the parallel processing unit 40P0 on the first processor side 10 to the processor P1 on the second processor side 20 as an example with reference to FIG. 7.

(1) The parallel processing unit 40P0 locks the mutual exclusive control region 62*c* of the communication region 62P1 for the processor P1. More specifically, by bringing a lock variable stored in the mutual exclusive control region 62*c* to a locked state, prevent the communication region 62P1 for the processor P1 in question from being used by other processor.

When the region is already locked by other processor, wait for the lock to be released.

(2) When the lock of the communication region 62P1 is obtained, the parallel processing unit 40P0 stores the communication reason information and the communication data (necessary data including request contents) in the communication reason holding region 62a and the communication data holding region 62b of the communication region 62P1, respectively.

Communication reason information to be stored is, in a case of communication processing for creating a task as described above, information indicative of "parallel processing" (e.g. data such as a numerical value predetermined corresponding to the parallel processing).

(3) The parallel processing unit 40P0 instructs the interruption instructing unit 61a of its own interruption control device 61P0 to interrupt the processor P1.

(4) The interruption instructing unit 61a of the interruption control device 61P0 sets the information indicative of the interruption at the interruption state holding unit 61b of the interruption control device 61P1 corresponding to the processor P1. This brings the processor P1 to an interrupted state.

(5) The parallel processing unit 40P1 of the processor P1 determines from the state of the interruption state holding unit 61b of the interruption control device 61P1 in the control processing relay unit 60 that the interruption is set.

(6) The parallel processing unit 40P1 of the processor P1 releases itself from the interrupted state by clearing the interruption information in its own interruption state holding unit 61b of the control processing relay unit 60.

(7) The parallel processing unit 40P1 of the processor P1 obtains the communication reason information and the communication data (required data including the request contents) from the communication reason holding region 62a and the communication data holding region 62b of its own communication region 62P1 in the control processing relay unit 60, respectively.

(8) Upon being allowed to receive next communication, the parallel processing unit 40P1 of the processor P1 releases the lock of the mutual exclusive control region 62c of its own communication region 62P1. More specifically, by bringing the lock variable stored in the mutual exclusive control region 62c to the unlocked state, the communication region 62P1 for the processor P1 in question is released so that it may be used by other processor.

Thus, using the control processing relay unit 60 realizes transmission and reception of control signals and data between the first processor side 10 and the second processor side 20.

Figure 8:
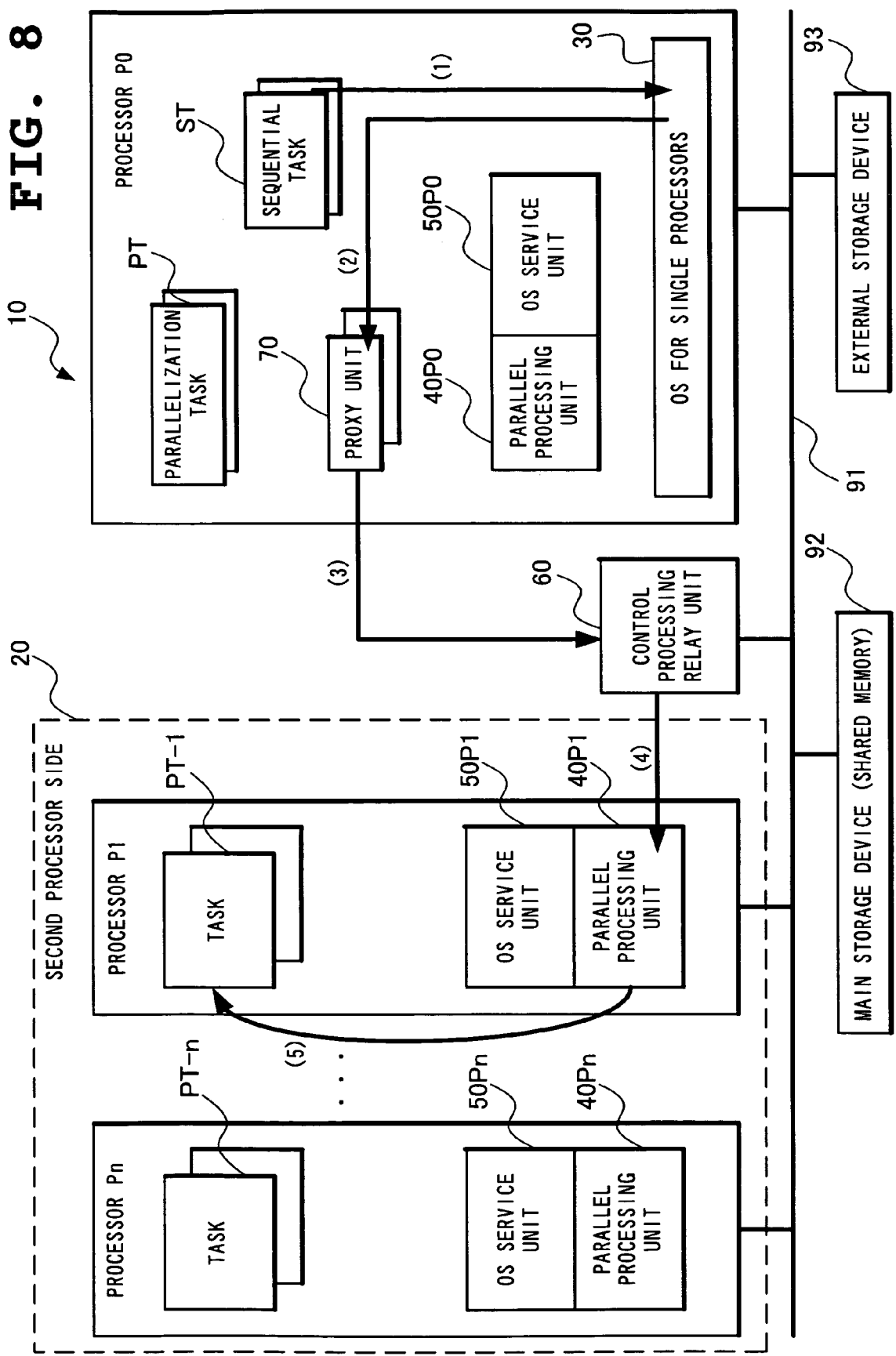
FIG. 8 is a diagram for use in explaining signal notification processing operation by a proxy unit in the parallel processing system according to the first example.

Operation of signal notification processing by the proxy unit 70 will be described with reference to FIG. 8.

The proxy unit 70 has a function of enabling the OS30 for single processors to communicate with the tasks PT-1 to PT-n generated on the second processor side 20 by using a signal (control signal). The task numbers of the corresponding tasks PT-1 to PT-n are held in the proxy unit 70.

The proxy unit 70 may be one-to-one associated with each of the plurality of tasks PT-1 to PT-n, or the plurality of tasks PT-1 to PT-n may be associated with one proxy unit 70.

(1) The sequential task ST on the first processor side 10 requests signal notification service from the OS30 for single processors. The signal communicated by the signal notification is a control signal for controlling the tasks PT-1 to PT-n activated on the respective processors P1 to Pn on the second processor side 20 by the service function which the OS30 for single processors originally has.

(2) The OS30 for single processors notifies the signal to the corresponding proxy unit 70.

(3) Through the control processing relay unit 60, the proxy unit 70 notifies the notified signal to the processor P1~Pn in which its corresponding task PT-1 exists on the second processor side 20. At this point, "parallel processing" is set as the communication reason information.

(4) Since the communication reason information to the control processing relay unit 60 is "parallel processing", the parallel processing unit 40P1~40Pn of the corresponding processor on the second processor side 20 obtains a signal notification command from the control processing relay unit 60.

(5) The parallel processing unit 40P1~40Pn having obtained the signal notification command notifies the corresponding task PT-1~PT-n of the signal (control signal).

Thus, since the proxy unit 70 is associated with the task PT-1~PT-n on the processor P0~Pn on the second processor side 20 by the task number, the signal notification service by the OS30 for single processors can be performed on the first processor side 10 with respect to the tasks PT-1 to PT-n.

Lastly, inter-task cooperative operation on the second processor side 20 will be described with reference to FIGS. 9 and 10.

Figure 9:
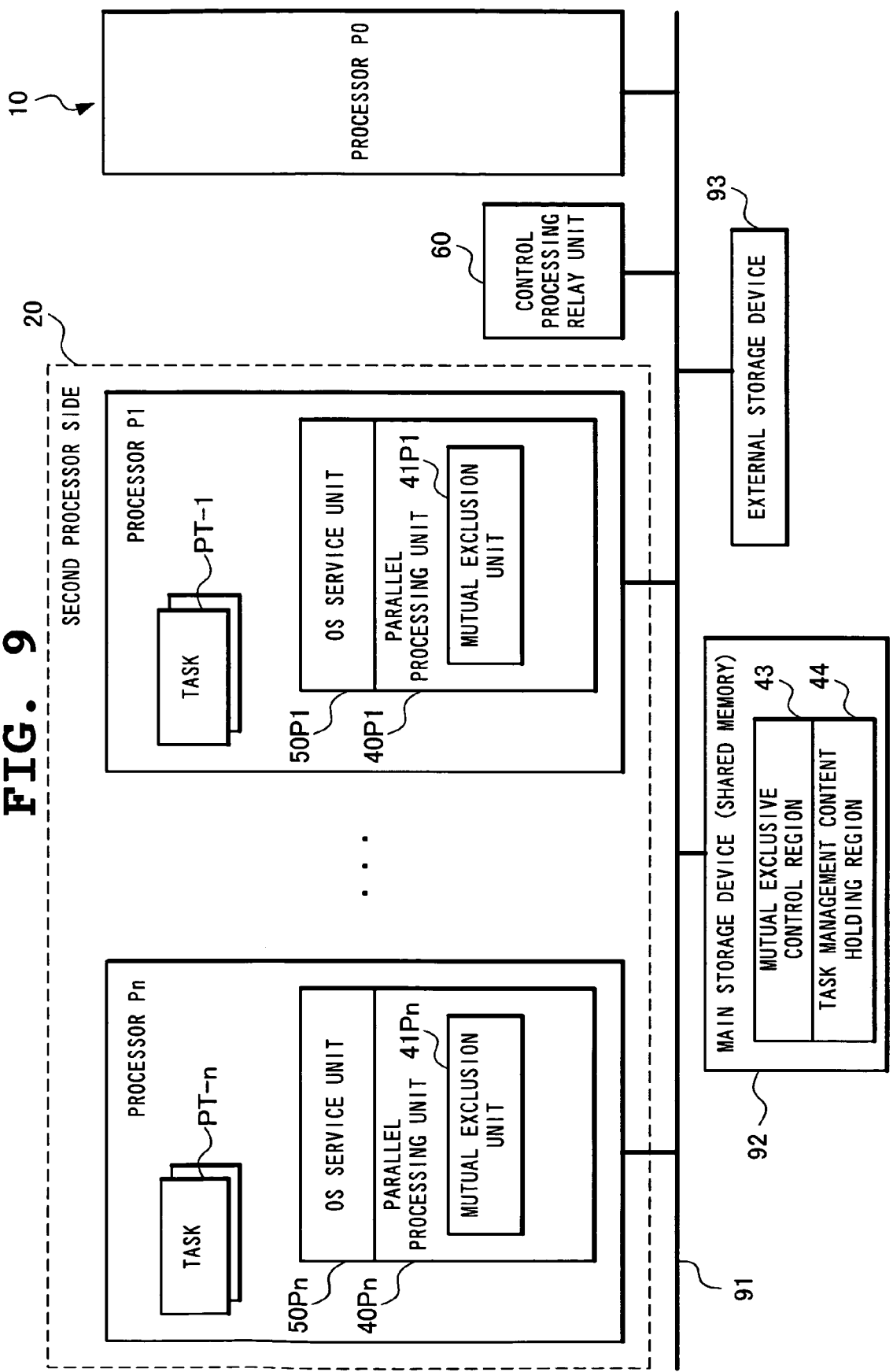
FIG. 9 is a block diagram showing a structure for realizing cooperative operation between tasks on the second processor side in the parallel processing system according to the first example.
Figure 10:
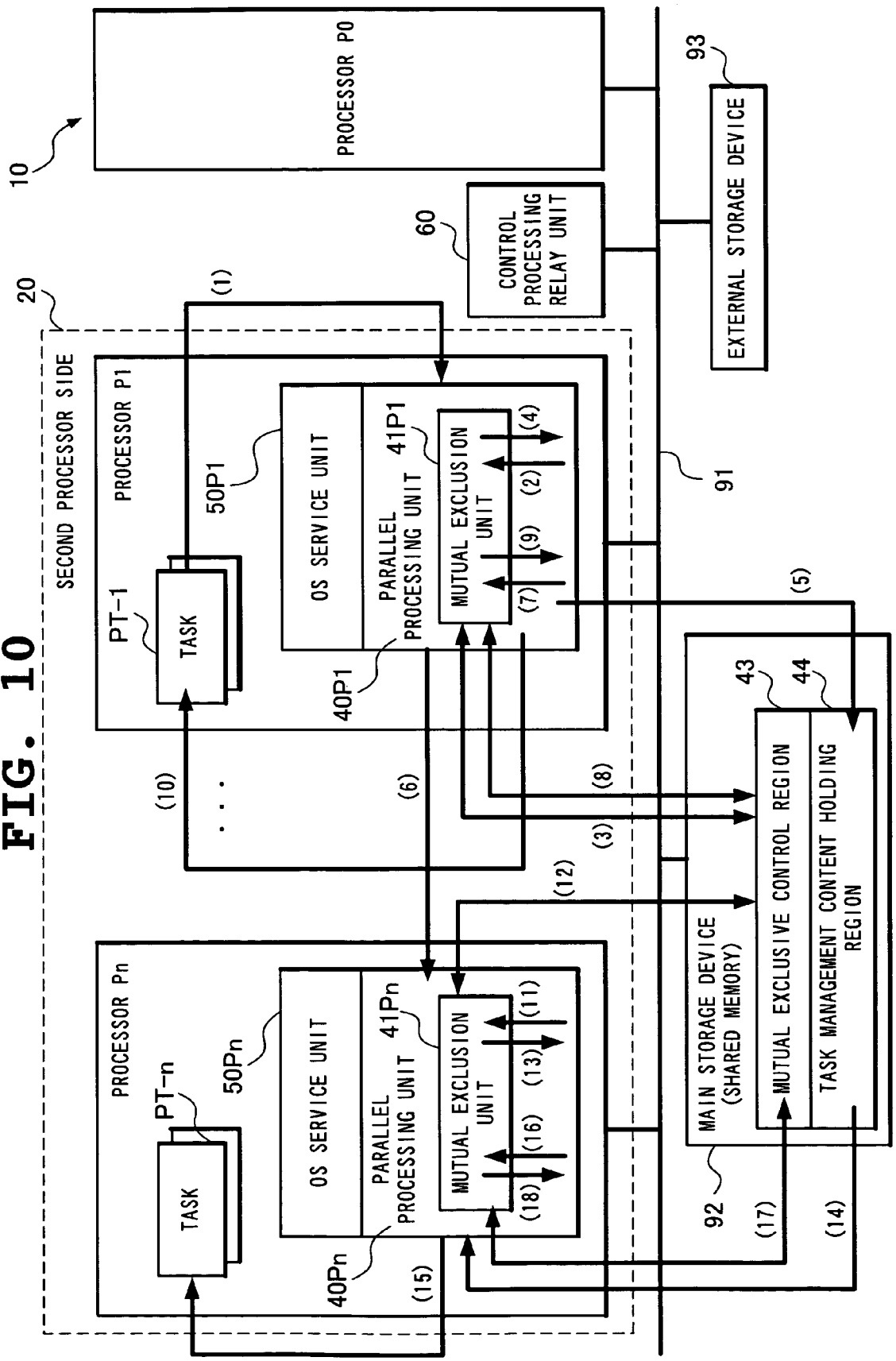
FIG. 10 is a diagram for use in explaining cooperative operation between tasks on the second processor side in the parallel processing system according to the first example.

FIG. 9 shows the structure of the parallel processing units 40P1 to 40Pn for obtaining cooperation among the tasks. As illustrated in the figure, the parallel processing units 40P1 to 40Pn are provided with mutual exclusion units 41P1 to 41Pn.

The main storage device 92 also includes a mutual exclusive control region 43 and a task management content holding region 44 to obtain task cooperation.

(1) The task PT-1 on the processor P1 requests desired parallel processing from its own parallel processing unit 40P1.

(2) The parallel processing unit 40P1 of the processor P1 requests lock acquisition from the mutual exclusion unit 41P1 in order to ensure the resources for use in parallel processing.

(3) The mutual exclusion unit 41P1 obtains the lock by using the mutual exclusive control region 43 of the main storage device 92.

(4) The mutual exclusion unit 41P1 notifies the parallel processing unit 40P1 that the lock has been obtained.

(5) The parallel processing unit 40P1 holds, in the task management content holding region 44, the management content (request contents, task number and other required data) of the task PT-1 having requested parallel processing on the processor P1.

(6) The parallel processing unit 40P1 interrupts other processor P2~Pn which is executing a low-priority task. Assume here that the processor Pn is interrupted.

(7) The parallel processing unit 40P1 asks the mutual exclusion unit 41P1 to release thus ensured lock.

(8) The mutual exclusion unit 41P1 unlocks the mutual exclusive control region 43 of the main storage device 92.

(9) The mutual exclusion unit 41P1 notifies the parallel processing unit 40P1 of the completion of the unlocking.

(10) The parallel processing unit 40P1 returns the processing to the task PT-1.

(11) The parallel processing unit 40Pn of the processor Pn requests lock acquisition from the mutual exclusion unit 41Pn in order to ensure the resources for use in parallel processing.

(12) The mutual exclusion unit 41Pn obtains the lock by using the mutual exclusive control region 43 of the main storage device 92.

(13) The mutual exclusion unit 41Pn notifies the parallel processing unit 40Pn of the completion of the lock acquisition.

(14) The parallel processing unit 40Pn obtains the task management contents stored in the task management content holding region 44.

(15) The parallel processing unit 40Pn creates and activates a new task based on the task management contents.

(16) The parallel processing unit 40Pn requests, from the mutual exclusion unit 41Pn, release of thus ensured lock.

(17) The mutual exclusion unit 41Pn unlocks the mutual exclusive control region 43 of the main storage device 92.

(18) The mutual exclusion unit 41Pn notifies the parallel processing unit 40Pn of the completion of the unlocking.

Such task cooperative operation as described above allows the task PT-1~PT-n activating on a certain processor P1~Pn to have its own unit of work be parallel-processed by other processor.

As an example of applications to thus structured parallel processing system, description will be made of a case where the application is operated on a mobile terminal of a multiprocessor.

Figure 11:
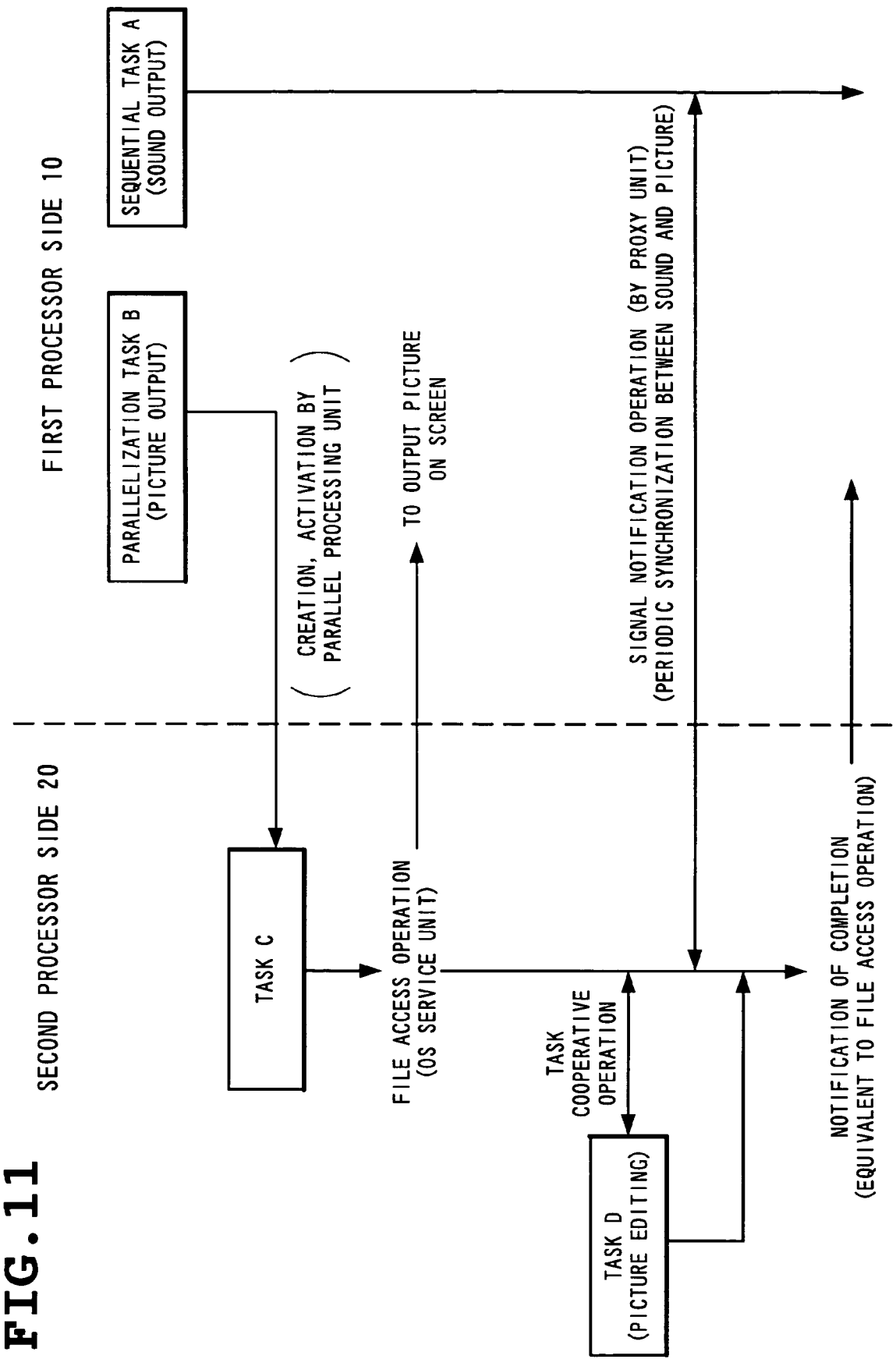
FIG. 11 is a diagram for use in explaining a case of operating an application on a mobile terminal of a multiprocessor as an example of application to the parallel processing system.

Here, the description will be made with reference to FIG. 11, assuming a case where with the application having a function of reproducing picture (moving picture) and sound simultaneously on a mobile terminal and with sound output processing being defined as a sequential task A and picture output processing being defined as a parallelization task B, the application is operated on the processor P0 on the first processor side 10.

The parallelization task B is created and activated as a task C on any of the processors P1 to Pn on the second processor side 20 by the above-described parallel processing unit.

The created task C outputs the picture on a screen by file access processing of the OS service unit.

Concerning the sound output by the sequential task A, the sound is output by the service of the OS30 for single processors.

For periodically synchronizing the sound and the picture, synchronization is attained by giving a signal notification between the sequential task A and the task C through the signal notification operation by the proxy unit 70.

In addition, when executing processing of editing the picture in the task C, the editing processing is created and activated as a task D on other processor by task cooperation processing.

When the picture output processing by the task C is completed, the task C notifies the OS for single processors of the termination by the file access operation.

In the present parallel processing system, provision of the parallel processing units 40P0 to 40Pn, the OS service units 50P0 to 50Pn, the control processing relay unit 60 and the proxy unit 70 as modules enables the OS30 for single processors and the application to operate without overheads on a multiprocessor system structure without modifying the OS30 for single processors and the application operated on the processor P0, while receiving benefits from the parallel processing by the multiprocessor.

Figure 12:
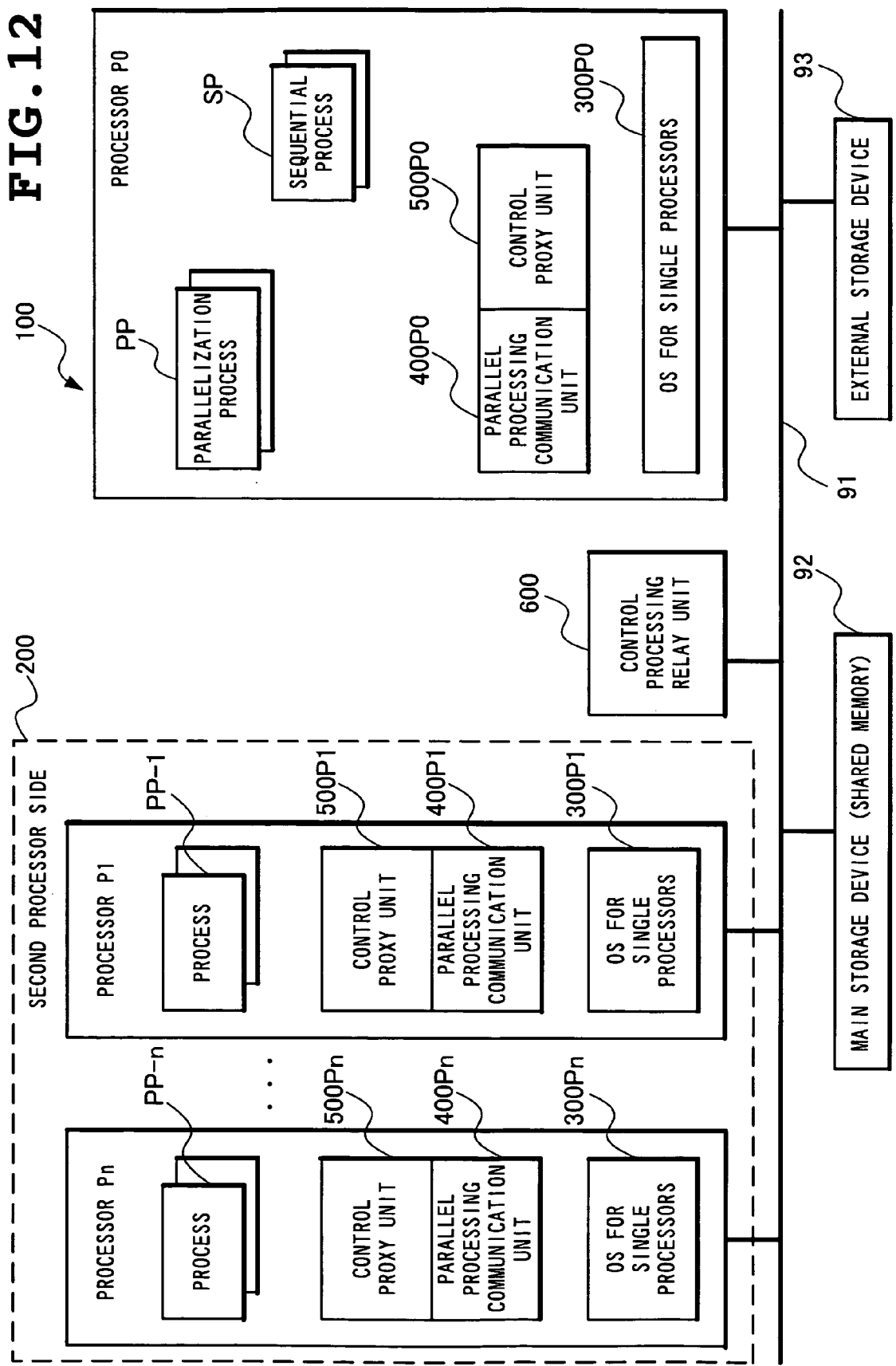
FIG. 12 is a block diagram showing a structure of a parallel processing system according to a second example to which the present invention is applied.

Next, a parallel processing system of a second example to which the present invention is applied will be described with reference to FIG. 12 and the drawings to follow. FIG. 12 is a block diagram showing a structure of the parallel processing system according to the second example, in which components common to FIG. 1 are referenced by the same reference numerals. Illustrated in the second example shown in FIG. 12 is a case where the parallel processing units 40P0 to 40Pn in the first example are formed of parallel processing communication units 400P0 to 400Pn and control proxy units 500P0 to 500Pn, respectively.

As shown in FIG. 12, the parallel processing system of the present example is the same as the first example in that a multiprocessor formed of a plurality of processors (CPU) P0 to Pn (n is an integer not less than 1) connected through a system bus 91 is logically divided into two groups, i.e., a first processor side 100 and a second processor side 200.

In the second example, OSes 300P0 to 300Pn for single processors are provided which operate on the processor P0 on the first processor side 100 and the respective processors (CPU) P0 to Pn on the second processor side 200.

In addition, the parallel processing communication units 400P0 to 400Pn and the control proxy units 500P0 to 500Pn for parallel processing are mounted on the processor P0 on the first processor side 100 and the processors P1 to Pn on the second processor side 200, respectively. A main storage device 92 as a shared memory which is shared among the respective processors P0 to Pn and an external storage device 93 such as a disk device are connected to the system bus 91.

Also, a control processing relay unit 600 is uniquely provided for transmitting and receiving control signals and data between the first processor side 100 and the second processor side 200.

Since regarding the proxy unit 70 shown in the first example through which the OS 300P0 for single processors on the first processor side 100 communicates with processes executed on the second processor side 200, the unit executes completely the same function in the second example as that in the first example, no description will be made here for the sake of convenience.

While in the first example, it has been described that the switching of tasks is performed in response to a file access command from the tasks on the processors PT-1 to PT-n on the second processor side 20, also in the present example, file access from the second processor side 200 is possible and switch of processes PP-1 to PP-n on the second processor side 200 which have given a file access command is conducted by the OSes 300P1 to 300Pn for single processors on the second processor side 200.

As to the OSes 300P0 to 300Pn for single processors mounted on the respective processors P0 to Pn, they are different from those of the first example in that not only OSes having no virtual memory mechanism which realizes a memory protection function such as a real-time OS but also OSes having a virtual memory mechanism such as Linux and Windows ® as existing OSes can be used and that a memory protection mechanism can be realized on all or a part of the processors P0 to Pn.

In addition, the OSes 300P0 to 300Pn for single processors need not be OSes of the same kind but may be OSes of kinds different from each other.

In the present example, the task, which is a unit of work for performing parallel processing, is memory-protected between the processors and in that sense, will be referred to as a process to distinguish from the task in the first example.

In the parallel processing system according to the present example, among the units of work of an application operating on the OS 300P0 for single processors on the first processor side 100, those processes which cannot be parallelized (sequential processes SP) are processed by the processor P0 on the first processor side 100, and those tasks which can be parallelized within the application are created as new processes PP-1 to PP-n on the second processor side 200 and parallel-processed.

The parallel processing communication unit 400P0 and the parallel processing communication units 400P1 to 400Pn have the function of transmitting and receiving control information related to process creation, activation, stop, termination and deletion and other control regarding the processes between the processes and the OSes 300P0 to 300Pn for single processors.

Here, control information and data related to creation, activation, stop, termination, deletion or the like of tasks are transmitted and received between the first processor side 100 and the second processor side 200 through the control processing relay unit 600.

In addition, the control proxy unit 500P0 and the control proxy units 500P1 to 500Pn have the function of obtaining a processing command from the OS 300P0~300Pn for single processors to the process and activating the process.

The control processing relay unit 600 is a unit for transmitting and receiving control signals and data between the first processor side 10 and the second processor side 20 and is used for control between the plurality of processes parallel-processed by the plurality of processors.

In the following, operation of thus structured parallel processing system according to the second example will be described in detail with reference to the drawings.

Assume here that the application operates on the OS 300P0 for single processors on the first processor side 100, and among the units of work of the application, a unit of work to be processed by the processor P0 on the first processor side 100 is defined as a sequential process SP, and units of work which are processes that can be parallelized within the application and are parallel-processed by the second processor side 200 as the tasks PP-1 to PP-n are defined as a parallelization process PP.

In the parallel processing system in the second example, after a certain process (task) is activated, synchronous activation of parallel processing in which the parallelization process PP as a process (task) on the calling side waits for the termination of the activated process PP-1~PP-n and asynchronous activation of parallel processing in which the parallelization process PP as a process (task) on the calling side needs not wait for the termination of the activated process PP-1~PP-n are both possible.

Figure 13:
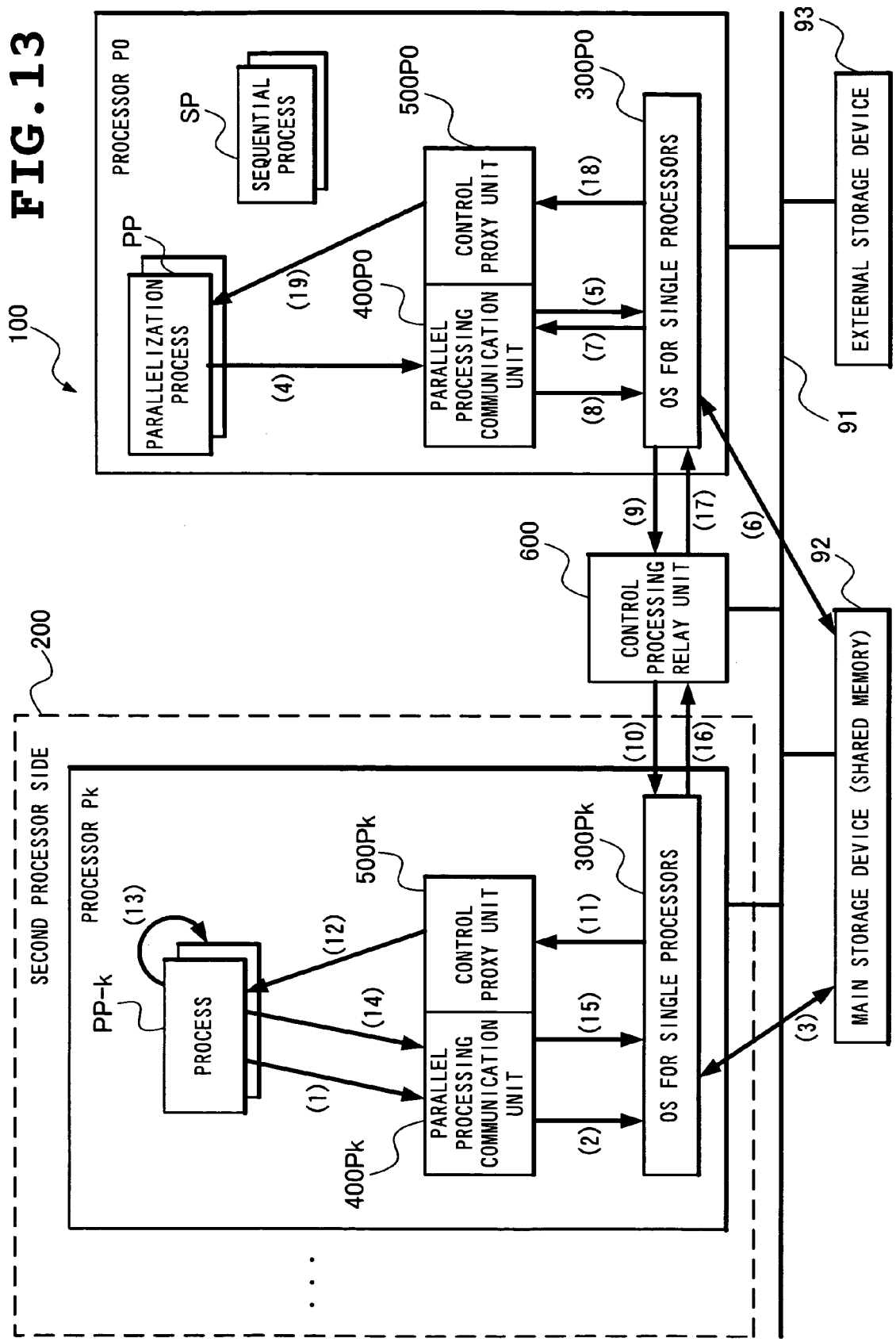
FIG. 13 is a diagram for use in explaining operation of synchronously activating parallel processing of processes in the parallel processing system according to the second example.

First, operation for the synchronous activation of parallel processing of a process will be described with reference to FIG. 13.

Assume here that in a processor Pk ($1 \leq k \leq n$) on the second processor side 200, the parallelization process PP on the first processor side 100 is created in advance as a process PP-k which is a unit of work to be activated on the second processor side 200.

(1) The process PP-k on the processor Pk ($1 \leq k \leq n$) on the second processor side 200 registers, in a parallel processing communication unit 400Pk, the information about the processing belonging to its own process. As a result, the process PP-k enters the standby state.

(2) The parallel processing communication unit 400Pk makes a request for accessing necessary data on the main storage device 92 (shared memory) through an OS 300Pk for single processors.

(3) As a result, the information about the processing belonging to the process PP-k is stored in the main storage device 92 (shared memory).

(4) The process PP on the processor P0 requests synchronous processing from the parallel processing communication unit 400P0. Thereafter, the process PP enters the standby state.

(5) The parallel processing communication unit 400P0 having received the request makes a request to access data on the main storage device 92 (shared memory) through the OS 300P0 for single processors.

(6) The main storage device 92 (shared memory) is accessed by the OS 300P0 for single processors.

(7) The parallel processing communication unit 400P0 obtains the information about processing belonging to the process PP-k from the main storage device 92 (shared memory). Thus, a processor number which executes the process PP-k and a process number are obtained.

(8) The parallel processing communication unit 400P0 makes a communication request based on the information obtained from the main storage device 92 (shared memory) through the OS 300P0 for single processors.

(9) The OS 300P0 for single processors sets the information required for communication at the control processing relay unit 600.

(10) As a result, the processing command is sent from the control processing relay unit 600 to the OS 300Pk for single processors of the processor Pk.

(11) The control proxy unit 500Pk of the processor Pk obtains the processing command sent through the OS 300Pk for single processors.

(12) Then, the control proxy unit 500Pk activates the process PP-k according to the processing command obtained.

(13) As a result, the process PP-k at the standby state executes the processing.

(14) After finishing the processing, the process PP-k notifies the parallel processing communication unit 400Pk of the information to that effect.

(15) The parallel processing communication unit 400Pk having received the notification makes a communication request based on the information notified through the OS 300Pk for single processors.

(16) The OS 300Pk for single processors sets the information required for communication at the control processing relay unit 600.

(17) As a result, the processing command is sent from the control processing relay unit 600 to the OS 300P0 for single processors in the processor P0.

(18) The control proxy unit 500P0 of the processor P0 obtains the processing command sent through the OS 300P0 for single processors.

(19) Then, the control proxy unit 500P0 activates the process PP according to the processing command obtained.

Thus, synchronous processing is realized between the process PP on the processor P0 on the first processor side 100 and the process PP-k on the second processor side 200.

Figure 14:
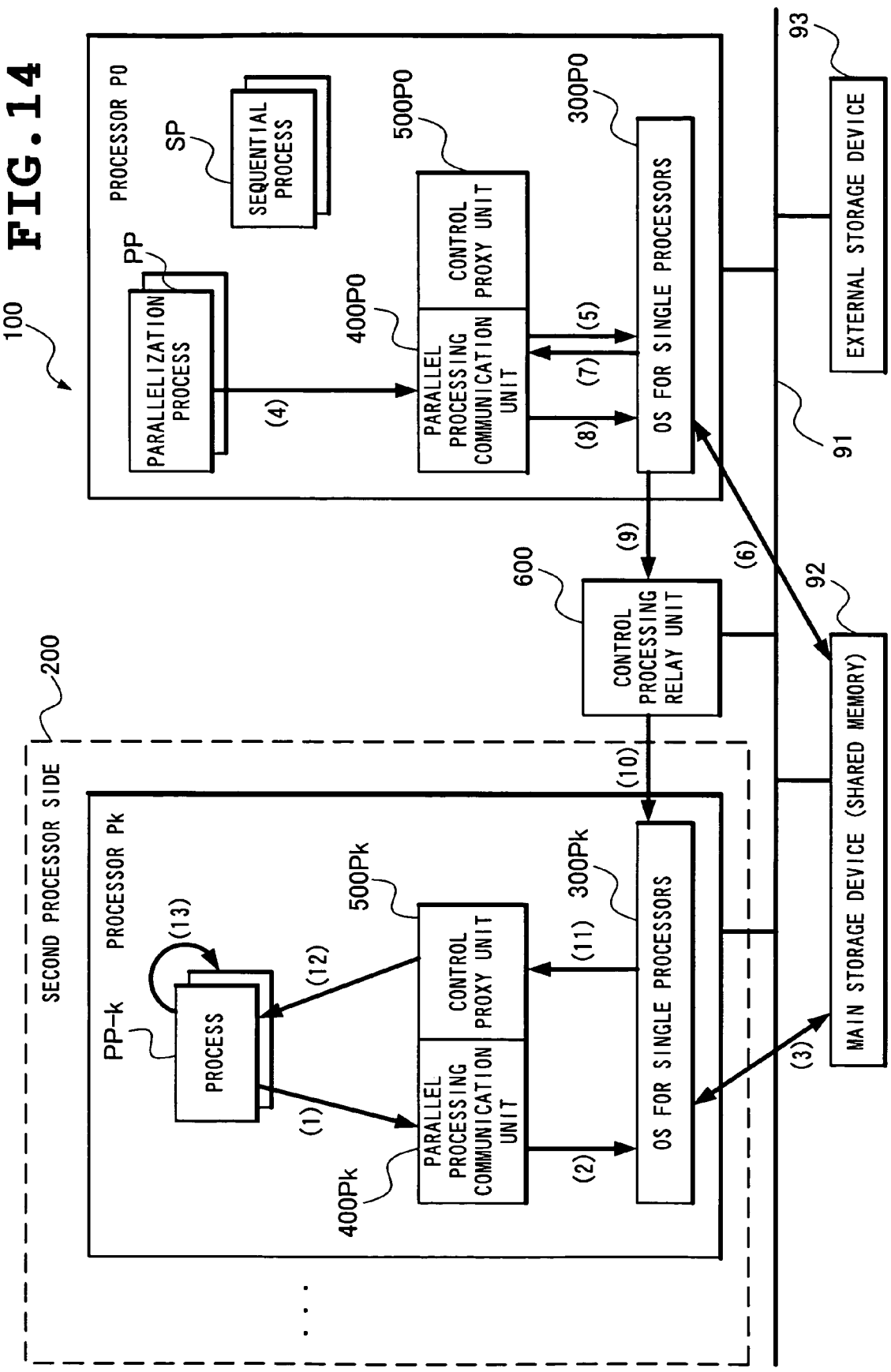
FIG. 14 is a diagram for use in explaining operation of asynchronously activating parallel processing of processes in the parallel processing system according to the second example.

Next, operation for the asynchronous activation of parallel processing of a process will be described with reference to FIG. 14.

Also assume here that in the processor Pk ($1 \leq k \leq n$) on the second processor side 200, the parallelization process PP on the first processor side 100 is created in advance as the process PP-k which is a unit of work to be activated on the second processor side 200.

(1) The process PP-k which was performing the processing on the processor Pk ($1 \leq k \leq n$) on the second processor side 200 registers, in the parallel processing communication unit 400Pk, the information about the processing belonging to its own process. As a result, the process PP-k enters the standby state.

(2) The parallel processing communication unit 400Pk makes a request for accessing required data on the main storage device 92 (shared memory) through the OS 300Pk for single processors.

(3) As a result, the information about processing belonging to the process PP-k is stored in the main storage device 92 (shared memory).

(4) The process PP on the processor P0 requests asynchronous processing from the parallel processing communication unit 400P0. In this case, the process PP thereafter continues the processing without entering the standby state.

(5) The parallel processing communication unit 400P0 having received the request makes an access request for data on the main storage device 92 (shared memory) through the OS 300P0 for single processors.

(6) The main storage device 92 (shared memory) is accessed by the OS 300P0 for single processors.

(7) The parallel processing communication unit 400P0 obtains the information about processing belonging to the process PP-k from the main storage device 92 (shared memory). As a result, a processor number executing the process PP-k and a process number are obtained.

(8) The parallel processing communication unit 400P0 makes a communication request based on the information obtained from the main storage device 92 (shared memory) through the OS 300P0 for single processors.

(9) The OS 300P0 for single processors sets information required for communication at the control processing relay unit 600.

(10) Thus, the processing command is sent from the control processing relay unit 600 to the OS 300Pk for single processors in the processor Pk.

(11) The control proxy unit 500Pk of the processor Pk obtains the processing command sent through the OS 300Pk for single processors.

(12) The control proxy unit 500Pk then activates the process PP-k according to the processing command obtained.

(13) Thus, the process PP-k at the standby state executes the processing.

In the foregoing manner, asynchronous processing is realized between the process PP on the processor PO on the first processor side 100 and the process PP-k on the second processor side 200.

The processing operation by the control processing relay unit 600 in the parallel processing system according to the second example will be described with reference to FIGS. 15 and 16.

Figure 15:
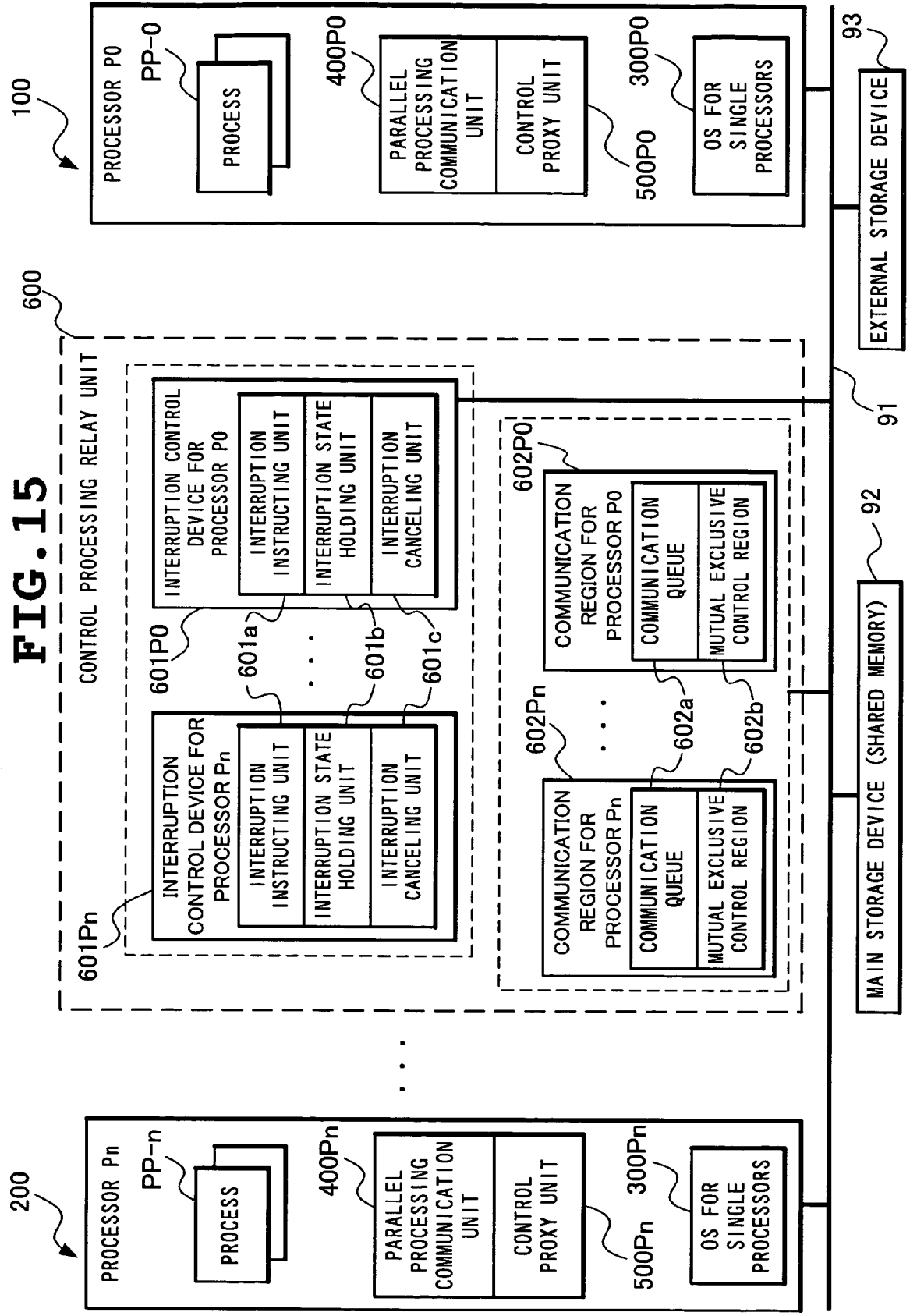
FIG. 15 is a block diagram showing an internal structure of a control processing relay unit in the parallel processing system according to the second example.
Figure 16:
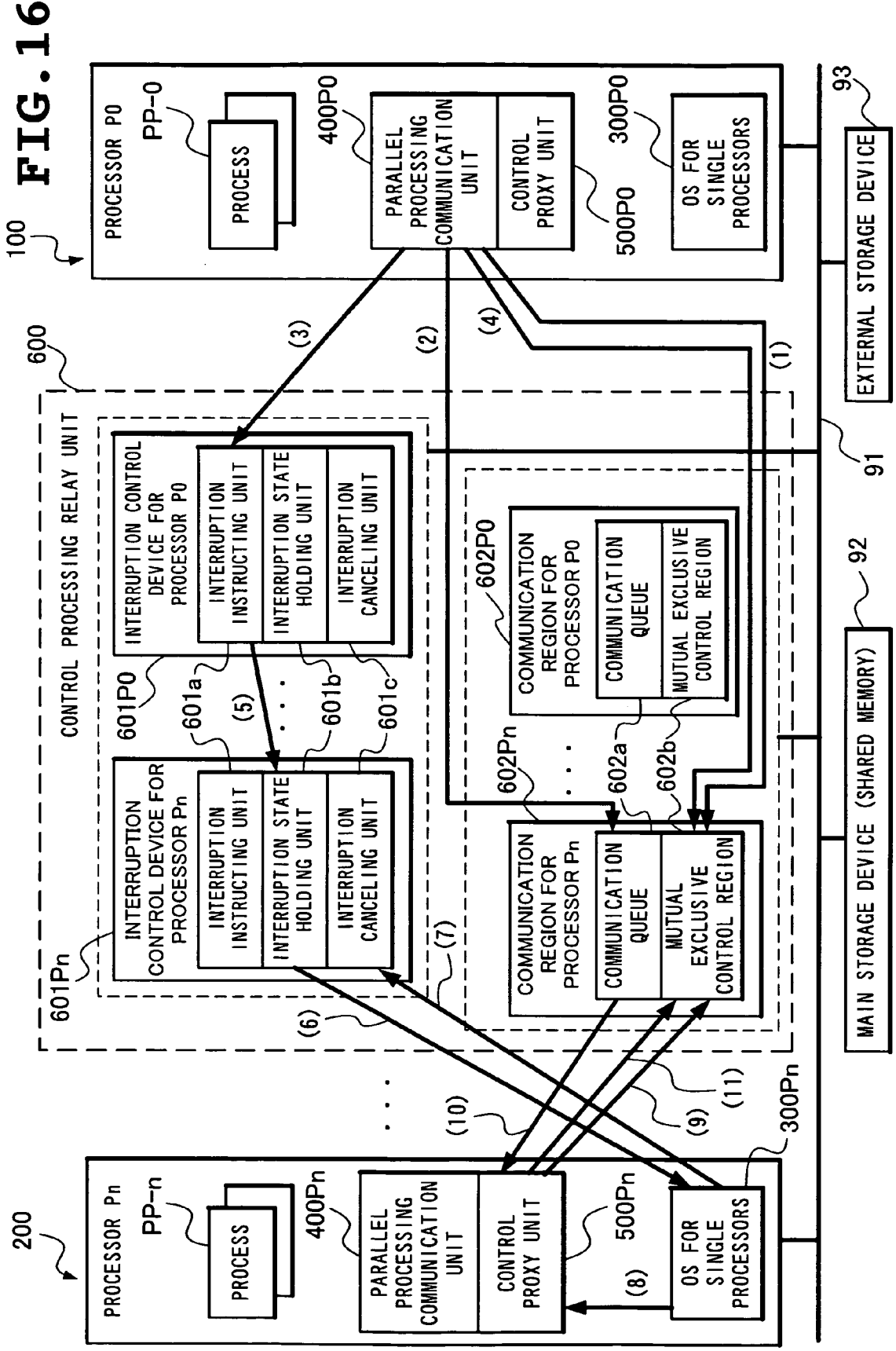
FIG. 16 is a diagram for use in explaining processing operation of the control processing relay unit in the parallel processing system according to the second example.

First, structure of the control processing relay unit 600 is shown in FIG. 15. As illustrated in the figure, the control processing relay unit 600 is structured to include interruption control devices 601P0 to 601Pn corresponding to the respective processors P0 to Pn and communication regions 602P0 to 602Pn corresponding to the respective processors PO to Pn. Here, the communication regions 602P0 to 602Pn are ensured in the main storage device 92.

The interruption control devices 601P0 to 601Pn each have the same structure as that of the control processing relay unit 60 according to the first example shown in FIG. 6 and is formed of an interruption instructing unit 601a, an interruption state holding unit 601b and an interruption canceling unit 601c.

Also, the communication regions 602P0 to 602Pn each basically have the same structure as that of the first example shown in FIG. 6 and is formed of a communication queue 602a as a combination of the communication reason holding region 62a and the communication data holding region 62b shown in FIG. 6, and a mutual exclusive control region 602c.

As an example, operation of the communication processing from the parallel processing communication unit 400P0 on the first processor side 100 to the processor Pn on the second processor side 200 will be described with reference to FIG. 16.

(1) The parallel processing communication unit 400P0 locks the mutual exclusive control region 602b of the communication region 602Pn for the processor Pn. More specifically, bring a lock variable stored in the mutual exclusive control region 602b to a locked state to prevent the communication region 602Pn for the processor Pn in question from being used by other processor.

(2) The parallel processing communication unit 400P0 stores the communication reason information and the communication data (required data including the request contents) in the communication queue 602a of the communication region 602Pn.

As the communication reason information to be stored, in a case of the communication processing for process creation/activation as mentioned above, information indicative of "activation of process" (e.g. data such as a predetermined numeric value corresponding to the parallel processing) is stored.

(3) At the time point of (1), if the communication queue 602a of the communication region 602Pn is empty, the parallel processing communication unit 400P0 instructs the interruption instructing unit 601a of its own interruption control device 601P0 to interrupt the processor Pn.

(4) The parallel processing communication unit 400P0 of the processor P0 brings the mutual exclusive control region 602b of the communication region 602Pn for the processor Pn to the unlocked state. If the communication queue 602a of the communication region 602Pn is not empty at the time point of (1), the processing terminates at this point because no interruption is required.

(5) The interruption instructing unit 601a of the interruption control device 601P0 sets information indicative of an interruption at the interruption state holding unit 601b of the interruption control device 601Pn corresponding to the processor Pn. As a result, the processor Pn enters the interrupted state.

(6) The OS 300Pn for single processors of the processor Pn accepts the interruption based on the condition of the interruption state holding unit 601b of the interruption control device 601Pn for the processor Pn.

(7) The OS 300Pn for single processors in the processor Pn releases its interrupted state by clearing the interruption information of its own interruption state holding unit 601b by means of the interruption canceling unit 601c in the interruption control device 601Pn.

(8) The OS 300Pn for single processors in the processor Pn activates its own control proxy unit 500Pn.

(9) The control proxy unit 500Pn of the processor Pn sets a lock at the mutual exclusive control region 602b of its own communication region 602Pn.

(10) The control proxy unit 500Pn of the processor Pn further deletes the communication reason information and the communication data from the communication queue 602a of its own communication region 602Pn.

(11) The control proxy unit 500Pn of the processor Pn unlocks the mutual exclusive control region 602b of the communication region 602Pn for the processor Pn. This makes the communication region 602Pn for the processor Pn be usable by other processor.

Thus, by using the control processing relay unit 600, transmission and reception of control signals and data between the first processor 100 and the second processor 200 is realized.

Figure 17:
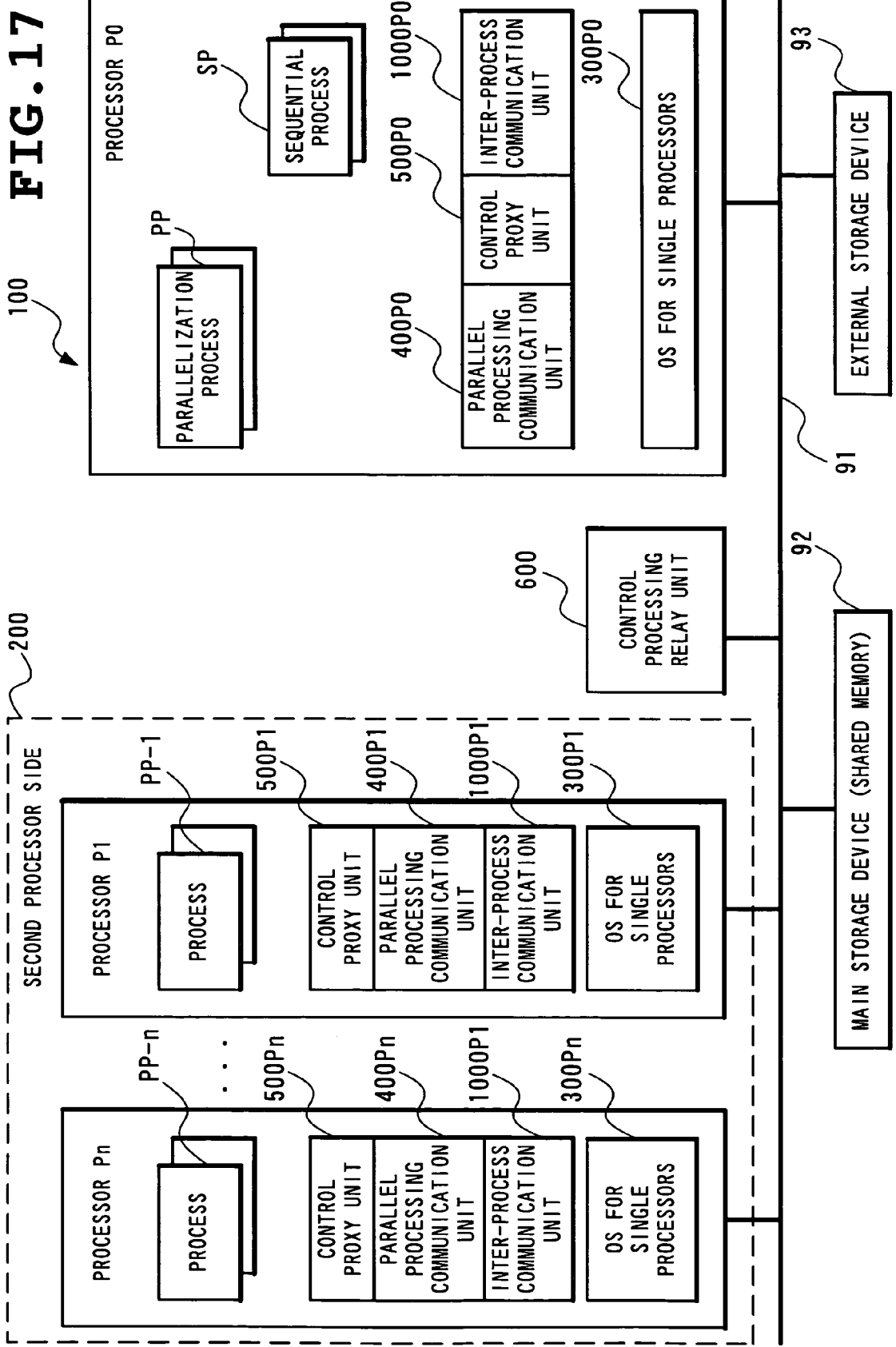
FIG. 17 is a block diagram showing a structure of a parallel processing system according to a third example to which the present invention is applied.

Next, a parallel processing system according to a third example to which the present invention is applied will be described with reference to FIG. 17 and the drawings to follow. FIG. 17 is a block diagram showing a structure of the parallel processing system according to the third example, in which components common to those in FIG. 13 are referenced by the same reference numerals.

In the above-described synchronous processing in the second example, between processes, it is necessary for one process to repeat checking whether data on the main storage device 92 is updated by other process, resulting in requiring extra processing as much as the repetition, while the present example enables high-performance synchronization and data transmission and reception between processes which require none of such extra processing.

As shown in FIG. 17, the parallel processing system according to the third example includes, similarly to the second example, a multiprocessor composed of a plurality of processors (CPU) P0 to Pn (n is an integer not less than 1) connected through a system bus 91 which is logically divided into two groups of a first processor side 100 and a second processor side 200, with OSes 300P0 to 300Pn for single processors mounted which operate on the processor P0 on the first processor side 100 and the processors (CPU) P1 to Pn on the second processor side 200.

The third example is characterized in further including, in addition to the parallel processing communication units 400P0~400Pn for conducting parallel processing of the processor P0 on the first processor side 100 and the processors P1 to Pn on the second processor side 200 and the control proxy units 500P0 to 500Pn in the second embodiment, inter-process communication units 1000P0 to 1000Pn for realizing communication between the respective processes executed on the processor P0 on the first processor side 100 and on the processors P1 to Pn on the second processor side 200.

In other words, the present example enables the inter-process communication function which is conventionally mounted on an OS for multiprocessors to be realized on a parallel processing system by an OS for single processors which operates an OS and an application for single processors on a multiprocessor, thereby enabling an inter-process communication function to be provided on a user-level.

Since also in the present example, the proxy unit 70 by which the OS 300P0 for single processors on the first processor side 100 communicates with a process executed on the second processor side 200 as shown in the first example executes completely the same function as that in the first example, no description will be made thereof for the sake of convenience.

Since structure and operation of other components than the above-described inter-process communication units 1000P0 to 1000Pn are completely the same as those described above in the second example, description will be made only of the inter-process communication units 100P0 to 1000Pn.

The inter-process communication units 1000P0 to 1000Pn realize communication between the processes executed on the processors P1 to Pn by using such system as a semaphore or a message queue.

Description will be made here with respect to a case where the inter-process communication units 1000P0 to 1000Pn conduct inter-process communication using the semaphore system.

Figure 18:
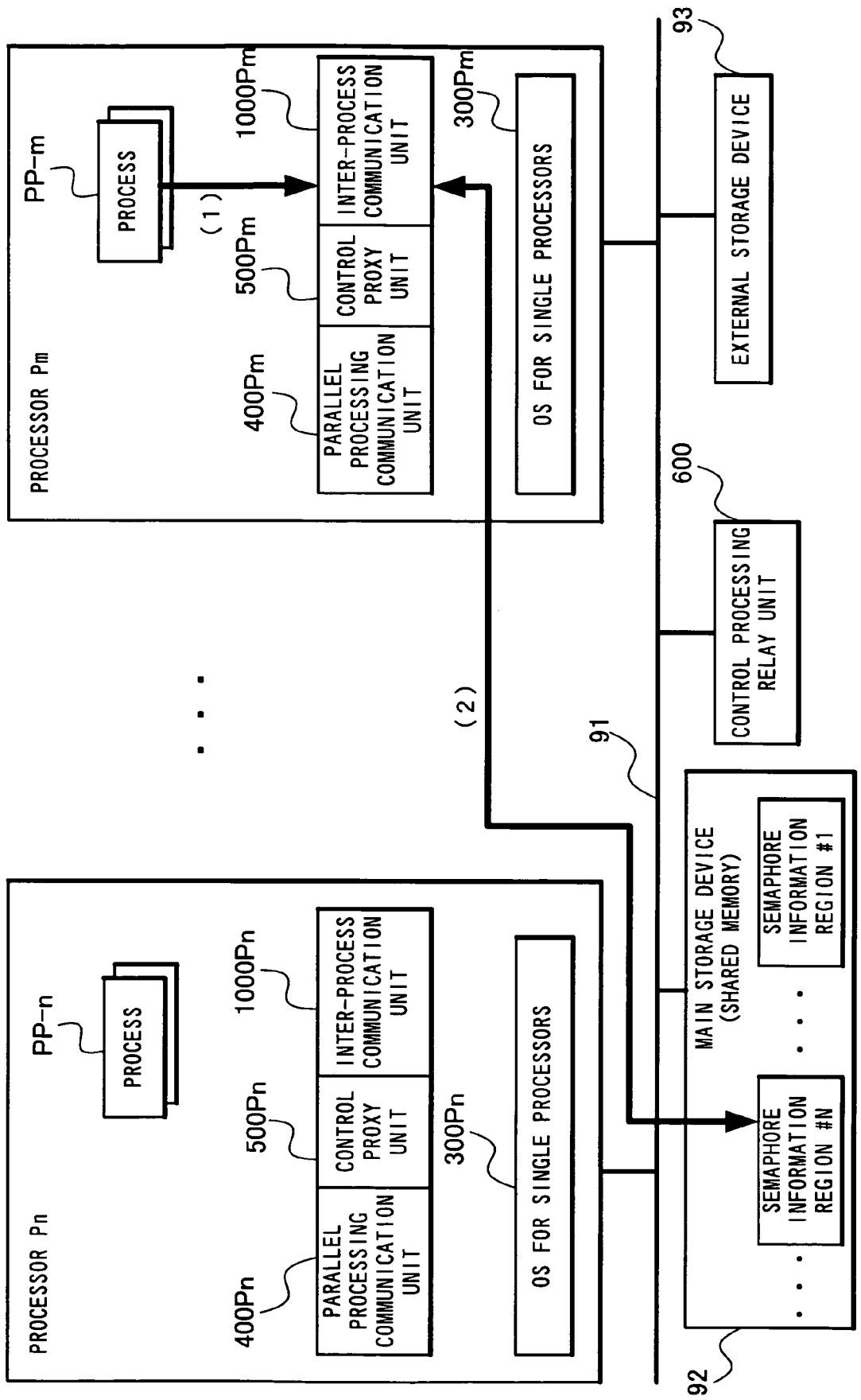
FIG. 18 is a diagram for use in explaining operation to be executed when a process in a processor conducts semaphore-up or -down by using a semaphore system by means of an inter-process communication unit in the parallel processing system according to the third example.

As illustrated in FIG. 18, description will be made of a case where when a process PP-m and a process PP-n are executed on a processor Pm and a processor Pn on the second processor side 200, respectively, the process PP-m and the process PP-n communicate by using the semaphore system by means of the inter-process communication units 1000Pm and 1000Pn.

Semaphore is a system for a plurality of processes to communicate and synchronize with each other on a multi-task OS on which a plurality of processes are simultaneously executed and is a kind of shared flag (counter) to which processes to be synchronized with each other pay attention to conduct processing according to a change of the counter, thereby realizing communication (synchronization).

First, with reference to FIG. 18, description will be made of operation of the process PP-m on the processor Pm of upping or downing a semaphore information region (shared flag) of the main storage device 92. Assume here that semaphore-up is to increment a counter value of the semaphore information region and semaphore-down is to decrement the counter value of the semaphore information. When semaphore-down is not allowed, the process in question sleeps to enter a waiting state and is waked up by semaphore-up.

(1) When the process PP-m on the processor Pm ups or downs the semaphore (semaphore counter), it makes a request to that effect to the inter-process communication unit 1000Pm.

(2) The inter-process communication unit 1000Pm having received the request accesses a semaphore information region #N (as many semaphore information regions as a number predetermined by the system are ensured) as a shared flag distinguishable by a semaphore number ensured in the main storage device 92 to determine whether the semaphore can be upped or downed.

Figure 19:
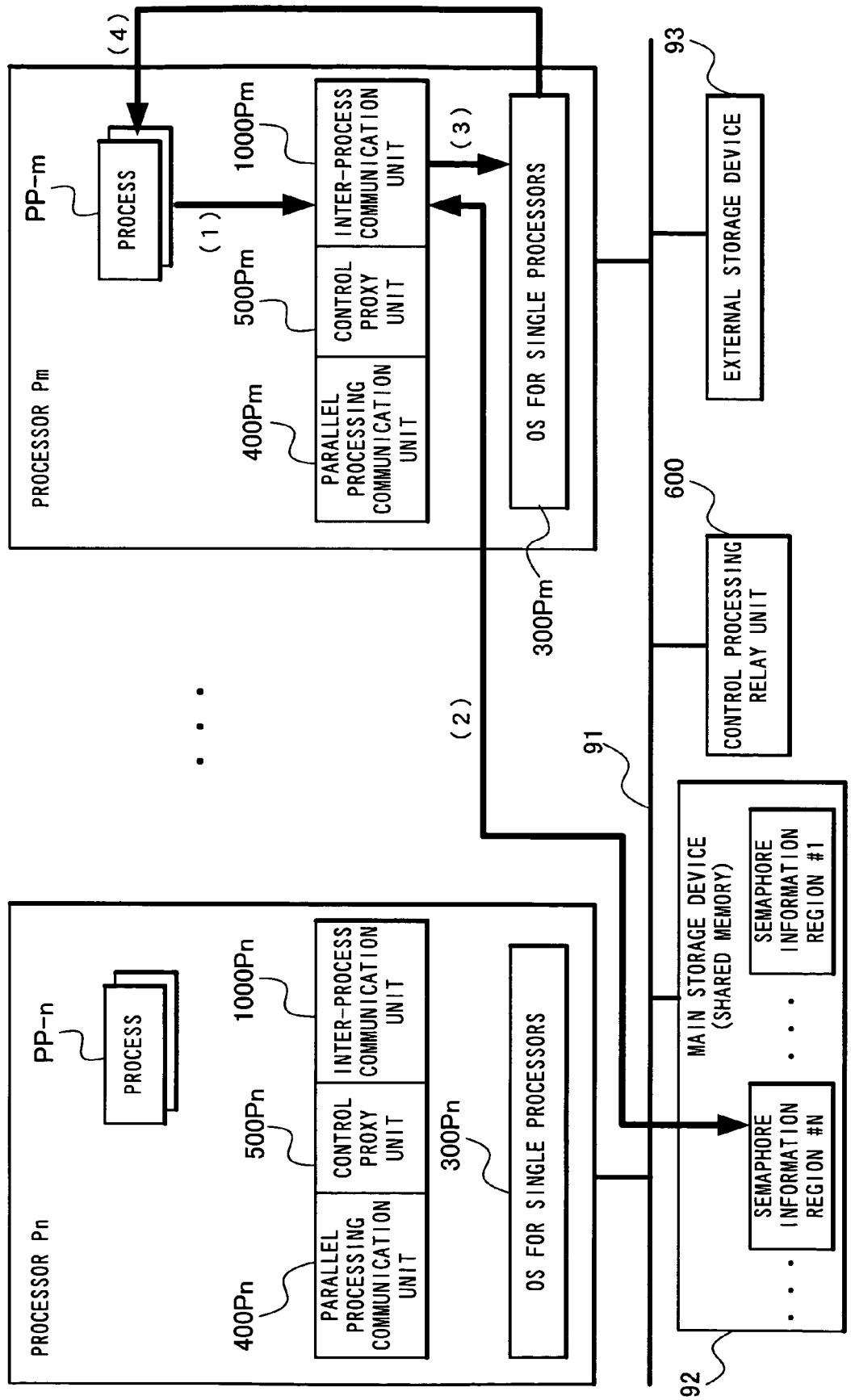
FIG. 19 is a diagram for use in explaining operation to be executed when a process in a processor conducts semaphore-down by using the semaphore system by means of the inter-process communication unit in the parallel processing system according to the third example.

Next, with reference to FIG. 19, description will be made of a case where the process PP-m on the processor Pm downs the semaphore (semaphore flag).

(1) The process PP-m on the processor Pm requests the inter-process communication unit 1000Pm to down the semaphore (semaphore flag).

(2) The inter-process communication unit 1000Pm having received the request accesses the semaphore information region #N ensured in the main storage device 92. Here, an initial value "0" is set as a counter value of the semaphore at the semaphore information region #N and is fixed not to be downed in advance even trying. It is therefore determined that the semaphore can not be downed.

(3) The inter-process communication unit 1000Pm requests the OS 300Pm for single processors to make the process PP-m sleep by using a system call.

(4) The OS 300 Pm for single processors makes the process PP-m sleep by using the system call to take out the same from a run queue.

In other words, being not allowed to down the semaphore in the above-described case, the process PP-m sleeps.

Figure 20:
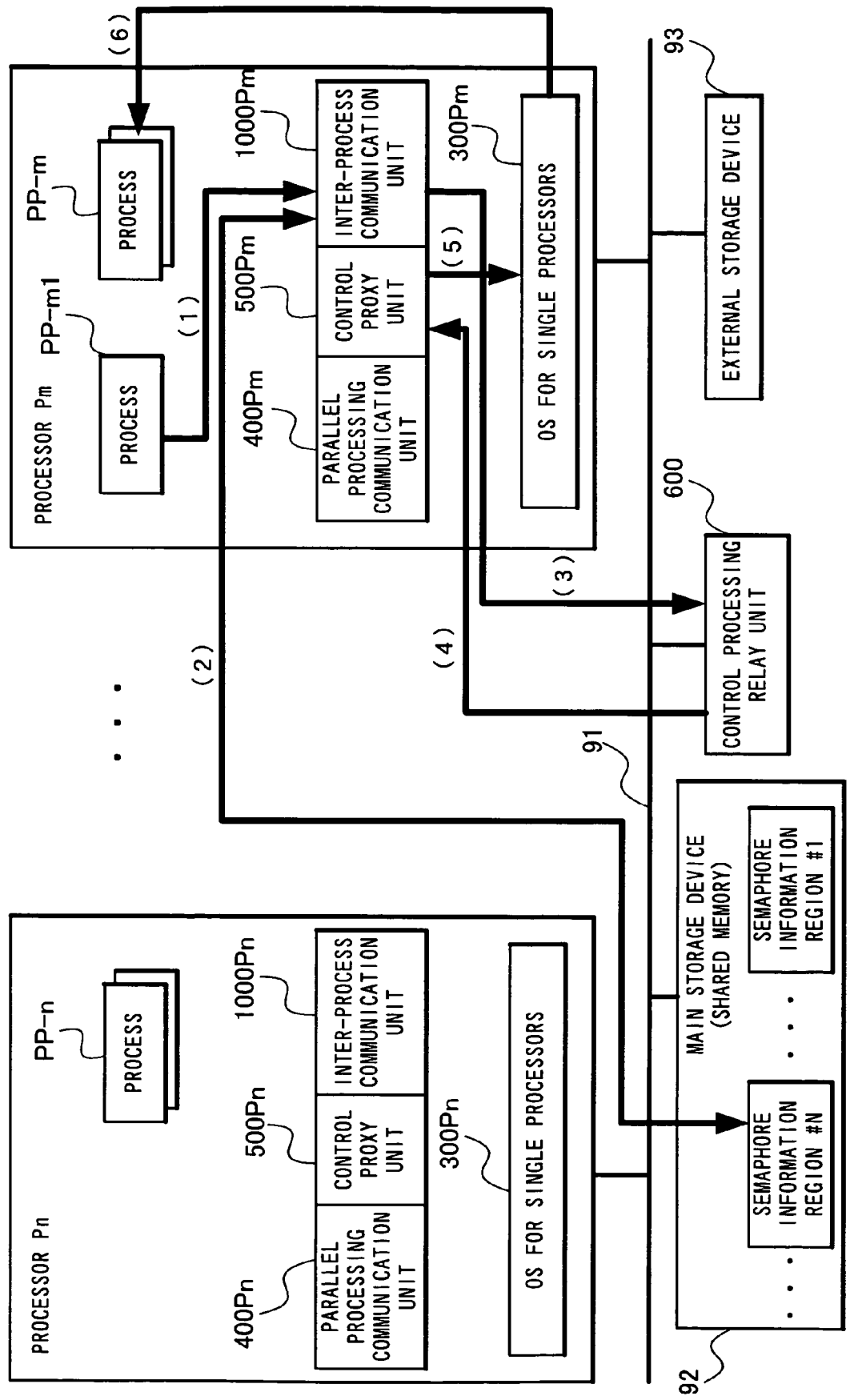
FIG. 20 is a diagram for use in explaining operation to be executed when semaphore-up is conducted between processes in the same processor by using the semaphore system by means of the inter-process communication unit in the parallel processing system according to the third example.

Moreover, with reference to FIG. 20, description will be made of operation executed when with the process PP-m sleeping as described above, a process PP-ml on the same processor Pm ups the semaphore.

(1) The process PP-ml requests the inter-process communication unit 1000Pm to up the semaphore.

(2) The inter-process communication unit 1000Pm accesses the semaphore information region #N ensured in the main storage device 92 to determine that there exists the process PP-m waiting for semaphore.

(3) The inter-process communication unit 1000Pm further transmits a message (control message) to a control processing relay unit 600 to request wake-up of the process PP-m.

(4) The control proxy unit 500Pm receives the message from the control processing relay unit 600. Message relay by the control processing relay unit 600 is conducted based on the operation described with reference to FIGS. 15 and 16.

(5) The control proxy unit 500Pm determines from the message that the request is made for wake-up of a process waiting for semaphore to give the OS 300Pm for single processors a request for waking up the process PP-m at the waiting state by using a system call.

(6) The OS 300Pm for single processors wakes up the requested process PP-m by using the system call to connect the same to a run queue. In this case, the waked up process PP-m again tries to down the semaphore.

Requesting wake-up of the process PP-m directly from the inter-process communication unit 1000Pm to the control proxy unit 500Pm by using the communication function of the OS 300Pm for single processors without using control message relay by means of the control processing relay unit 600 described in the processing (3) and (4) set forth above leads to elimination of the processing (3) and (4) to enable high-speed processing.

Figure 21:
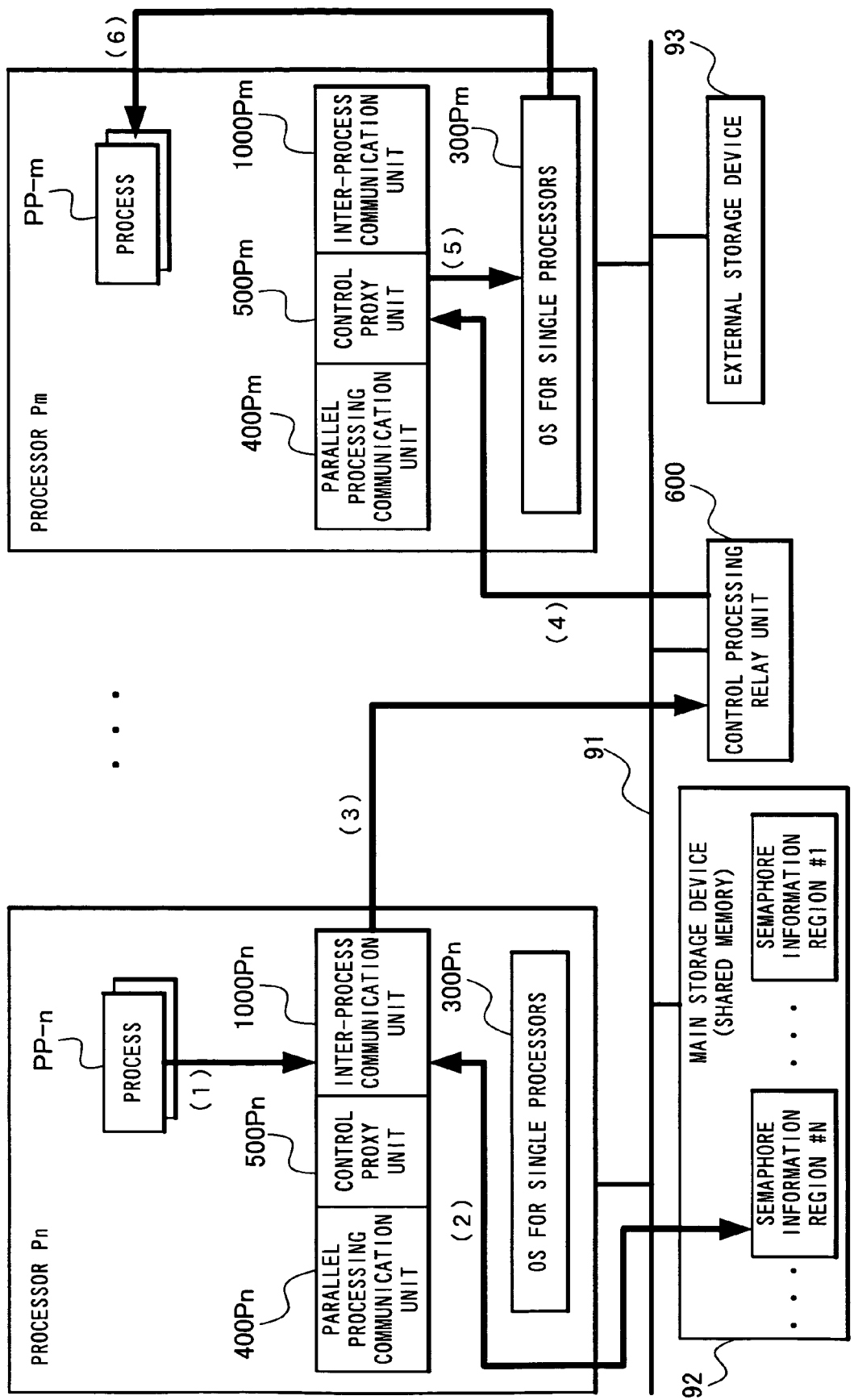
FIG. 21 is a diagram for use in explaining operation to be executed when semaphore-up is conducted between processes in different processors by using the semaphore system by means of the inter-process communication unit in the parallel processing system according to the third example.

With reference to FIG. 21, description will be made of operation conducted in a case where with the process PP-m on the processor Pm sleeping as described above, the process PP-n on other processor Pn ups the semaphore.

(1) The process PP-n on the processor Pn requests semaphore-up from the inter-process communication unit 1000Pn of its own processor Pn.

(2) The inter-process communication unit 1000Pn accesses the semaphore information region #N ensured in the main storage device 92 to determine that there exists the process PP-m waiting for semaphore.

(3) The inter-process communication unit 1000Pn further transmits a message (control message) to the control processing relay unit 600 to request wake-up of the process PP-m.

(4) Subsequently, the control proxy unit 500Pm of the processor Pm receives the message from the control processing relay unit 600. Message relay by the control processing relay unit 600 is conducted based on the operation described with reference to FIGS. 15 and 16.

(5) The control proxy unit 500Pm determines from the message that the request is made for wake-up of a process waiting for semaphore to give the OS 300Pm for single processors a request for waking up the process PP-m at the waiting state by using a system call.

(6) The OS 300Pm for single processors wakes up the requested process PP-m by using the system call to connect the same to a run queue. In this case, the waked up process PP-m again tries to down the semaphore.

Figure 22:
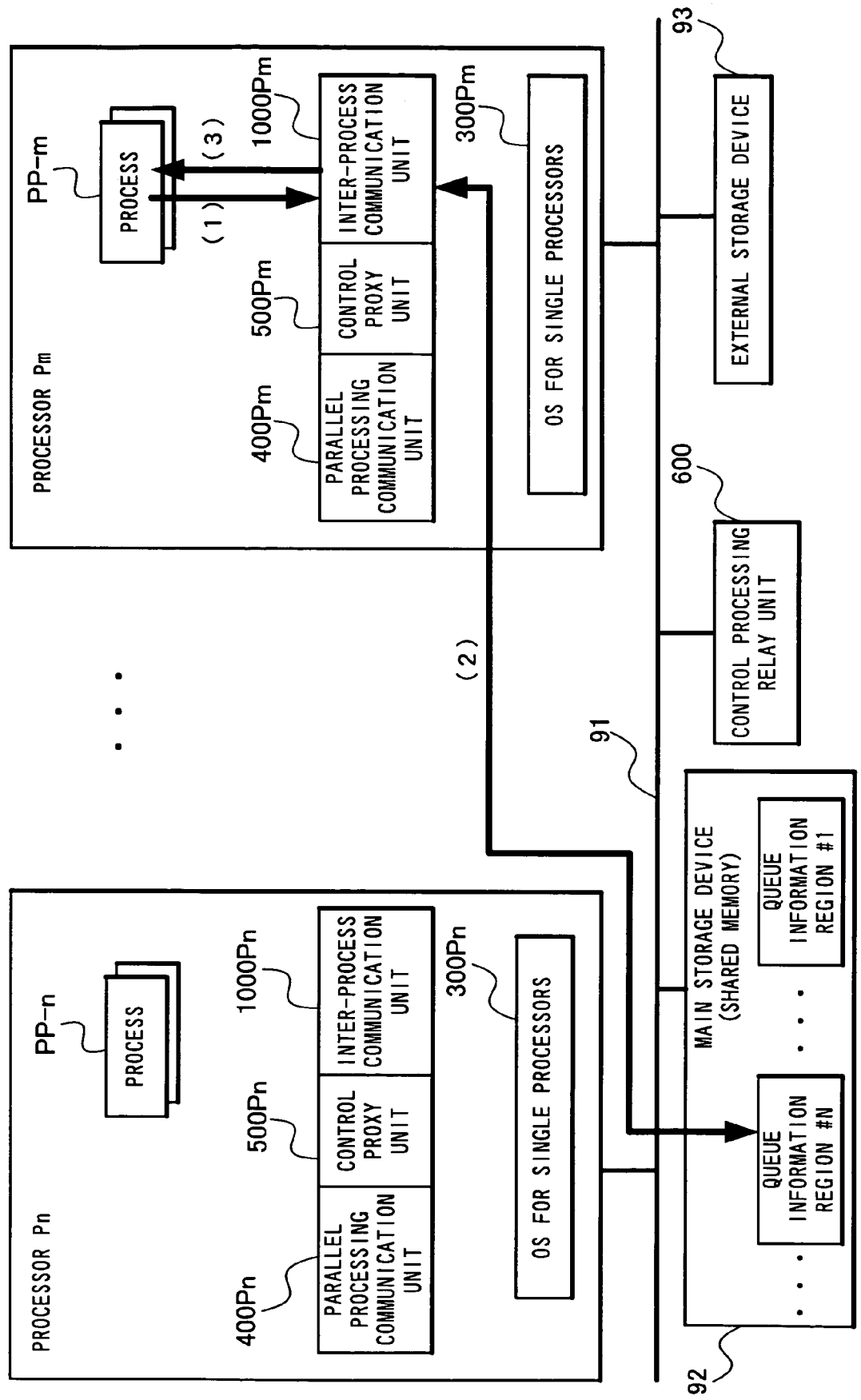
FIG. 22 is a diagram for use in explaining operation to be executed when a process in a processor receives a message by using a message queue system by means of the inter-process communication unit in the parallel processing system according to the third example.

Next, as shown in FIG. 22, description will be made of a case where with the process PP-m and the process PP-n being executed on the processor Pm and the processor Pn on the second processor side 200, the process PP-m and the process PP-n communicate with each other by using a message queue system by means of the inter-process communication units 1000Pm and 1000Pn.

Message queue system, which is a communication method between a plurality of processes, is a system of creating a "queue" as literally indicated by the name and storing a message (processed data transmitted and received between processes) as information in the queue. In the message queue system, a receiver side process is allowed to receive the message in an arbitrary order. When any of the processes receives the message, the message will disappear from the queue.

With reference to FIG. 22, description will be made of a case where the process PP-m on the processor Pm receives a message by using the message queue system. In this case, a message to be obtained exists in a queue information region #N (as many queue information regions as a number predetermined by the system are ensured) distinguishable by a queue number ensured in the main storage device 92.

(1) In order to receive a message, the process PP-m on the processor Pm makes a requests to that effect to the inter-process communication unit 1000Pm.

(2) The inter-process communication unit 1000Pm having received the request accesses the queue information region #N ensured in the main storage device 92 to receive the message.

(3) Then, the inter-process communication unit 1000Pm copies the received message onto the requesting source process PP-m. At this time point, the message in question is erased from the queue information region #N ensured in the main storage device 92.

Next, with reference to FIG. 23, description will be made of second operation executed when the process PP-m on the processor Pm receives a message by the message queue system. In this case, a message to be obtained fails to exist in the queue information region #N ensured in the main storage device 92.

(1) In order to receive a message, the process PP-m on the processor Pm makes a request to that effect to the inter-process communication unit 1000Pm.

(2) The inter-process communication unit 1000Pm having received the request accesses the queue information region #N ensured in the main storage device 92. In this case, determination is made that the message to be obtained fails to exist in the ensured queue information region #N to disable reception of the message.

(3) The inter-process communication unit 1000Pm requests the OS 300Pm for single processors to make the process PP-m sleep by using a system call.

(4) The OS 300Pm for single processors makes the process PP-m sleep by using the system call to disconnect the same from the run queue.

In other words, the process PP-m is not allowed to receive the message, so that it sleeps in the above-described case.

Figure 24:
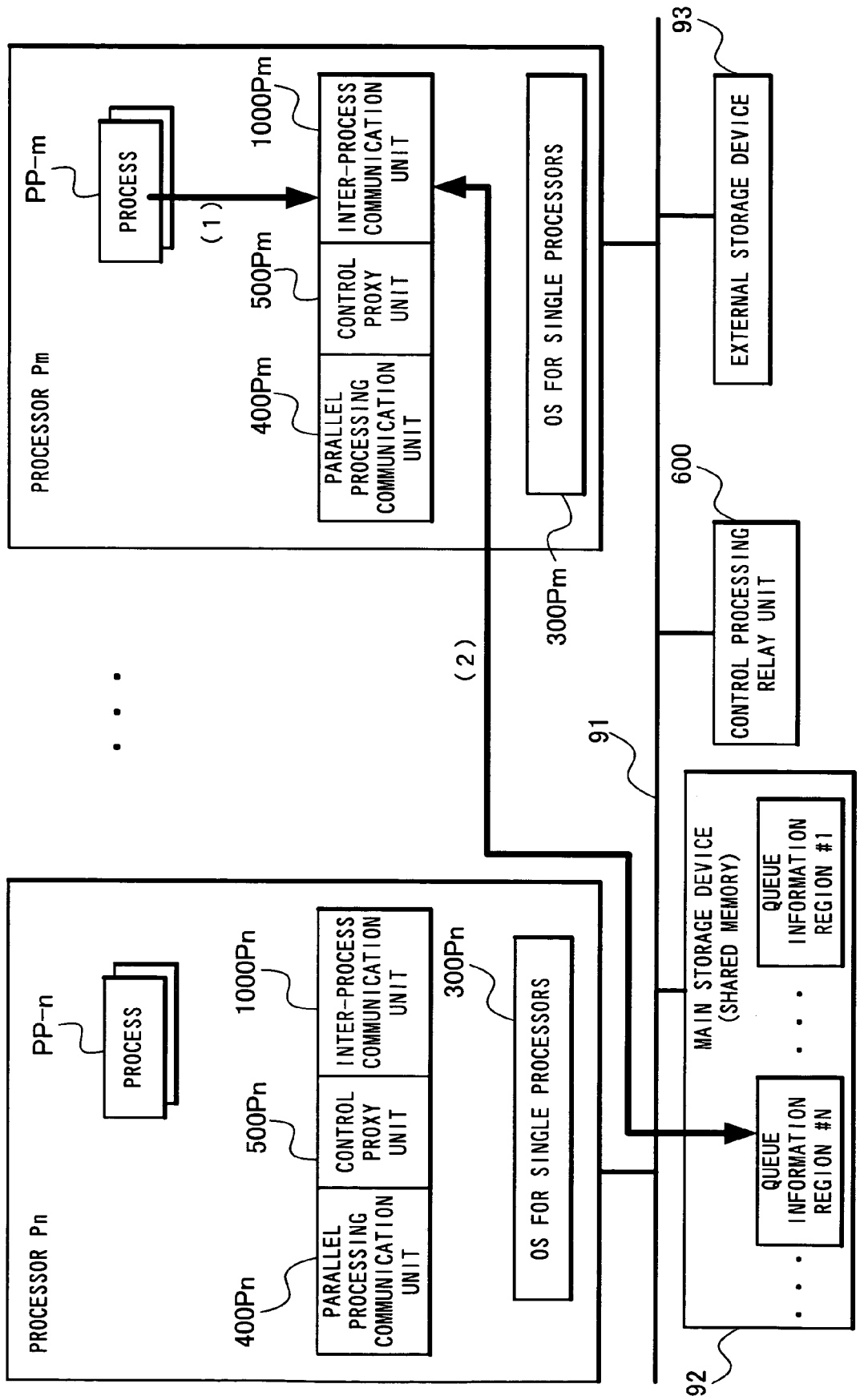
FIG. 24 is a diagram for use in explaining operation to be executed when a process in a processor transmits a message by using the message queue system by means of the inter-process communication unit in the parallel processing system according to the third example.

With reference to FIG. 24, description will be made of operation executed when the process PP-m on the processor Pm transmits a message by the message queue system. In this case, no process exists which is waiting for a message to be transmitted and only the message transmission to the queue information region #N ensured in the main storage device 92 is conducted.

(1) In order to transmit a message, the process PP-m on the processor Pm makes a request to that effect to the inter-process communication unit 1000Pm.

(2) The inter-process communication unit 1000Pm having received the request accesses the queue information region #N ensured in the main storage device 92 to store the message from the process PP-m.

Figure 25:
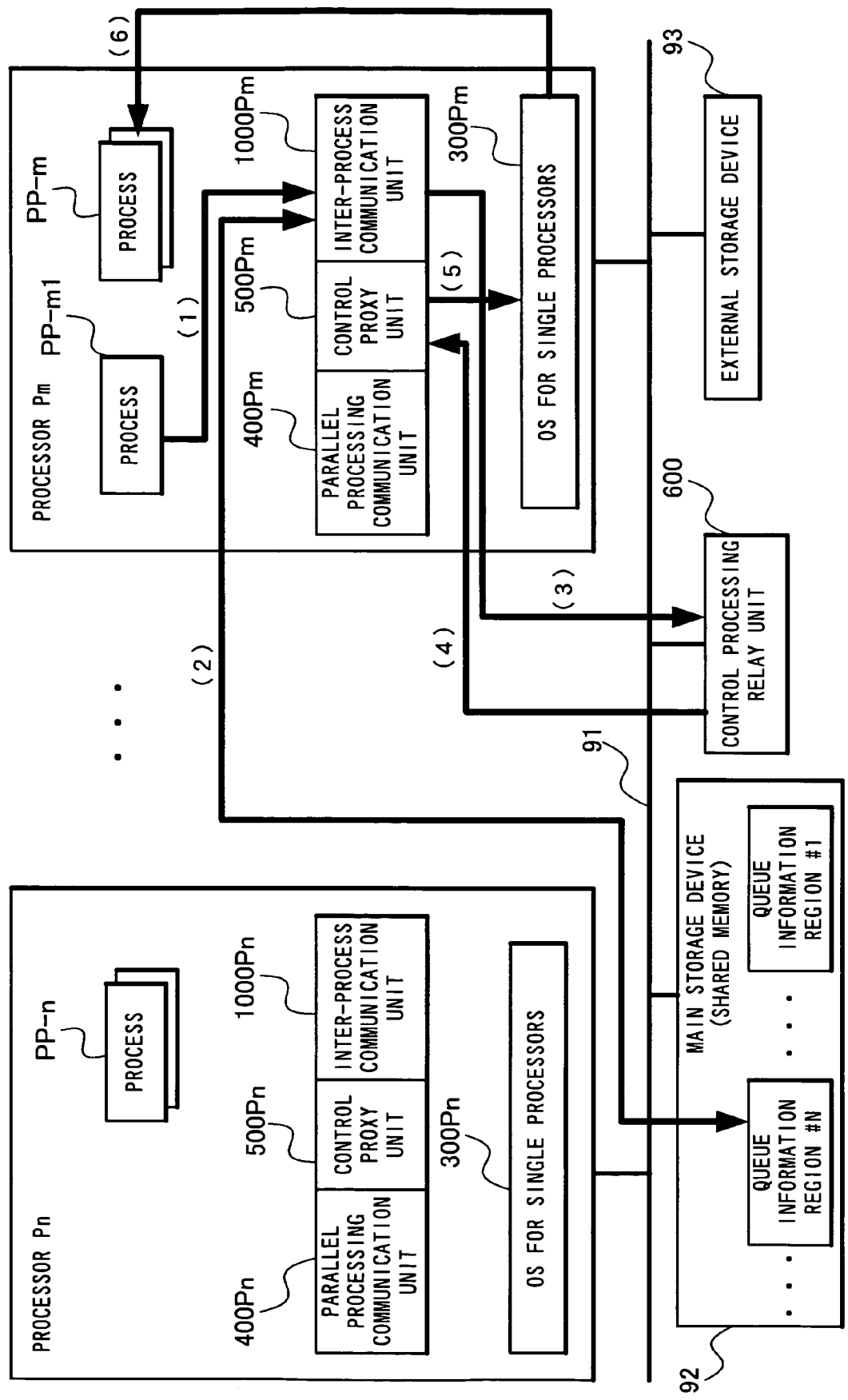
FIG. 25 is a diagram for use in explaining operation to be executed when message transmission and reception is conducted between processes in the same processor by using the message queue system by means of the inter-process communication unit in the parallel processing system according to the third example.

With reference to FIG. 25, description will be further made of operation executed when a process on the processor Pm transmits a message by the message queue system. In this case, there exists a process waiting for a message to be transmitted. In other words, this is a case where with the process PP-m being unable to receive a message and sleeping, a message is sent from a process PP-ml as shown in the example in FIG. 23.

(1) The process PP-ml requests message transmission from the inter-process communication unit 1000Pm.

(2) The inter-process communication unit 1000Pm accesses the queue information region #N ensured in the main storage device 92 to store the message from the process PP-ml. Here, determination is made that there exists the process PP-m waiting for a message.

(3) The inter-process communication unit 1000Pm further transmits a control message to the control processing relay unit 600 to request wake-up of the process PP-m.

(4) The control proxy unit 500Pm receives the control message from the control processing relay unit 600.

(5) The control proxy unit 500Pm determines from the control message that the command is for waking up a process waiting for a message and requests the OS 300Pm for single processors to wake up the above-described process PP-m at the waiting state by using a system call.

(6) The OS 300 Pm for single processors wakes up the requested process PP-m by using the system call to connect the same to the run queue.

In this case, the waked up process PP-m again tries to receive the message. As a result, the message from the process PP-ml is received by the process PP-m.

Requesting wake-up of the process PP-m directly from the inter-process communication unit 1000Pm to the control proxy unit 500Pm by using the communication function of the OS 300Pm for single processors without using control message relay by the control processing relay unit 600 shown in the above-described processing (3) and (4) leads to elimination of the processing (3) and (4) to enable high-speed processing.

Figure 23:
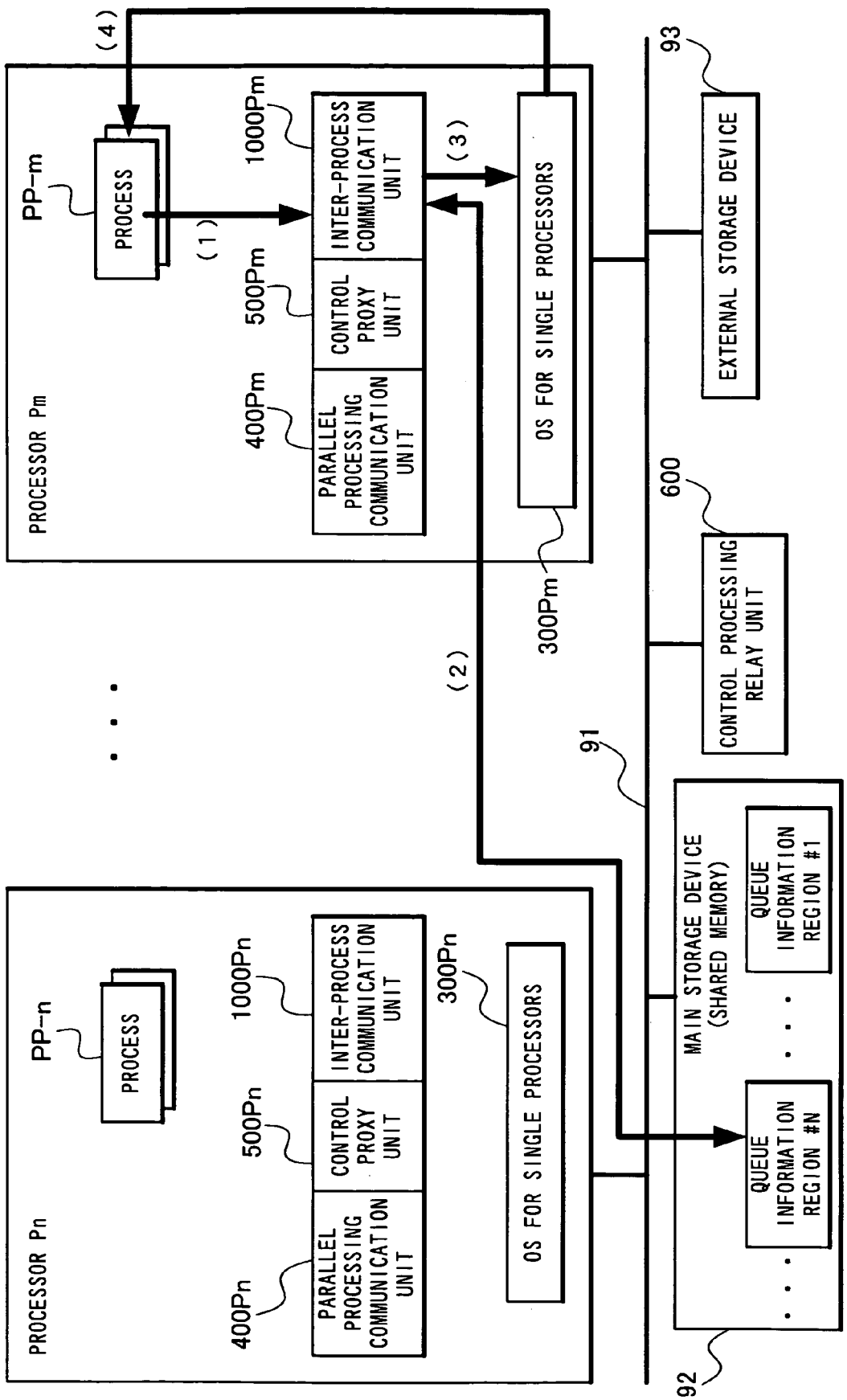
FIG. 23 is a diagram for use in explaining operation to be executed when a process in a processor receives a message by using the message queue system by means of the inter-process communication unit in the parallel processing system according to the third example.
Figure 26:
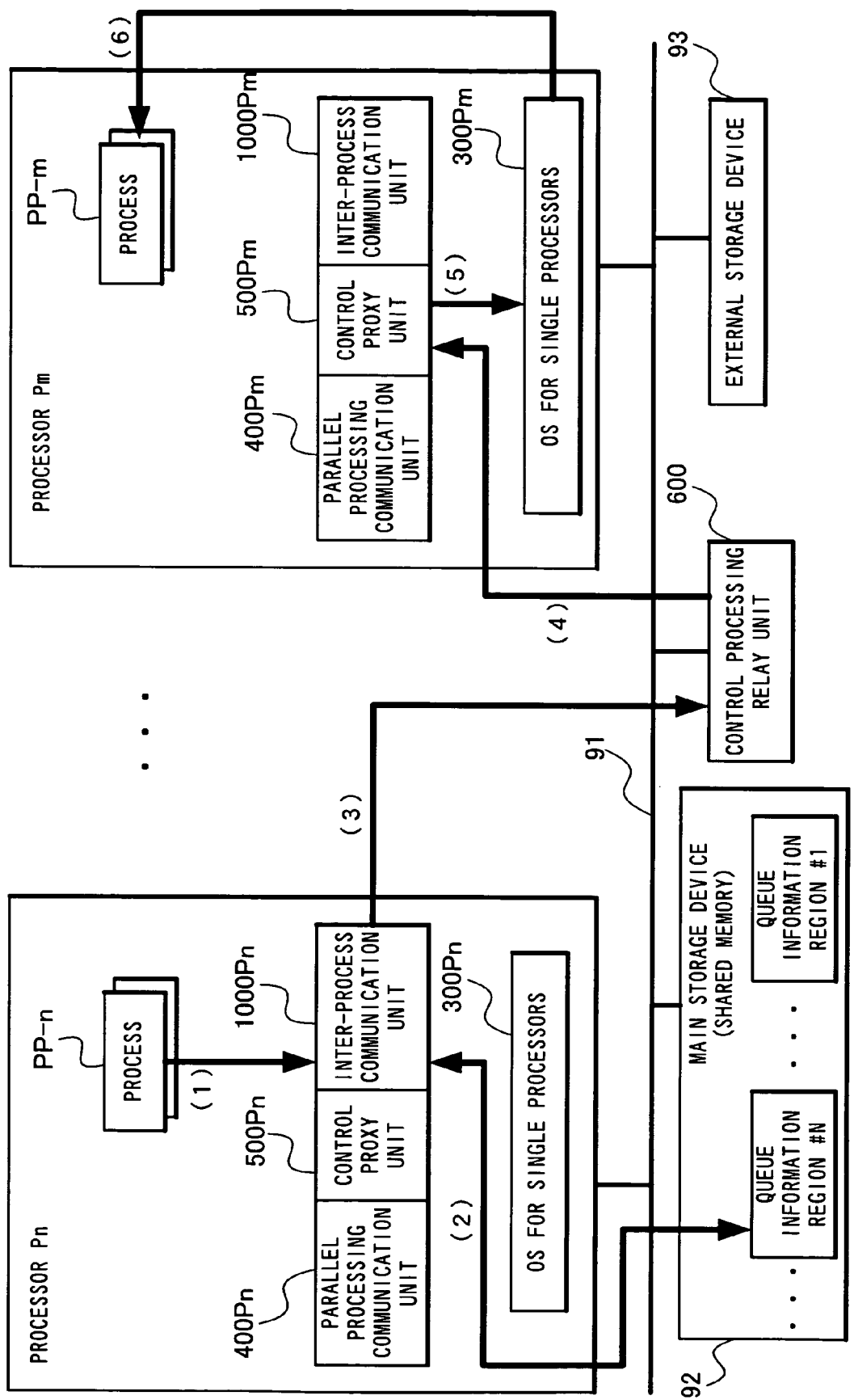
FIG. 26 is a diagram for use in explaining operation to be executed when message transmission and reception is conducted between processes in different processors by using the message queue system by means of the inter-process communication unit in the parallel processing system according to the third example.

With reference to FIG. 26, description will be made of operation conducted in a case where with the process PP-m on the processor Pm sleeping to wait for a message, the process PP-n on other processor Pn transmits a message as shown in FIG. 23.

(1) The process PP-n on the processor Pn requests the inter-process communication unit 1000Pn of its own processor Pn to transmit a message.

(2) The inter-process communication unit 1000Pn accesses the queue information region #N ensured in the main storage device 92 to store the message from the process PP-n. It is determined here that there exists the process PP-m waiting for a message.

(3) The inter-process communication unit 1000Pn further transmits a control message to the control processing relay unit 600 to request wake-up of the process PP-m.

(4) Subsequently, the control proxy unit 500Pm of the processor Pm receives the control message from the control processing relay unit 600.

(5) The control proxy unit 500Pm determines from the control message that the command is for waking up a process waiting for a message and gives the OS 300Pm for single processors a request for waking up the above-described process PP-m at the waiting state by using a system call.

(6) The OS 300Pm for single processors wakes up the requested process PP-m by using the system call to connect the same to a run queue.

In this case, the waked up process PP-m again tries to receive the message. As a result, the message from the process PP-n is received by the process PP-m to execute inter-process communication between different processes.

According to the present example, process control such as process switching and data transmission and reception are enabled by process communication (synchronization or message transmission and reception) within the same processor or between different processors by the inter-process communication units 1000P0 to Pn by using the semaphore system or the message queue system in the manner as described in the foregoing.

Although inter-process communication by an OS for single processors is conducted limitedly between processes in the same processor and process communication between different processors should be conducted by using a network having heavy processing loads or the like, using the semaphore system and the message queue system by the control processing relay unit 600 and the inter-process communication units 1000P0 to Pn whose processing speed is faster than that of network communication realizes inter-process communication having a high processing speed also in a multiprocessor system mounted with an OS for single processors.

As to inter-process communication within the same processor, substantially equivalent performance can be obtained to the processing performance required from sleep to wake-up of a process by an OS for single processors.

A further advantage is that unlike an OS for multiprocessors, even if each processor is mounted with a different OS for single processors, inter-process communication between processors is possible.

Next, description will be made of a specific example of the above-described inter-process communication by using the semaphore system and the message queue system by means of the inter-process communication units 1000P0 to 1000P with reference to FIG. 27.

Figure 27:
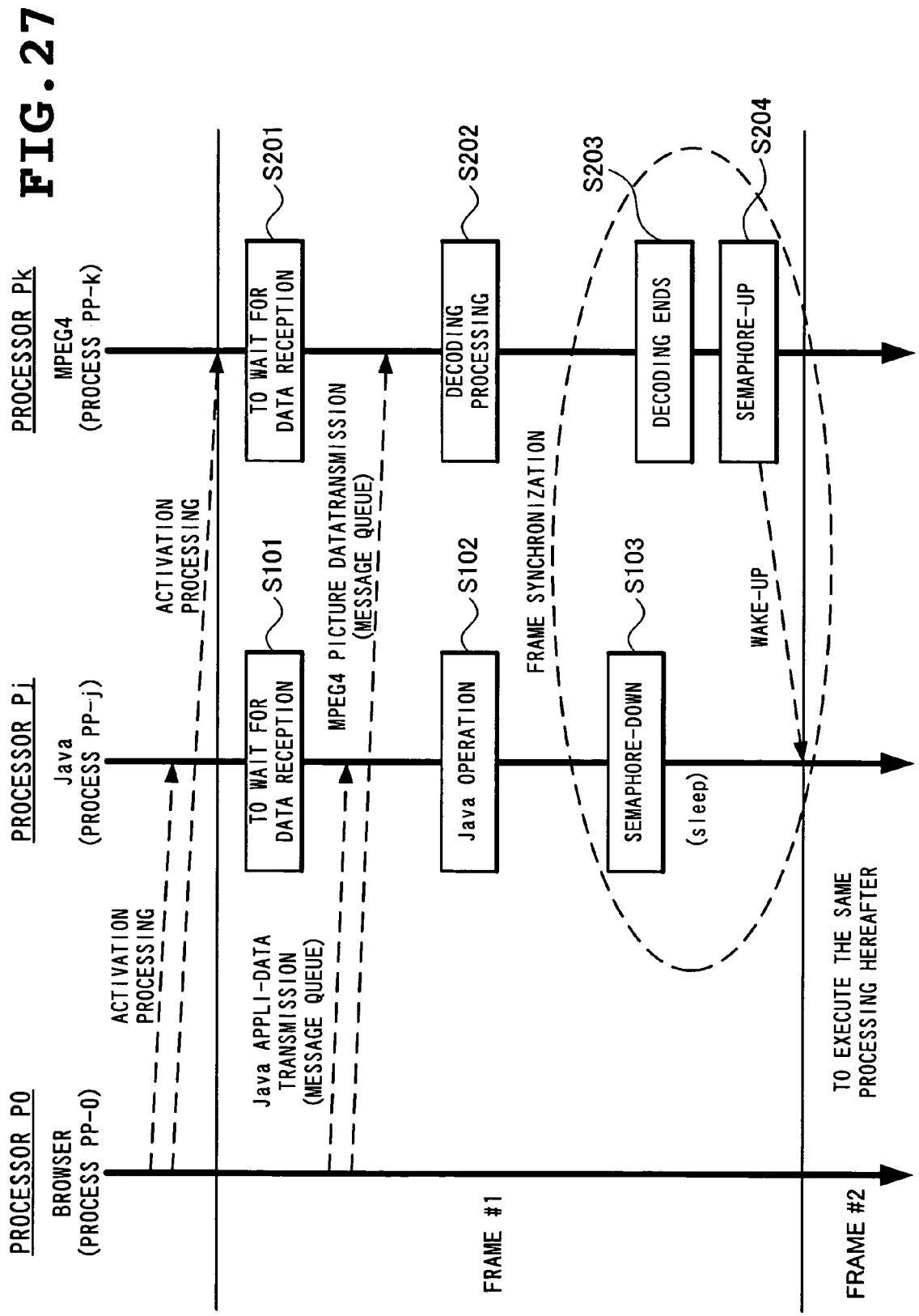
FIG. 27 is a diagram for use in explaining a specific example of inter-process communication by using the semaphore system and the message queue system in the parallel processing system according to the third example.
Figure 28:
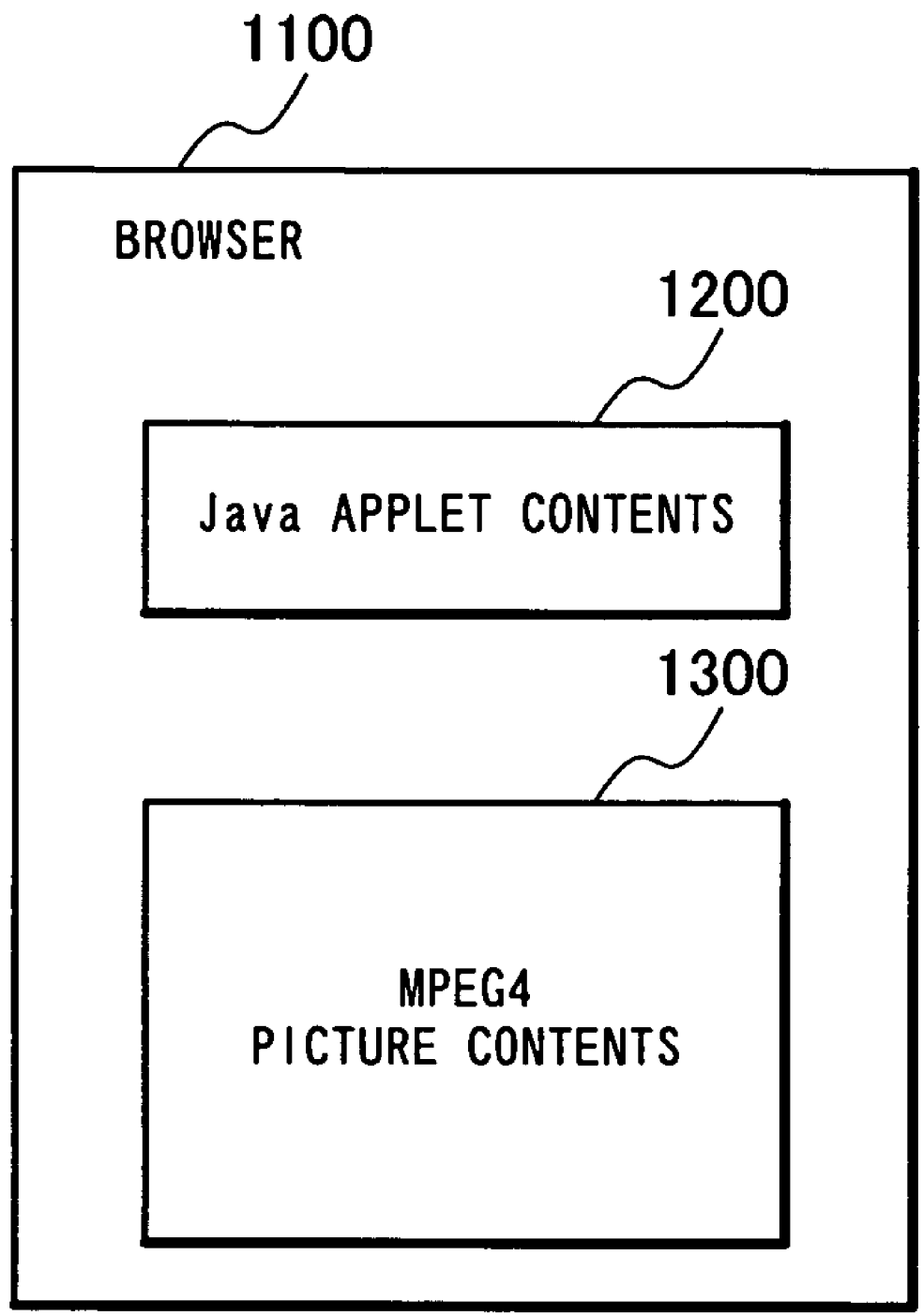
FIG. 28 is a diagram for use in explaining display contents on a browser screen in the specific example shown in FIG. 27.

In FIG. 27, the process PP-0, a process PP-j and the process PP-k are executed on the processor P0, a processor Pj and the processor Pk, respectively. Here, the process PP-0 operates as a browser, the process PP-j as a java® applet and the process PP-k as an MPEG4 application and as illustrated in FIG. 28, within a window embedded in a browser 1100 by the process PP-0, java® applet contents 1200 by the process PP-j and MPEG4 picture contents 1300 by the process PP-k are displayed in synchronization with each other.

In this example, among the units of work of the application operating on the OS 300P0 for single processors on the first processor side 100, the process PP-0 is operated on the processor P0 and the process PP-j and the process PP-k, which are the processes that can be parallelized within the application, are parallel-processed in the processor Pj and the processor Pk on the second processor side 200.

In FIG. 27, when the java® applet (process PP-j) and the MEPG4 application (process PP-k) are activated, both wait for reception of java® application data and MPEG4 picture data from the browser (process PP-0) (Steps S101 and S201).

Here, from the process PP-0 of the processor P0, by using message transmission by means of the inter-process communication unit 100P0, the java® application data and the MPEG4 picture data are transmitted as a message and received by the java® applet (process PP-j) and the MPEG4 application (process PP-k).

As a result, operation by the java® applet (process PP-j) is started (Step S102) to start decoding processing by the MPEG4 application (process PP-k) (Step S202).

In this example, since it is clear in advance that operation by the java® applet (process PP-j) ends earlier than the decoding processing by the MPEG4 application (process PP-k), the initial value of the semaphore counter is set to "0" such that after finishing the operation, the java applet® (process PP-j) waits for completion of the processing by the MPEG4 application (process PP-k), thereby preventing the java® applet (process PP-j) having finished the operation earlier from downing the semaphore. In addition, the MPEG4 application (process PP-k) is defined to up the semaphore after finishing the processing.

Although the java® applet (process PP-j) tries to down the semaphore (Step S103), it can not down the same because the initial value of the counter is "0", so that it sleeps to wait for semaphore.

When the MPEG4 application (process PP-k) ends the processing (Step S203), it requests semaphore-up (Step S204). As a result, the java® applet (process PP-j) waiting for semaphore is waked up and allowed to down semaphore.

Repeating the foregoing operation for each frame results in displaying the contents 1200 of the java® applet by the process PP-j and the MEPG4 picture contents 1300 by the process PP-k in synchronization with each other within the window embedded in the browser 1100 by the process PP-0.

Figure 29:
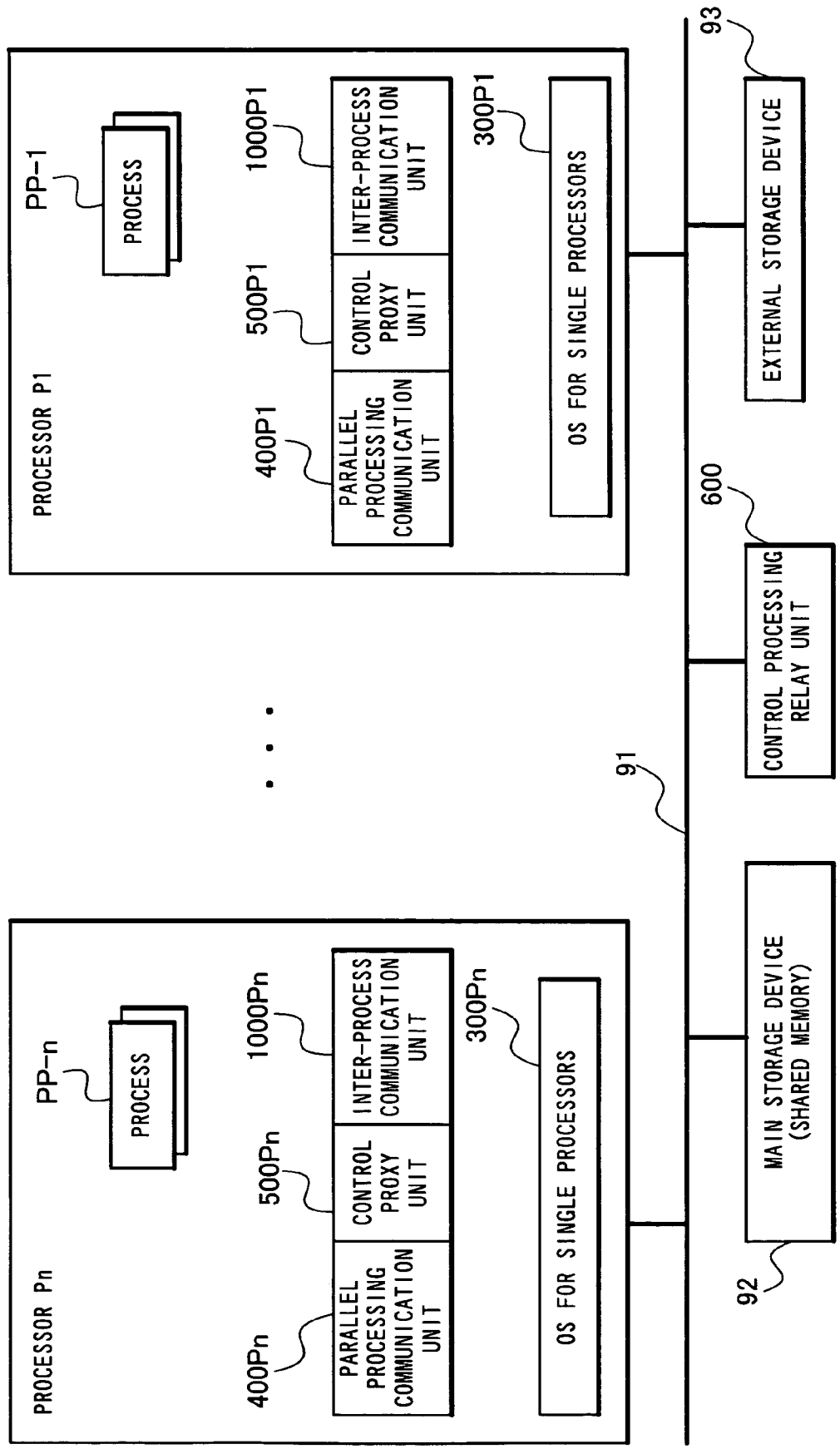
FIG. 29 is a block diagram showing a structure of a parallel processing system according to a fourth example to which the present invention is applied.

Next, a parallel processing system according to a fourth example of the present invention will be described with reference to FIG. 29. FIG. 29 is a block diagram showing a structure of the parallel processing system according to the fourth example, in which components common to those in FIG. 13 are referenced by the same reference numerals.

As shown in FIG. 29, the parallel processing system according to the fourth example includes a multiprocessor composed of a plurality of processors (CPU) P1~Pn (n is an integer not less than 2) connected through a system bus 91, which are mounted with OSes 300P1 to 300Pn for single processors operating on the respective processors P1 to Pn.

More specifically, the present example differs from the first to third examples in that the multiprocessor is not logically divided into two groups, the first processor side and the second processor side.

The fourth example, similarly to the above-described third example, is characterized in further including, in addition to parallel processing communication units 400P1 to 400Pn and control proxy units 500P1 to 500Pn for executing parallel processing of the processors P1 to Pn, inter-process communication units 1000P1 to 1000Pn for realizing communication between the respective processes executed on the processors P1 to Pn.

On the other hand, process control on each of the processors P1 to Pn is possible without having OS service units 50P1 to 50Pn as provided in the first example and the parallel processing communication units 400P1 to 400Pn as provided in the first to third examples. The OSes 300P1 to 300Pn for single processors on the respective processors P1 to Pn need not be the same OS but be different from each other.

In other words, the present example as well enables the inter-process communication function which is conventionally mounted on an OS for multiprocessors to be realized on a parallel processing system by an OS for single processors which operates an OS for single processors and an application on a multiprocessor, thereby enabling an inter-process communication function to be provided on a user-level.

Execution of each process in each of the processors P1 to Pn is conducted without requiring mutual exclusive control with other processor.

Inter-process communication within an individual processor P1~Pn and inter-process communication between the processors are conducted, as described in the third example, by using the semaphore system and the message queue system by means of the inter-process communication units 1000P1 to 1000Pn to execute synchronization processing and data transmission and reception between the processes.

Figure 30:
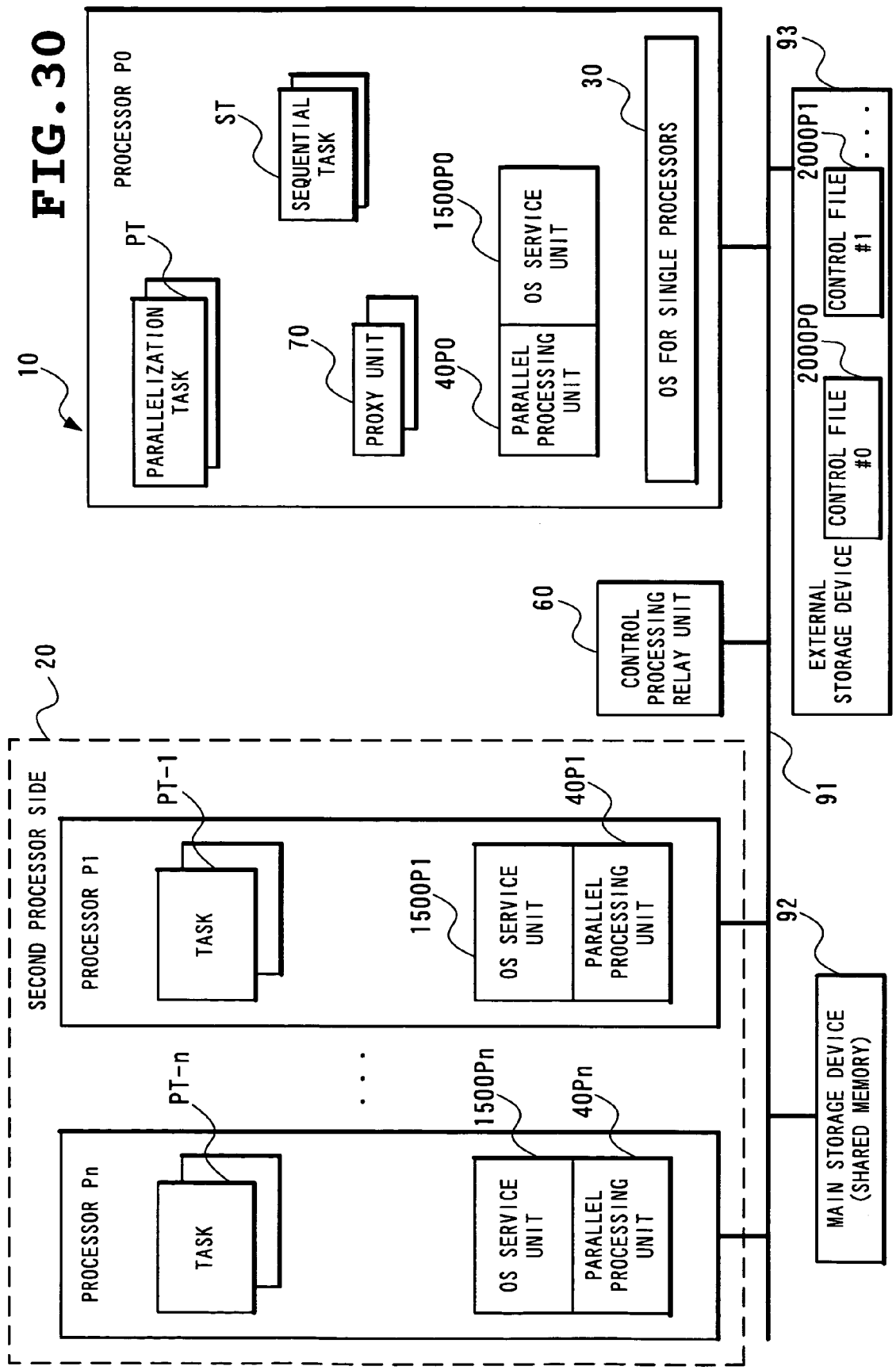
FIG. 30 is a block diagram showing a structure of a security management system in a parallel processing system according to a first embodiment of the present invention.

A security management system according to the present invention applied to the above-described parallel processing system will be described with reference to FIG. 30. Here, description will be made of a first embodiment in which the security management system of the present invention is applied to the parallel processing system shown as the first example.

The security management system according to the first embodiment has the same structure as that of the parallel processing system according to the first example shown in FIG. 1 and differs from the same in that OS service units 1500P0 and 1500P1~1500Pn provided in the processor P0 on the first processor side 10 and the processors P1 to Pn0 on the second processor side 20 have a function of realizing security by access control, access quantitative control and the like for each task or for each processor based on control files 2000P0 to 2000Pn stored in the external storage device 93 formed of an HD, a flash ROM or the like. Components that are common to those in FIG. 1 are referenced by the same reference numerals and no description thereof will be made here.

The present embodiment enables the system to be adapted to user-level security by adding a security function to the OS service units 1500P0 and 1500P1~1500Pn.

Setting example of security contents of the control files 2000P0 to 2000Pn stored in the external storage device 93 is shown in FIG. 31. In the control files 2000P0 to 2000Pn illustrated in FIG. 31, the following security contents are defined. Security contents set in the control files 2000P0 to 2000Pn may be all the same or different from each other.

As to a control level for each task executed on each of the processors P0 and P1 to Pn, tasks A, B and C are set at Level 0, tasks D and F at Level 1 and other tasks at Level 2.

Set as access control contents for each control level are "all accessible" at Level 0, "accessible only for read" at Level 1 and "all external output but screen output is impossible" at Level 2.

Set as contents of quantitative limitations for each control level are "a standard limitation" at Level 0, "up to one read file" at Level 1 and "semaphore is unusable" at Level 2.

Although in the example shown in FIG. 31, a control level is set for each task in the control file, the control level may be set for each of the processors P0 and P1~Pn other than the illustrated example.

Figure 32:
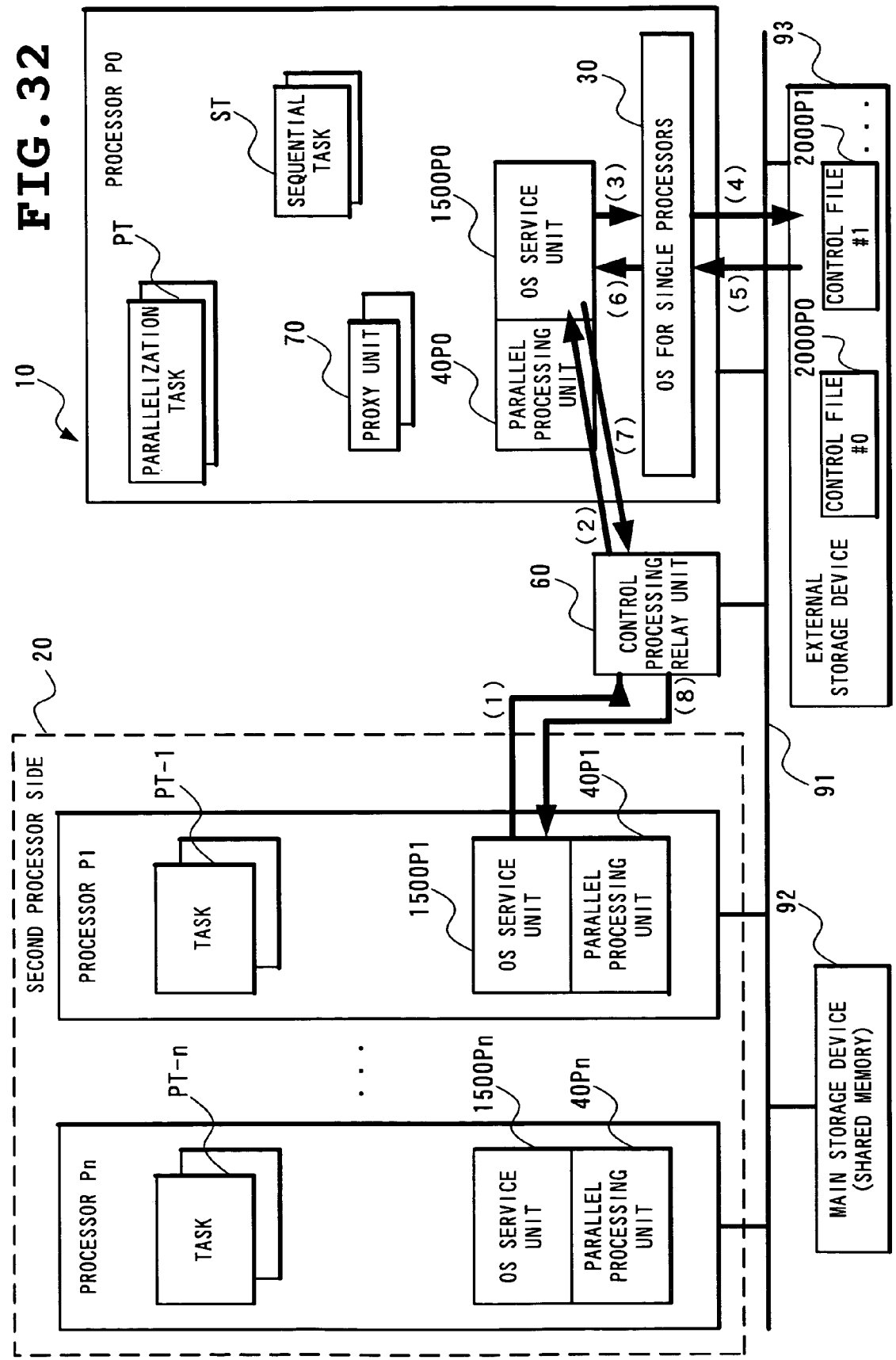
FIG. 32 is a diagram for use in explaining control file reading operation in the first embodiment of the present invention.

Here, operation of the security management system according to the present embodiment will be described with respect to each step with reference to FIG. 32.

First, description will be made of a case where the control files 2000P1 to 2000Pn stored in the external storage device 93 are read by the processors P0 to Pn.

(1) After activation, the OS service unit 1500P1 on the processor P1, for obtaining the control file 2000P1 for its own processor, transfers a request for reading the control file 2000P1 stored in the external storage device 93 to the control processing relay unit 60.

(2) The OS service unit 1500P0 of the processor P0 receives the above-described read request from the control processing relay unit 60.

(3) The OS service unit 1500P0 of the processor P0 issues a request for reading the control file 2000P1 to the OS30 for single processors.

(4) The OS30 for single processors issues a request for accessing the control file 2000P1 to the external storage device 93.

(5) The OS30 for single processors receives the contents of the control file 2000P1 from the external storage device 93.

(6) The OS30 for single processors hands over the security contents of the control file 2000P1 to the OS service unit 1500P0 of the processor P0.

(7) The OS service unit 1500P0 of the processor P0 transfers the above-described security contents of the control file 2000P1 through the control processing relay unit 60.

(8) The OS service unit 1500P1 of the processor P1 conducts security control with respect to the task PT-1 executed on the processor P1 according to the security contents of the control file 2000P1 transferred through the control processing relay unit 60.

When the contents of the control file 2000P1 can not be read all by one read request, reading of only the necessary items (e.g. in FIG. 31, a control level of each task) may be requested and the other items may be sequentially read every time a processing request is made from a task.

It is further possible to incorporate security contents set in the control files 2000P0 to 2000Pn into the OS service units 1500P0 to 1500Pn of the respective processors P0 to Pn in advance without reading the control files from the external storage device 93 as is done in the foregoing.

Description will be made of a case where a request from a task is controlled based on thus read security contents of the control file 2000P1.

Figure 33:
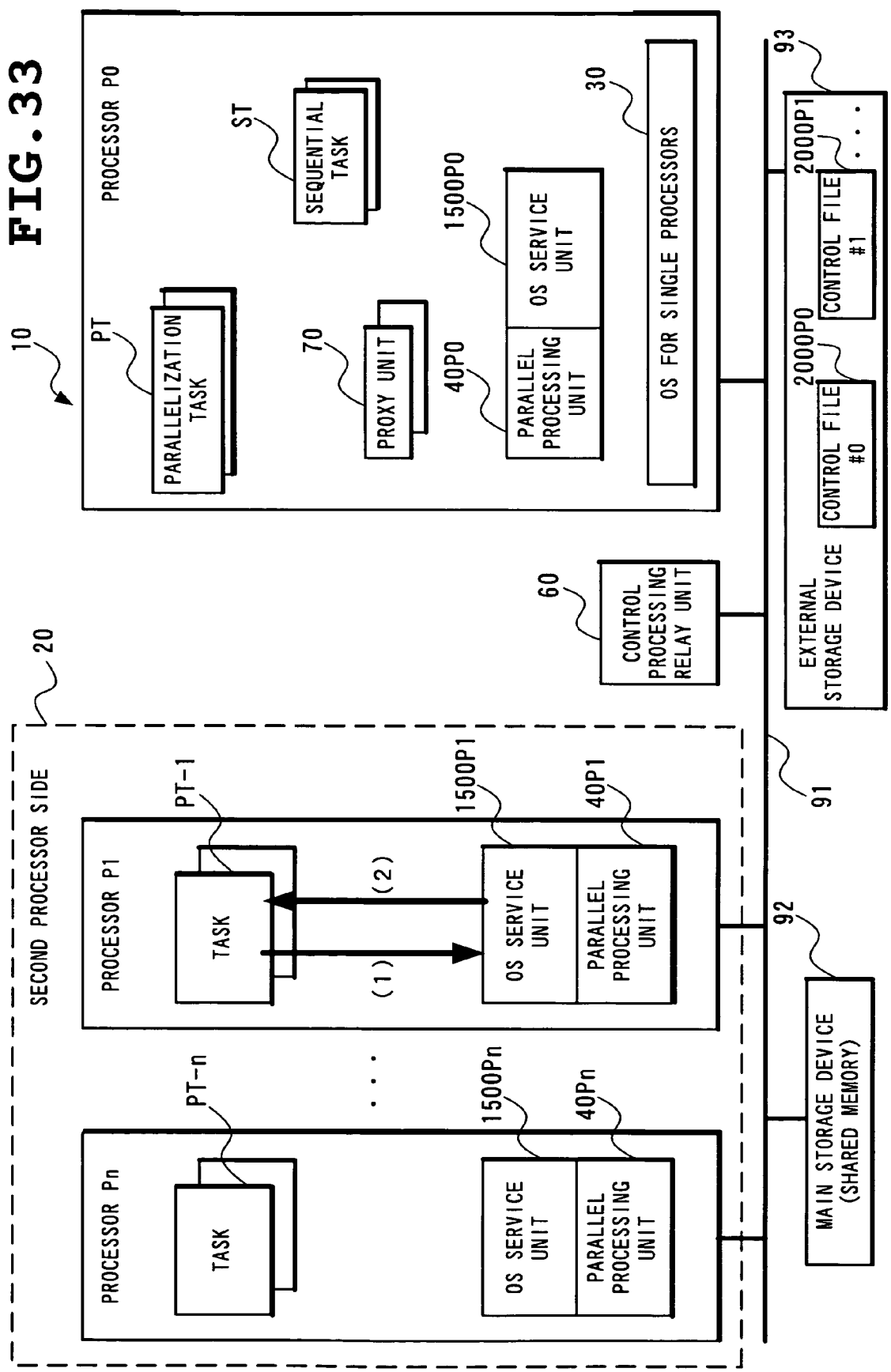
FIG. 33 is a diagram for use in explaining security management operation in the first embodiment of the present invention.
Figure 34:
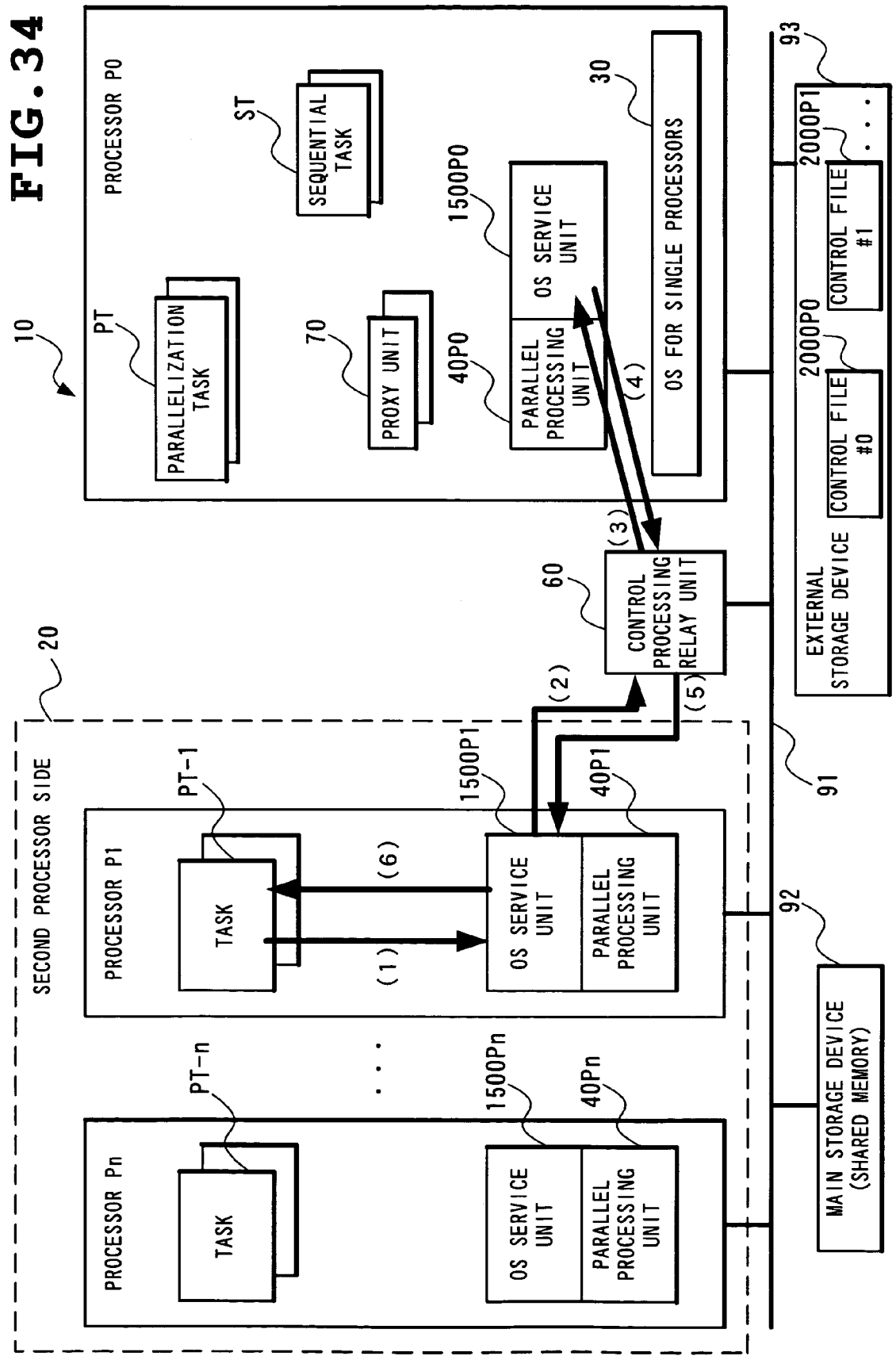
FIG. 34 is a diagram for use in explaining security management operation in the first embodiment of the present invention.

First, description will be made of a case where a request from the task PT-1 on the processor P1 is limited by the security function set in the control file 2000P1 with reference to FIGS. 33 and 34.

(1) The task PT-1 on the processor P1 requests predetermined processing from the OS service unit 1500P1 on the same processor.

The OS service unit 1500P1 determines whether to receive the request in question from the task PT-1 based on thus obtained security contents of the control file 2000P1. More specifically, determination is made whether the request in question is allowed at the control level set for the task PT-1.

(2) When the request in question is not allowed, the OS service unit 1500P1 returns an error to the task PT-1 as a request source. As a result, the processing request not allowed in the control file 2000P1 will be inhibited to the task PT-1.

In a case, for example, where for the task PT-1 on the processor P1, the control level Level 1 is set by the control file 2000P1 to allow only a read access, when a request for write access to a certain file is made from such task PT-1, the OS service unit 1500P1 determines based on the security contents of the control file shown in FIG. 31 that a write access is not allowed to the task PT-1 to return an error to the task PT-1.

Subsequently, description will be made of a case where a request from the certain task PT-1 on the processor P1 thus having read the contents of the control file 2000P1 is limited by the processor P0 using the security function with reference to FIG. 34.

(1) The task PT-1 on the processor P1 requests predetermined processing from the OS service unit 1500P1 on the same processor.

The OS service unit 1500P1 determines whether to receive the request in question from the task PT-1 based on thus obtained security contents of the control file 2000P1.

(2) When the request in question is allowed, the OS service unit 1500P1 transfers the request in question through the control processing relay unit 60.

(3) The OS service unit 1500P0 of the processor P0 receives the request in question from the control processing relay unit 60 to determine whether to allow the request in question based on the control file.

(4) When determining that the request is not allowed, the OS service unit 1500P0 of the processor P0 returns an error to the control processing relay unit 60.

(5) The OS service unit 1500P1 of the processor P1 receives the error from the control processing relay unit 60.

(6) Furthermore, the OS service unit 1500P1 returns the error to the task PT-1 as a request source.

As described in the foregoing, the processing request allowed on the OS service unit 1500P1 of the processor P1 on which the task PT-1 operates is limited on the service unit 1500P0 of the processor P0. Thus, in the OS service unit 1500P0 of the processor P0, the control file 2000P0 whose contents are different from those of the control files for the processors P1 to Pn can be set in order to conduct security protection against a processing request from the tasks of the processors P1 to Pn.

In the above-described embodiment, the system can be structured to set security contents in the OS service unit 1500P0 of the processor P0 to be lower or provide no security function to prevent performance of an existing application executed on the processor P0 from being limited.

Although illustrated in the foregoing description is setting a control level for each task by a control file, it is also possible, for example, to set the degree of a security function for the OS service unit of each processor and set authorization to the OS service unit from the lowest level of checking no security to the highest level of checking all the contents (request).

It is further possible to provide the parallel processing units 40P0 to 40Pn, other than the OS service unit, with a security function to limit a kind of generable task in the control file with respect to each of the parallel processing units 40P0 to 40Pn.

Furthermore, while illustrated in the present embodiment is a case where the security management system of the present invention is applied to the parallel processing system of the first example, it is clearly understood that the security system of the present invention is applicable to the parallel processing systems of the second and the following examples.

By applying the present invention to the parallel processing systems of the second and third examples as well, the system can be structured to have a security function provided in the inter-process communication unit of each processor to limit a kind of executable inter-process communication for each inter-process communication unit.

In a case where a unit which manages a power supply state of a processor to make a power supply state change request to the OS for single processors and a unit which makes an operation clock variation request to the OS for single processors are provided, security control by the OS service unit is possible in response to a power supply control request or an operation clock variation request from the unit in question.

Furthermore, while the first embodiment is structured to read the control files 200P0 to Pn prepared for the respective processors such that each OS service unit conducts security protection based on security contents of the control file, security contents can be dynamically changed by setting a control file stored in the external storage device 93 to be appropriately changeable so that the OS service unit again reads the control file every time it is changed.

Although in the foregoing description, illustrated is a case where the OS service units 1500P0 to 1500Pn read the control files or the security contents are incorporated into the OS service units 1500P0 to 1500Pn in advance, the system can be structured to limit the function itself of the OS service unit 1500P0-1500Pn of each processor P0-Pn for each OS service unit, thereby controlling a request from a task operating on each of the processors P0 to Pn. This produces the same effect as that obtained in the foregoing cases.

For example, as to the function of the OS service unit 1500Pn of the predetermined processor Pn, limiting write to a file leads to inhibition of a request for write from a task operating on the processor Pn to a file. Thus, by limiting the function of OS service unit for each processor, security effects for each processor can be obtained.

Next, description will be made of a second embodiment of a security management system applied to the parallel processing system with reference to FIG. 35.

Here, the description will be made of the second embodiment in which the security management system of the present invention is applied to the parallel processing systems shown as the second and third examples in FIGS. 12 and 17.

The present embodiment is structured to appropriately protect service by a process operating on each processor by making a security level of each OS be variable.

Illustrated in FIG. 35 which shows the security management system according to the second embodiment is application of the present invention to the parallel processing system as the second example shown in FIG. 12 and components common to those of FIG. 12 are referenced by the same reference numerals to omit their description.

The security management system according to the second embodiment is provided with OS 3000P0 to 3000Pn for single processors having security expansion functions, which are expansion of the OSes for single processors provided in the respective processors P0 to Pn. Security expansion units 3100P0 to 3100Pn for expanding the security function are incorporated as modules into the OSes 3000P0 to 3000Pn for single processors.

The OS 3000Pn for single processors has a function of requesting the security expansion unit 3100Pn to check security contents at the processing which requires security protection in a system call.

In the present embodiment, a setting example of the security contents in the control files 2000P0 to 2000Pn stored in the external storage device 93 is shown in FIG. 36. In the control files 2000P0 to 2000Pn shown in FIG. 36, the following security contents are defined related to a process executed on each of the processors P0 and P1 to Pn. Security contents set in these control files 2000P0 to 2000Pn may be all the same or different from each other.

As to a control level for each process executed on each of the processors P0 and P1~Pn, the processes A, B and C are set at Level 0, the processes D and F at Level 1 and other processes at Level 2.

As to access control contents of each control level, Level 0 is set to be all accessible, Level 1 is set to inhibit another process generation system call and Level 2 is set to inhibit system call regarding I/O.

As to quantitative limitations for each control level, Level 0 is set to be a standard limitation, Level 1 is set to limit a read file to one and Level 2 is set to limit usable semaphores to two.

Here, operation of the security management system according to the second embodiment will be described with respect to each step with reference to FIG. 37.

First, description will be made of operation executed when reading the control files 2000P1 to Pn stored in the external storage device 93 into the processors P0 to Pn.

(1) The security expansion unit 3100Pn on the processor Pn issues a request for reading the control file 2000Pn stored in the external storage device 93 to the OS 3000Pn for single processors.

(2) The OS 3000Pn for single processors of the processor Pn accesses the external storage device 93 to request read of the control file 2000Pn.

(3) The OS 3000Pn for single processors receives the control file 2000Pn from the external storage device 93.

(4) The OS 3000Pn for single processors of the processor Pn hands over the obtained security contents of the control file 2000Pn to the security expansion unit 3100Pn of its own processor. As a result, the security expansion unit 3100Pn executes the security function based on the received security contents of the control file 2000Pn.

When the contents of the control file 2000Pn can not be read all by one read request, reading of only necessary items (e.g. control level of each process in FIG. 36) may be requested and the other items may be sequentially read every time a processing request is made from a process.

It is further possible, without reading the control file from the external storage device 93 as described above, to incorporate the security contents set at the control files 2000P0 to 2000Pn into the security expansion units 3100P0 to 3100Pn of the respective processors p0 to Pn in advance.

Here, as operation of the security management system according to the second embodiment, description will be made, for each step, of operation executed when a request from a process is controlled based on the security contents of thus read control file 2000P1.

Figure 38:
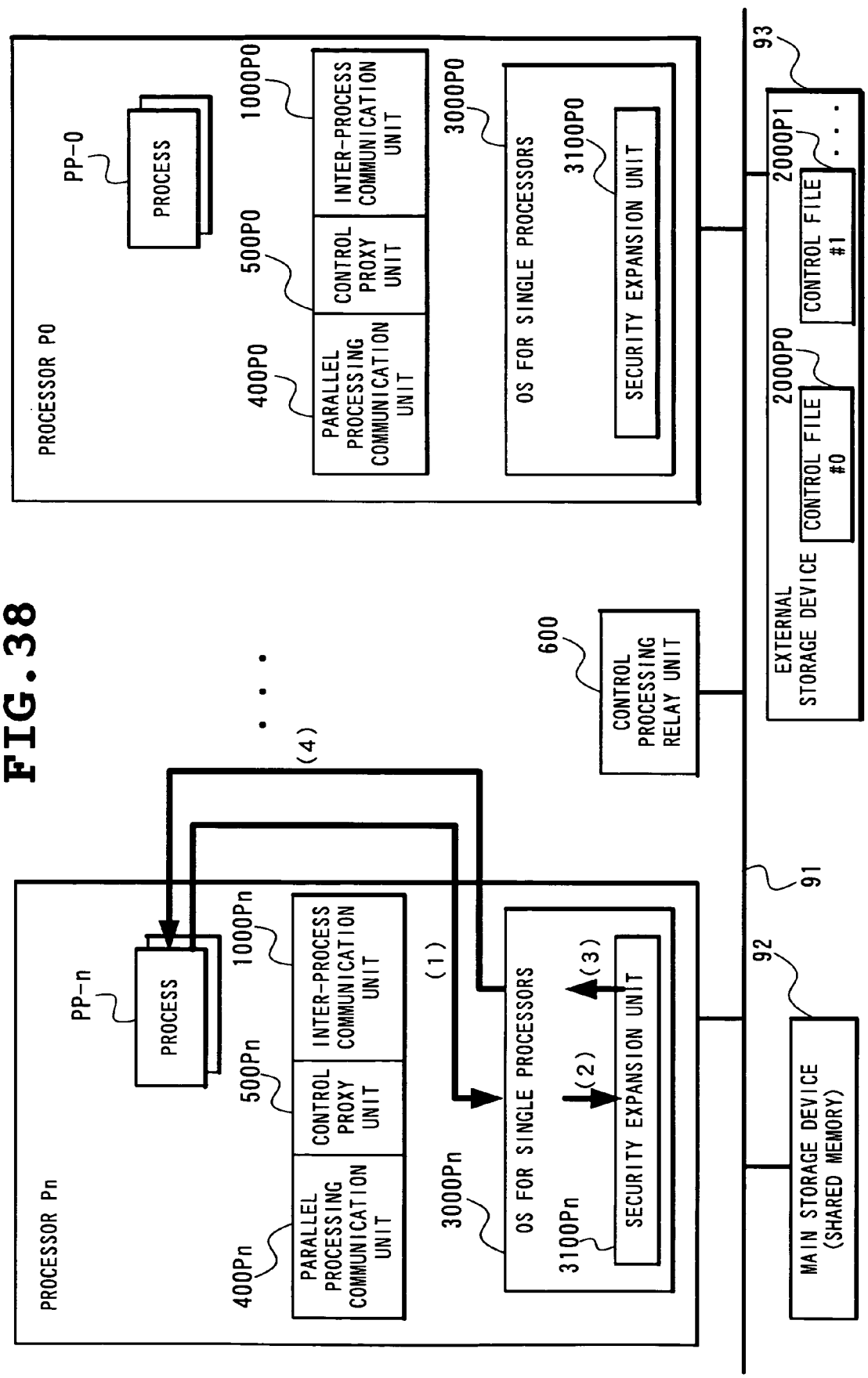
FIG. 38 is a diagram for use in explaining security management operation in the second embodiment of the present invention.

First, description will be made of a case where a request from a certain process PP-n on the processor Pn is limited by the security function set by the control file 2000P1 with reference to FIG. 38.

(1) Certain process PP-n on the processor Pn requests a system call from the OS 3000Pn for single processors of the processor Pn.

(2) When processing proceeds to a processing part requiring the security protection in the system call, the OS 3000P for single processors requests the security expansion unit 3100Pn to check security.

(3) The security expansion unit 3100Pn on the processor Pn determines whether the security call in question should be executed or not based on the security contents of the control file 2000Pn obtained in advance and notifies the OS 3000Pn for single processors of the determination result. When the determination is made based on the security contents, for example, that execution is not allowed, notify the OS 3000Pn for single processors of an error.

(4) The OS 3000Pn for single processors being notified of the error notifies the process PP-n as a request source of the error.

In a case where execution of the system call is allowed based on the security contents at Step (3), the OS 3000Pn for single processors is notified to that effect to process the requested system call.

In a case, for example, where the control level of a certain process PP-n on the processor Pn is Level 2 and a system call regarding the I/O is requested from the process PP-n in question, the security expansion unit 3100Pn determines based on the security contents of the control file shown in FIG. 36 that the request from the process PP-n is not executable and notifies the process PP-n of the error.

The present embodiment can be structured in combination with the above-described first embodiment, adoption of which structure ensures more solid security environments.

As to the security level of the security expansion unit of each processor, the level can be set differently for each processor by changing the security contents of the control file. It is possible, for example, to set a tight security level for a certain processor and a loose security level for the other.

In the above-described embodiment, the system can be also structured to set the security contents in the security expansion unit 3100P0 of the processor P0 to be low to prevent performance of an existing application (process) executed on the processor P0 from being limited.

Also in this embodiment, by setting the control file stored in the external storage device 93 to be appropriately changeable to make the security expansion unit again conduct read every time the control file is changed, the security contents can be dynamically changed.

Although illustrated in the foregoing description is a case where the security expansion units 3100P0 to 3100Pn read the control file or the security contents are incorporated into the security expansion units 3100P0 to 3100Pn in advance, the functions of the security expansion units 3100P0 to 3100Pn themselves of the processors P0 to Pn may be limited for each security expansion unit to control a request from a task operating on each processor P0~Pn. As a result, each processor can be controlled at different security level to obtain the same effect as that in the above-described case.

Next, a third embodiment of a security management system applied to the parallel processing system will be described with reference to FIG. 39.

Here, description will be made of the third embodiment in which the security management system of the present invention is applied to the parallel processing systems shown as the second and third examples in FIGS. 12 and 17.

The present embodiment is structured to appropriately protect services provided by a process operating on each processor by making a security level be variable on an application execution environment level.

Figure 39:
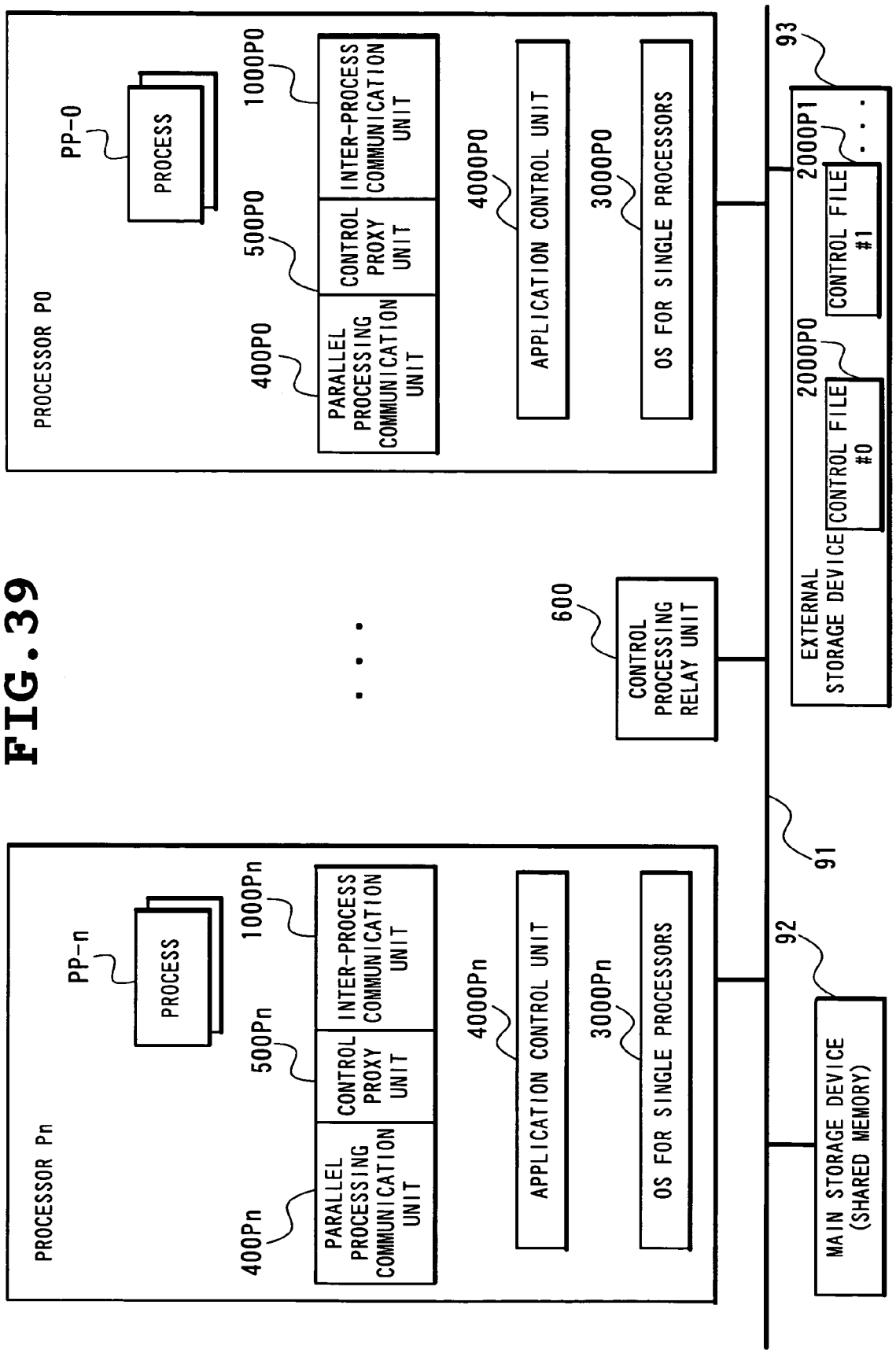
FIG. 39 is a block diagram showing a structure of a security management system of a parallel processing system according to a third embodiment of the present invention.

Illustrated in FIG. 39 showing the security management system according to the third embodiment is a structure obtained by applying the present invention to the parallel processing system shown as the second example in FIG. 12, in which components common to those shown in FIG. 12 are referenced by the same reference numerals to omit their description.

In the security management system according to the third embodiment, the processors P0 to Pn are provided with application control units (e.g. Java® virtual machines) 4000P0 to 4000Pn which provide execution environments for each application such as Java® executed as a process on each of the processors P0 to Pn (to provide a function to an application such as Java® ), as well as managing a security level.

Setting example of the security contents of the control files 2000P0 to 2000Pn stored in the external storage device 93 in the present embodiment is shown in FIG. 40. In the control file illustrated in FIG. 40, the following security contents are defined related to a process as an application executed on each of the processors P0 and P1 to Pn. Security contents to be set by these control files 2000P0 to 2000Pn may be all the same or different from each other.

As to a control level for each process executed on each of the processors P0 and P1~Pn, the processes A, B and C are set at Level 0, the processes D and F at Level 1 and other processes at Level 2.

Set as access control contents for each control level are "all accessible" at Level 0, "another process generation system inhibited" at Level 1 and "system call related to I/O inhibited" at Level 2.

Set as contents of quantitative limitations for each control level are "a standard limitation" at Level 0, "up to one read file" at Level 1 and "up to two semaphores are usable" at Level 2.

Furthermore, as to limitations on a library which can be used by a process as an application, Level 0 is set to be all the libraries, Level 1 to be a standard library and a library of a music function and Level 2 to be a standard library.

Figure 41:
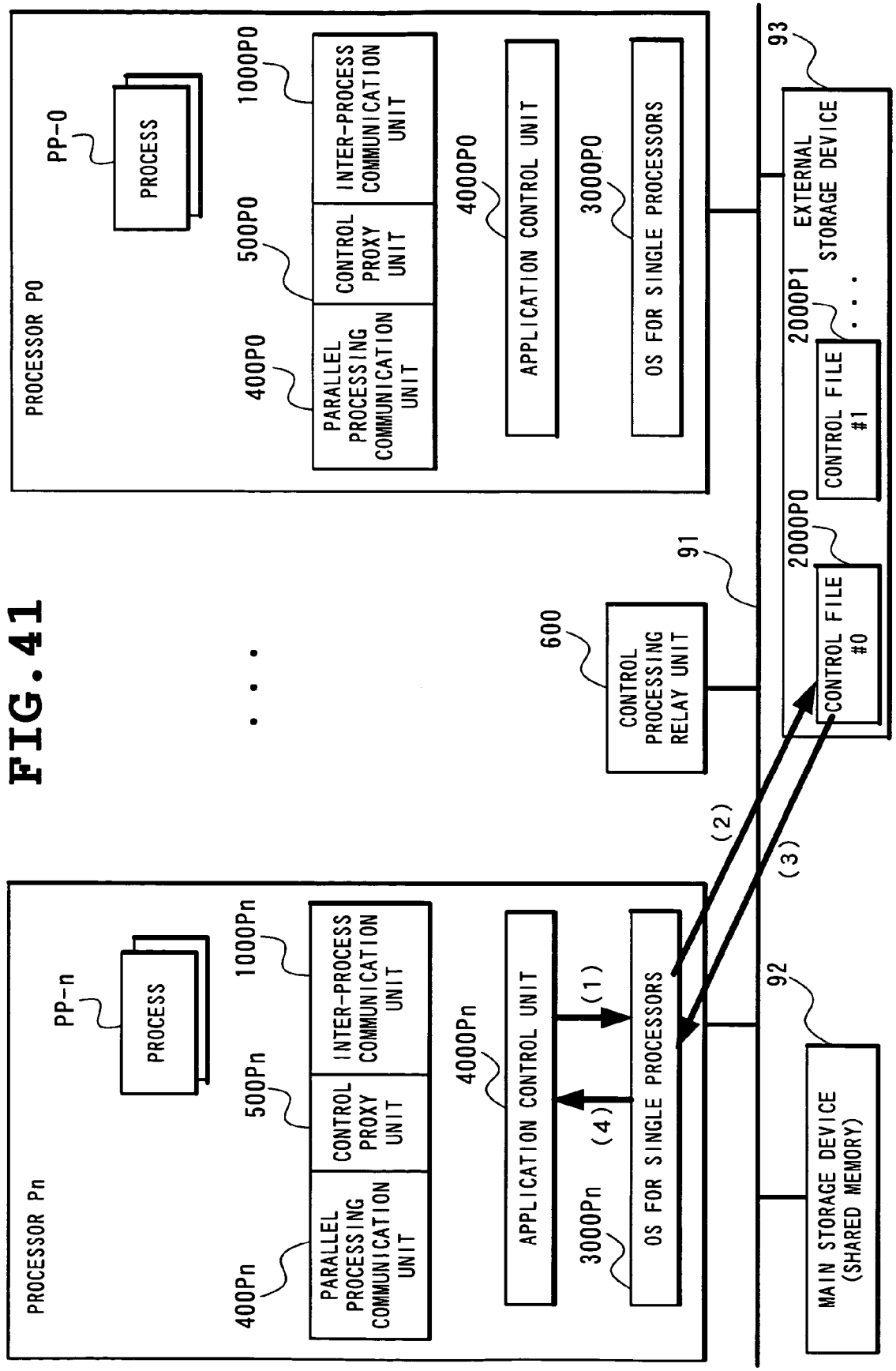
FIG. 41 is a diagram for use in explaining control file reading operation in the third embodiment of the present invention.

Here, operation of the security management system according to the third embodiment will be described with respect to each step with reference to FIG. 41.

First, description will be made of a case where the control files 2000P1 to 2000Pn stored in the external storage device 93 are read by the processors P0 to Pn.

(1) The application control unit 4000Pn on the processor Pn issues a request for reading the control file 2000Pn to the OS 3000Pn for single processors.
(2) The OS 3000Pn for single processors of the processor Pn accesses the external storage device 93 to instruct read of the control file 2000Pn.
(3) The OS 3000Pn for single processors receives the control file 2000Pn from the external storage device 93.
(4) Then, the OS 3000Pn for single processors of the processor Pn hands over the obtained control file 2000Pn to the application control unit 4000Pn, so that the application control unit 4000Pn manages security of a process executed on its own processor according to the security contents of the control file.

When the contents of the control file 2000Pn can not be read all by one read request, reading of only the necessary items (e.g. in FIG. 41, a control level of each process) may be requested and the other items may be sequentially read every time a processing request is made from a process.

It is further possible to incorporate security contents set in the control files 2000P0 to 2000Pn into the application control units 4000P0 to 4000Pn of the respective processors P0 to Pn in advance without reading the control files from the external storage device 93 as is done in the foregoing.

As operation of the security management system according to the third embodiment, description will be here made, with respect to each step, of a case where a request from a process is controlled based on thus read security contents of the control file 2000P1.

Figure 42:
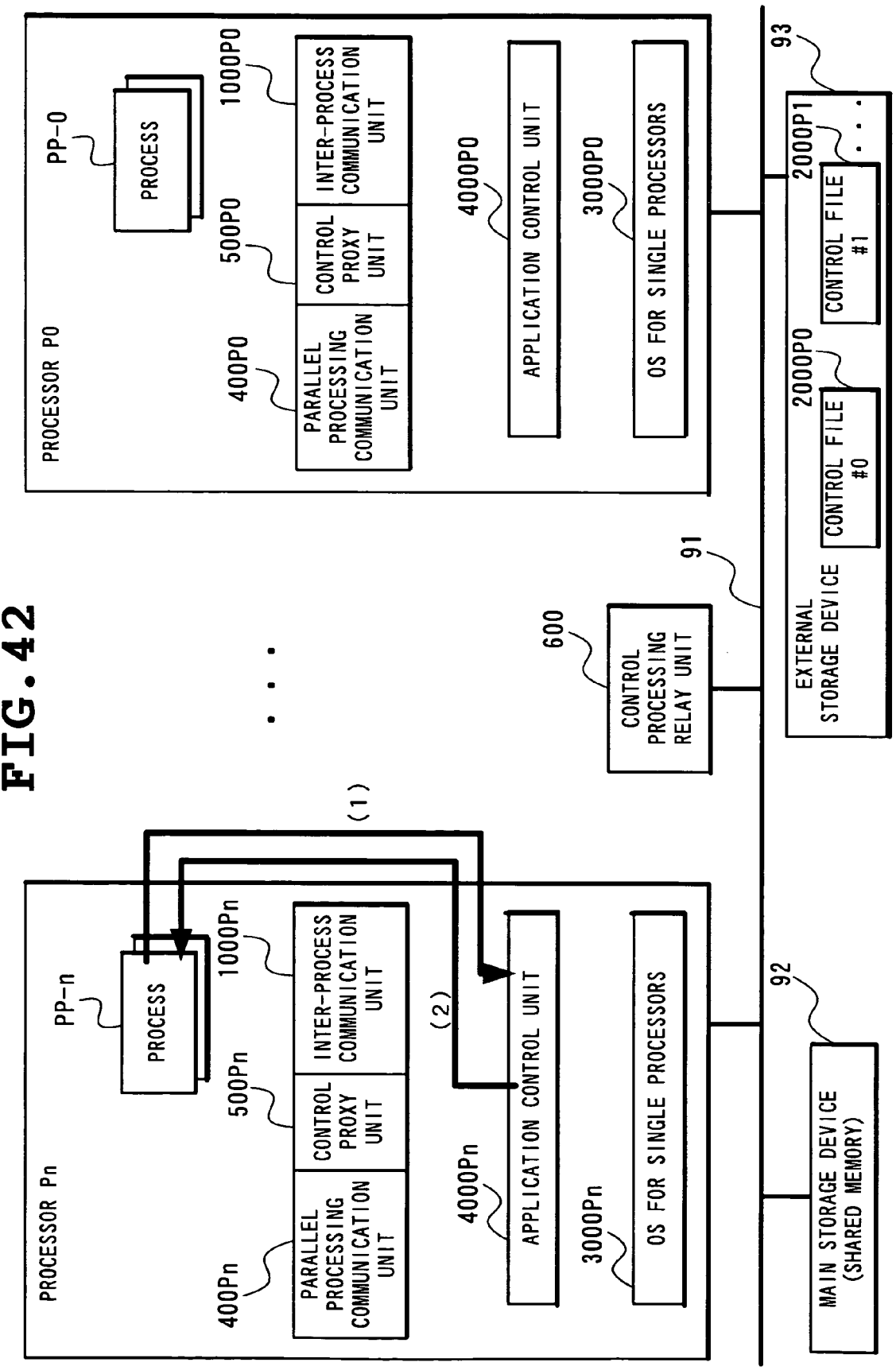
FIG. 42 is a diagram for use in explaining security management operation in the third embodiment of the present invention.

First, description will be made of a case where a request from the process PP-n (e.g. Java® application) on the processor Pn is limited by the security function set by the control file 2000P1 with reference to FIG. 42.

(1) The process PP-n (Java® application) on the processor Pn requests a service function from the application control unit 4000Pn on the processor Pn.
(2) The application control unit 4000Pn having received the request determines whether the requested service function should be executed or not based on the obtained control file 2000Pn and when the determination is made that it should not be executed, notifies the process PP-n as a request source of the error and when it should be executed, notifies the process PP-n as a request source of the result of execution of the service function in question.

In a case, for example, where the control level of a certain process PP-n on the processor Pn is Level 2 and a service function using the music function library is requested from the process PP-n in question, the application control unit 4000Pn determines based on the security contents of the control file shown in FIG. 40 that the request from the process PP-n is not executable and notifies the process PP-n of the error.

The present embodiment can be structured in combination with the above-described first and second embodiments, adoption of which structure ensures more solid security environments.

Although in the above description, illustrated is an example in which a control level is set for each task by the control file, it is also possible for example, to set the security function to be high or low for each of the application control units 4000P0 to 4000Pn to set, at the application control unit, authorization from the lowest level of checking no security to the highest level of checking all the contents (request).

In addition, in the above-described embodiment, the system can be also structured to set the security contents in the application control unit 4000P0 of the processor P0 to be low to prevent performance of an existing application (process) executed on the processor P0 from being limited.

Also in this embodiment, by setting the control file stored in the external storage device 93 to be appropriately changeable to make the application control unit again conduct read every time the control file is changed, the security contents can be dynamically changed.

In the foregoing description, illustrated is the case where the application control units 4000P0 to 4000Pn read a control file or the security contents are incorporated into the application control units 4000P0 to 4000Pn in advance to conduct control based on the security contents, other method of controlling execution of a process (e.g. Java® application) than those will be described in the following as a variation as a fourth embodiment.

Structure of the fourth embodiment is the same as that of the third embodiment and is different from the third embodiment in functions of each process (e.g. Java® application) operating on the system and of the application control units 4000P0 to 4000Pn.

In the fourth embodiment, when limitations different from each other are imposed on the functions provided by the application control units (e.g. Java® virtual machine) 4000P0 to 4000Pn which provide execution environments of a process (e.g. Java® application) arranged on each of the processors P0 to Pn to execute processes (e.g. Java® application) whose requested functions are different from each other, a process as a manager who manages the process in question (e.g. Java® application) allots the process in question (e.g. Java® application) to each processor according to the functions provided by the application control units 4000P0 to 4000Pn of the respective processors. As a result, a plurality of processes (e.g. Java® application) whose requested functions are different from each other operate distributedly in the respective processors which provide the requested functions to effectively prevent deterioration in performance.

Methods of limiting a function of the application control unit (e.g. Java® virtual machine) include, for example, a method of incorporating different profiles which limit functions for each application control unit (e.g. Java® virtual machine) on each processor and a method of limiting a class file which can be loaded or a usable library.

In addition, the above-described parallel processing systems according to the respective embodiments can be realized by a parallel processing program having the respective functions of the parallel processing unit, the OS service unit, the control processing relay unit, the proxy unit and the inter-process communication unit, and the security management system can be realized as well by a security management program having the functions of the OS service unit and the application control unit. These programs are stored in a magnetic disk, a semiconductor memory or other recording medium, and loaded from the recording medium onto a computer processing unit to control the operation of the computer processing unit, thereby realizing the above-described respective functions.

Although the present invention has been described with respect to the preferred embodiments and specific examples in the foregoing, the present invention is not necessarily limited to the above-mentioned embodiments and specific examples and may be implemented in variations within the scope of its technical idea.

As described in the foregoing, in a parallel processing system by an OS for single processors in which an OS and an existing application for single processors are operated on a multiprocessor without modifying them to enable the existing application to realize parallel processing by the multiprocessor, the present invention realizes a security management system which is capable of individually controlling security for each processor by software, while involving no deterioration in performance of the processor.

In addition, by selectively arranging the OS service unit which provides services of the OS for single processors to a unit of work, the security expansion unit incorporated into the OS for single processors and the application control unit which conducts security control with respect to a unit of work, security control can be realized on user level, OS level or application execution environment level.

While in security management by the user level library having the single processor structure, modification of an OS for single processors is required, the present invention realizes security management on a user level without modifying the OS.

Moreover, while conventional security management on an OS level requires operation at the severest level in the execution at a different security level to degrade system performance, the present invention enables a security level to be set for each processor by means of the security expansion unit of each processor, thereby eliminating deterioration of system performance.

Furthermore, although in conventional security management executed under the environment of executing an application such as Java® application, the need of operating a plurality of applications whose security levels are different degrades system performance and increases a required frequency to increase power consumption, the present invention eliminates such shortcomings because security management is conducted for each processor or each application.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A security management system in a parallel processing system by an OS for single processors, wherein on a parallel processing system which operates an OS and an application for single processors on a multiprocessor, said multiprocessor being logically divided into two groups of a first processor side and a second processor side, and controls a unit of work that can be parallelized within said application operating on a processor on said first processor side as a new unit of work on a processor on said second processor side, thereby executing parallel processing by said multiprocessor with respect to said application, an OS service unit which provides services of said OS for single processors to said unit of work controls security function with respect to a processing request from said unit of work in response to said processing request.

2. A security management system in a parallel processing system by an OS for single processors, wherein on a parallel processing system which operates an OS and an application for single processors on a multiprocessor, and controls a unit of work that can be parallelized within said application operating on one processor as a new unit of work on other processor, thereby executing parallel processing by said multiprocessor with respect to said application, an OS service unit which provides services of said OS for single processors to said unit of work controls security function with respect to a processing request from said unit of work in response to said processing request.

3. A security management system in a parallel processing system by an OS for single processors, wherein
on a parallel processing system which operates an OS for single processors and a unit of work as a task on a multiprocessor,
an OS service unit which provides services of said OS for single processors to said unit of work controls security function with respect to a processing request from said unit of work in response to said processing request.

4. The security management system as set forth in claim 1, wherein
with a security contents for each said processor or each said unit of work incorporated into said OS service unit in advance, said OS service unit conducts security protection with respect to a processing request from said unit of work according to said security contents in response to said processing request.

5. The security management system as set forth in claim 1, wherein
with a security contents for each said processor or each said unit of work set in a control file,
said OS service unit conducts security protection with respect to a processing request from said unit of work according to the security contents of said control file in response to said processing request.

6. The security management system as set forth in claim 5, wherein
with said control file having the security contents whose level varies with each said processor set for each said processor stored in an external storage device on said parallel system,
said OS service unit of each said processor reads each corresponding said control file from said external storage device to control security function in response to a request from said unit of work.

7. The security management system as set forth in claim 6, wherein
when said control file stored in said external storage device is changed, said OS service unit of corresponding said processor again reads said control file changed.

8. A security management system in a parallel processing system by an OS for single processors, wherein
on a parallel processing system which
operates an OS and an application for single processors on a multiprocessor,
said multiprocessor being logically divided into two groups of a first processor side and a second processor side, and
controls a unit of work that can be parallelized within said application operating on a processor on said first processor side as a new unit of work on a processor on said second processor side, thereby executing parallel processing by said multiprocessor with respect to said application,
a security expansion unit incorporated into said OS for single processors controls security function with respect to a processing request from said unit of work in response to said processing request.

9. A security management system in a parallel processing system by an OS for single processors, wherein
on a parallel processing system which
operates an OS and an application for single processors on a multiprocessor, and
controls a unit of work that can be parallelized within said application operating on one processor as a new unit of work on other processor, thereby executing parallel processing by said multiprocessor with respect to said application,
a security expansion unit incorporated into said OS for single processors controls security function with respect to a processing request from said unit of work in response to said processing request.

10. A security management system in a parallel processing system by an OS for single processors, wherein
on a parallel processing system which operates an OS for single processors and a unit of work as a task on a multiprocessor,
a security expansion unit incorporated into said OS for single processors controls security function with respect to a processing request from said unit of work in response to said processing request.

11. The security management system as set forth in claim 8, wherein
said security expansion unit is incorporated into said OS for single processors as a module to controls security function with respect to a request from said unit of work for a system call to said OS for single processors in response to said processing request.

12. The security management system as set forth in claim 8, wherein
with a security contents for each said processor or each said unit of work incorporated into said security expansion unit in advance, said security expansion unit conducts security protection with respect to a processing request from said unit of work according to said security contents in response to said processing request.

13. The security management system as set forth in claim 8, wherein
with a security contents for each said processor or each said unit of work set in a control file,
said security expansion unit conducts security protection with respect to a processing request from said unit of work according to the security contents of said control file in response to said processing request.

14. The security management system as set forth in claim 13, wherein
with said control file having security contents whose level varies with each said processor set stored in an external storage device on said parallel system,
said security expansion unit of each said processor reads each corresponding said control file from said external storage device to control security function in response to a request from said unit of work.

15. The security management system as set forth in claim 14, wherein
when said control file stored in said external storage device is changed, said security expansion unit of corresponding said processor again reads said control file changed.

16. A security management system in a parallel processing system by an OS for single processors, wherein
on a parallel processing system which
operates an OS and an application for single processors on a multiprocessor,
said multiprocessor being logically divided into two groups of a first processor side and a second processor side, and
controls a unit of work that can be parallelized within said application operating on a processor on said first processor side as a new unit of work on a processor on said second processor side, thereby executing parallel processing by said multiprocessor with respect to said application, an application control unit which provides execution environments for said unit of work controls security function with respect to a processing request from said unit of work in response to said processing request.

17. A security management system in a parallel processing system by an OS for single processors, wherein
on a parallel processing system which
operates an OS and an application for single processors on a multiprocessor, and
controls a unit of work that can be parallelized within said application operating on one processor as a new unit of work on other processor, thereby executing parallel processing by said multiprocessor with respect to said application,
an application control unit which provides execution environments for said unit of work controls security function with respect to a processing request from said unit of work in response to said processing request.

18. A security management system in a parallel processing system by an OS for single processors, wherein
on a parallel processing system which operates an OS for single processors and a unit of work as a task on a multiprocessor,
an application control unit which provides execution environments for said unit of work controls security function with respect to a processing request from said unit of work in response to said processing request.

19. The security management system as set forth in claim 16, wherein
with a security contents for each said processor or each said unit of work incorporated into said application control unit in advance, said application control unit conducts security protection with respect to a processing request from said unit of work according to said security contents in response to said processing request.

20. The security management system as set forth in claim 16, wherein
with a security contents for each said processor or each said unit of work set in a control file, said application control unit conducts security protection with respect to a processing request from said unit of work according to the security contents of said control file in response to said processing request.

21. The security management system as set forth in claim 20, wherein
with said control file having security contents whose level varies with each said processor set stored in an external storage device on said parallel system,
said application control unit of each said processor reads each corresponding said control file from said external storage device to control security function in response to a request from said unit of work.

22. The security management system as set forth in claim 21, wherein
when said control file stored in said external storage device is changed, said application control unit of corresponding said processor again reads said control file changed.

23. The security management system as set forth in claim 16, wherein said unit of work is a Java® application.

24. A security management system in a parallel processing system by an OS for single processors, wherein
on a parallel processing system which
operates an OS and an application for single processors on a multiprocessor,
said multiprocessor being logically divided into two groups of a first processor side and a second processor side, and
controls a unit of work that can be parallelized within said application operating on a processor on said first processor side as a new unit of work on a processor on said second processor side, thereby executing parallel processing by said multiprocessor with respect to said application,
at least one of an OS service unit which provides services of said OS for single processors to said unit of work, a security expansion unit incorporated into said OS for single processors and an application control unit which controls security function with respect to said unit of work controls security function with respect to a processing request from said unit of work in response to said processing request.

25. A security management system in a parallel processing system by an OS for single processors, wherein
on a parallel processing system which
operates an OS and an application for single processors on a multiprocessor, and
controls a unit of work that can be parallelized within said application operating on one processor as a new unit of work on other processor, thereby executing parallel processing by said multiprocessor with respect to said application,
at least one of an OS service unit which provides services of said OS for single processors to said unit of work, a security expansion unit incorporated into said OS for single processors and an application control unit which controls security function with respect to said unit of work controls security function with respect to a processing request from said unit of work in response to said processing request.

26. A security management system in a parallel processing system by an OS for single processors, wherein
on a parallel processing system which
operates an OS and an application for single processors on a multiprocessor,
said multiprocessor being logically divided into two groups of a first processor side and a second processor side, and
controls a unit of work that can be parallelized within said application operating on a processor on said first processor side as a new unit of work on a processor on said second processor side, thereby executing parallel processing by said multiprocessor with respect to said application,
limitations are imposed, for each said processor, on the function of an OS service unit which provides services of said OS for single processors to said unit of work to limit a processing request from said unit of work operating on each said processor.

27. A security management system in a parallel processing system by an OS for single processors, wherein
on a parallel processing system which
operates an OS and an application for single processors on a multiprocessor, and
controls a unit of work that can be parallelized within said application operating on one processor as a new unit of work on other processor, thereby executing parallel processing by said multiprocessor with respect to said application,
limitations are imposed, for each said processor, on the function of an OS service unit which provides services of said OS for single processors to said unit of work to limit a processing request from said unit of work operating on each said processor.

28. A security management system in a parallel processing system by an OS for single processors, wherein
    on a parallel processing system which
        operates an OS and an application for single processors on a multiprocessor,
    said multiprocessor being logically divided into two groups of a first processor side and a second processor side, and
    controls a unit of work that can be parallelized within said application operating on a processor on said first processor side as a new unit of work on a processor on said second processor side, thereby executing parallel processing by said multiprocessor with respect to said application,
    when executing a unit of work whose requested function is different, a processor which executes the unit of work in question is selected and allocated according to a function provided by an application control unit which provides execution environments to said unit of work.

29. A security management system in a parallel processing system by an OS for single processors, wherein
    on a parallel processing system which
        operates an OS and an application for single processors on a multiprocessor, and
    controls a unit of work that can be parallelized within said application operating on one processor as a new unit of work on other processor, thereby executing parallel processing by said multiprocessor with respect to said application,
    when executing a unit of work whose requested function is different, a processor which executes the unit of work in question is selected and allocated according to a function provided by an application control unit which provides execution environments to said unit of work.

30. A security management system in a parallel processing system by an OS for single processors, wherein
    on a parallel processing system which operates an OS for single processors and a unit of work as a task on a multiprocessor,
    when executing a unit of work whose requested function is different, a processor which executes the unit of work in question is selected and allocated according to a function provided by an application control unit which provides execution environments to said unit of work.

31. The security management system as set forth in claim 28, wherein
    said unit of work is a Java® application, and said Java® application whose requested function is different is executed by incorporating a profile which limits the function of said Java® application into each Java® virtual machine as the application control unit of each said processor or by limiting a loadable class file.

32. The security management system as set forth in claim 1, wherein
    said security function is a function of realizing security by access control, and access quantitative control for each task or for each processor is based on control file including security contents.

33. The security management system as set forth in claim 3, wherein
    said security function is a function of realizing security by access control, and access quantitative control for each task or for each processor is based on control file including security contents.

34. The security management system is set forth in claim 18, wherein
    said security function is a function of realizing security by access control, and access quantitative control for each task or for each processor is based on control file including security contents.

* * * * *